United States Patent
Hansen et al.

(10) Patent No.: US 11,043,220 B1
(45) Date of Patent: Jun. 22, 2021

(54) DIGITAL ASSISTANT HARDWARE ABSTRACTION

(71) Applicant: Apple Inc., Cupertino, CA (US)

(72) Inventors: Bryan Hansen, San Francisco, CA (US); Nikrouz Ghotbi, San Jose, CA (US); Yifeng Gui, Los Gatos, CA (US); Xinyuan Huang, San Jose, CA (US); Benjamin S. Phipps, San Francisco, CA (US); Eugene Ray, Cupertino, CA (US); Mahesh Ramaray Shanbhag, Santa Clara, CA (US); Jaireh Tecarro, Berkeley, CA (US); Sumit Wattal, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/990,876

(22) Filed: Aug. 11, 2020

Related U.S. Application Data

(60) Provisional application No. 63/022,942, filed on May 11, 2020.

(51) Int. Cl.
*G10L 15/22* (2006.01)
*G10L 15/30* (2013.01)
(Continued)

(52) U.S. Cl.
CPC .............. *G10L 15/22* (2013.01); *G06F 21/32* (2013.01); *G10L 15/1815* (2013.01);
(Continued)

(58) Field of Classification Search
USPC ................................ 704/246, 247, 251, 252
See application file for complete search history.

(56) References Cited

U.S. PATENT DOCUMENTS

| 10,170,135 B1 | 1/2019 | Pearce et al. |
| 10,757,499 B1 | 8/2020 | Vautrin et al. |

(Continued)

FOREIGN PATENT DOCUMENTS

| WO | 2017/142116 A1 | 8/2017 |
| WO | 2018/213415 A1 | 11/2018 |

OTHER PUBLICATIONS

Non-Final Office Action received for U.S. Appl. No. 16/990,894, dated Dec. 4, 2020, 14 pages.

(Continued)

*Primary Examiner* — Leonard Saint Cyr
(74) *Attorney, Agent, or Firm* — Dentons US LLP

(57) ABSTRACT

This relates to intelligent automated assistants and, more specifically, to intelligent context sharing and task performance among a collection of devices with intelligent automated assistant capabilities. An example method includes, at a first electronic device participating in a context-sharing group associated with a first location: receiving a user voice input; receiving, from a context collector, an aggregate context of the context-sharing group; providing at least a portion of the aggregate context and data corresponding to the user voice input to a remote device; receiving, from the remote device, a command to perform one or more tasks and a device identifier corresponding to a second electronic device; and transmitting the command to the second electronic device based on the device identifier, wherein the command causes the second electronic device to perform the one or more tasks.

42 Claims, 36 Drawing Sheets

(51) Int. Cl.
*G06F 21/32* (2013.01)
*G10L 15/18* (2013.01)

(52) U.S. Cl.
CPC ........ *G10L 15/30* (2013.01); *G10L 2015/223* (2013.01); *G10L 2015/228* (2013.01)

(56) References Cited

U.S. PATENT DOCUMENTS

| | | |
|---|---|---|
| 2010/0195865 A1 | 8/2010 | Luff |
| 2011/0028083 A1 | 2/2011 | Soitis |
| 2012/0109753 A1 | 5/2012 | Kennewick et al. |
| 2012/0232906 A1 | 9/2012 | Lindahl |
| 2012/0265528 A1 | 10/2012 | Gruber et al. |
| 2013/0155948 A1 | 6/2013 | Pinheiro et al. |
| 2013/0185081 A1 | 7/2013 | Cheyer et al. |
| 2015/0004958 A1* | 1/2015 | Wang ............... H04W 4/08 455/418 |
| 2015/0186154 A1 | 7/2015 | Brown et al. |
| 2016/0099984 A1 | 4/2016 | Karagiannis et al. |
| 2016/0336011 A1* | 11/2016 | Koll ............... G10L 15/22 |
| 2017/0025124 A1 | 1/2017 | Mixter et al. |
| 2017/0093356 A1* | 3/2017 | Cudak ............. H03G 3/3005 |
| 2017/0357478 A1 | 12/2017 | Piersol et al. |
| 2018/0096690 A1 | 4/2018 | Mixter et al. |
| 2019/0019077 A1 | 1/2019 | Griffin et al. |
| 2019/0139541 A1 | 5/2019 | Andersen et al. |
| 2019/0180770 A1 | 6/2019 | Kothari et al. |
| 2019/0188328 A1* | 6/2019 | Oyenan ............ G06F 16/9038 |
| 2019/0371315 A1 | 12/2019 | Newendorp et al. |
| 2020/0043489 A1 | 2/2020 | Bradley et al. |
| 2020/0044485 A1 | 2/2020 | Smith et al. |
| 2020/0053218 A1 | 2/2020 | Gray |
| 2020/0075018 A1 | 3/2020 | Chen |
| 2020/0091958 A1 | 3/2020 | Curtis et al. |
| 2020/0092625 A1 | 3/2020 | Raffle |
| 2020/0127988 A1 | 4/2020 | Bradley et al. |
| 2020/0137230 A1 | 4/2020 | Spohrer |
| 2020/0175566 A1 | 6/2020 | Bender et al. |
| 2020/0184964 A1 | 6/2020 | Myers et al. |
| 2020/0227034 A1 | 7/2020 | Summa et al. |
| 2020/0252508 A1 | 8/2020 | Gray |
| 2020/0302925 A1 | 9/2020 | Shah et al. |
| 2020/0312317 A1 | 10/2020 | Kothari et al. |

OTHER PUBLICATIONS

Office Action received for Danish Patent Application No. PA202070546, dated Nov. 30, 2020, 8 pages.
Non-Final Office Action received for U.S. Appl. No. 16/990,868, dated Nov. 19, 2020, 19 pages.
Intention to Grant received for Danish Patent Application No. PA202070546, dated Feb. 10, 2021, 2 pages.

* cited by examiner

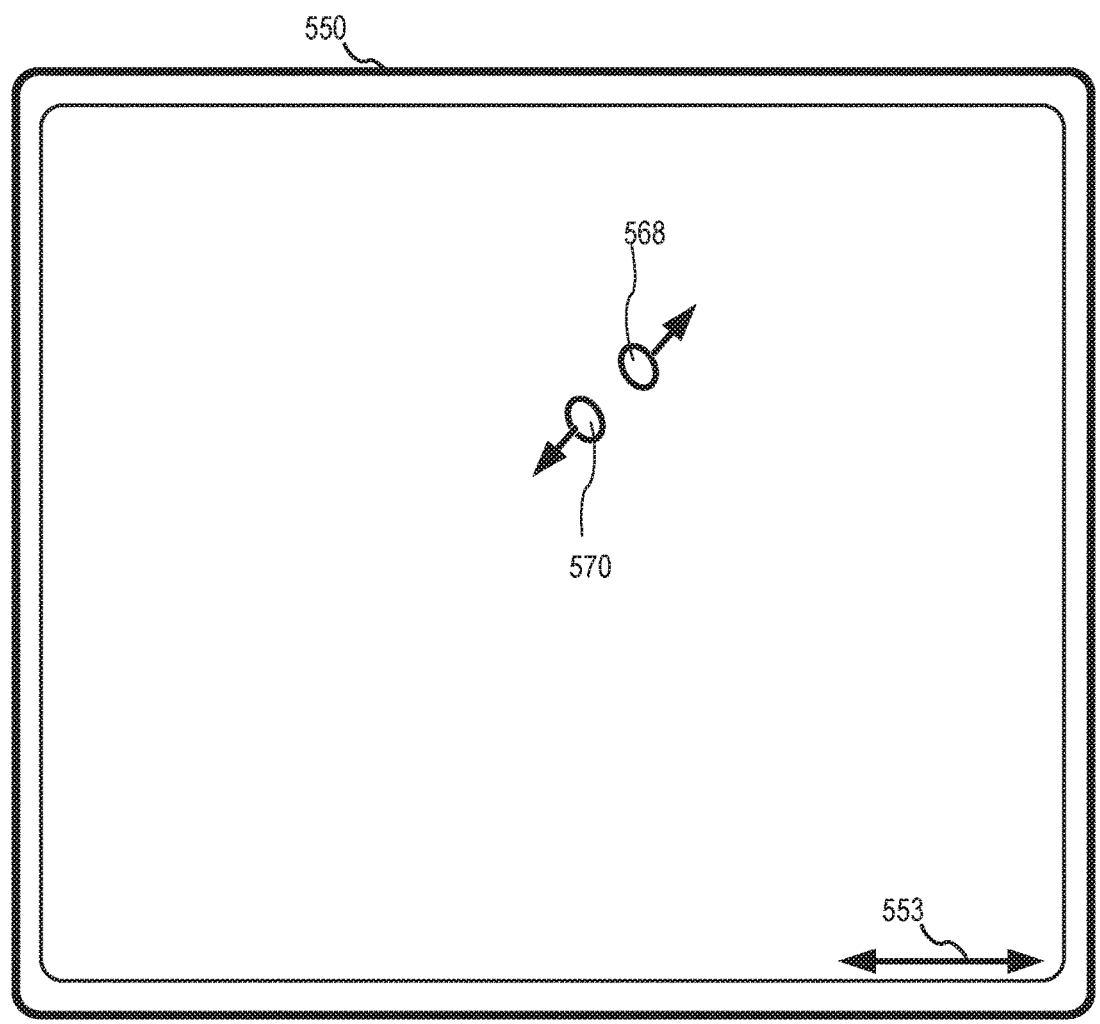
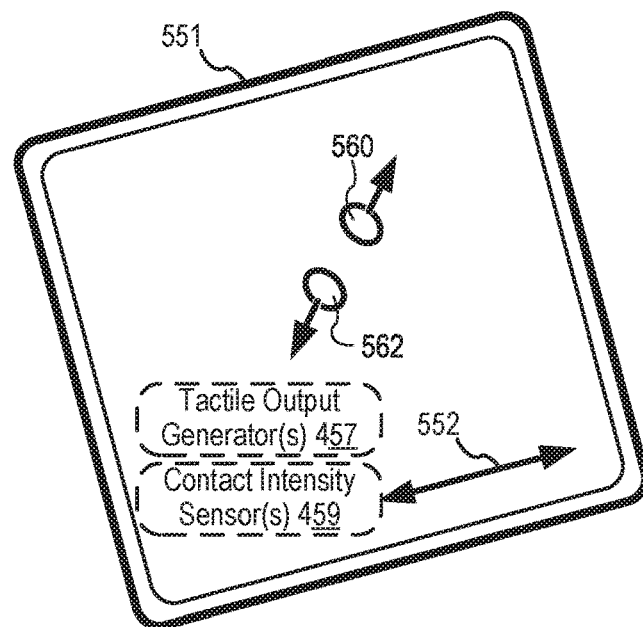
*FIG. 5B*

DIGITAL ASSISTANT HARDWARE ABSTRACTION

CROSS-REFERENCE TO RELATED APPLICATIONS

This application is a continuation of U.S. Provisional Application No. 63/022,942, entitled "DIGITAL ASSISTANT HARDWARE ABSTRACTION," filed May 11, 2020, the contents of which are hereby incorporated by reference in their entirety for all purposes.

FIELD

This relates generally to intelligent automated assistants and, more specifically, to intelligent context sharing and task performance among a collection of devices with intelligent automated assistant capabilities.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

SUMMARY

A location, such as a home or an office, may contain multiple devices with digital assistant capabilities. It thus can be desirable for the multiple devices to share context information among one another so that the digital assistants of the multiple devices may intelligently coordinate the performance of tasks in response to user requests based on, for example, events that are occurring (and that have recently occurred) at each device, the location of users with respect to each device, and/or what device capabilities the tasks require. In this manner, a user-requested task may be performed at a device of the multiple devices even if a user does not directly provide a user request to the digital assistant of that device. This in turn creates an appearance of a single digital assistant that interacts with a user across the multiple devices, instead of multiple individual digital assistants at each of the multiple devices.

Example methods are disclosed herein. An example method includes, at a first electronic device: joining a context-sharing group associated with a first location, wherein the context-sharing group is a collection of at least two electronic devices that each share context information with at least one other electronic device included in the collection, and wherein the collection includes at least a second electronic device. After joining the context-sharing group, electing one electronic device of the collection of at least two electronic devices as a context collector of the context-sharing group, wherein electing the context collector includes: determining a first context collector score corresponding to the first electronic device based at least on a strength of connectivity between the first electronic device and a wireless network of the first location; receiving, from at least the second electronic device, one or more context collector scores corresponding to at least the second electronic device; and determining, based on the first context collector score and the one or more context collector scores corresponding to at least the second electronic device, which electronic device of the electronic devices included in the context-sharing group to elect as the context collector of the context-sharing group. In accordance with a determination to elect the first electronic device as the context collector, receiving context information from at least the second electronic device in response to at least the second electronic device undergoing a device state change.

Another example method includes, at a first electronic device participating in a context-sharing group associated with a first location, wherein the context-sharing group is a collection of at least two electronic devices that each share context information with at least one other electronic device included in the collection, and wherein the collection includes at least a second electronic device and a context collector: receiving a user voice input; receiving, from the context collector, an aggregate context of the context-sharing group; after receiving the aggregate context, providing at least a portion of the aggregate context and data corresponding to the user voice input to a remote device that is not participating in the context-sharing group; receiving, from the remote device, a command to perform one or more tasks and a device identifier corresponding to the second electronic device, wherein the remote device determines the one or more tasks and the device identifier based on the data corresponding to the user voice input and context information included in the at least a portion of the aggregate context; and transmitting the command to the second electronic device based on the device identifier, wherein the command causes the second electronic device to perform the one or more tasks.

Another example method includes, at one or more servers: receiving a user voice input and at least a portion of an aggregate context of a context-sharing group associated with a first location from a first electronic device that is participating in the context-sharing group, wherein the context-sharing group is a collection of a plurality of electronic devices that each share context information with at least one other electronic device included in the collection; determining a user intent based on the user voice input; determining one or more tasks corresponding to the user intent; identifying a second electronic device of the plurality of electronic devices to perform the one or more tasks based on the one or more tasks and context information included in the at least a portion of the aggregate context; and transmitting, to the first electronic device, a command to perform the one or more tasks and a device identifier corresponding to the second electronic device, wherein the first electronic transmits the command to the second electronic device based on the device identifier, and wherein the command causes the second electronic device to perform the one or more tasks.

Another example method includes, at a first electronic device participating in a context-sharing group associated with a first location, wherein the context-sharing group is a collection of a plurality of electronic devices that each share context information with at least one other electronic device included in the collection, and wherein the collection includes a context collector: receiving a user voice input; receiving, from the context collector, an aggregate context of the context-sharing group; after receiving the aggregate context, providing at least a portion of the aggregate context and data corresponding to the user voice input to a remote device that is not participating in the context-sharing group, wherein the remote device determines a plurality of tasks based on the data corresponding to the user voice input; receiving, from the remote device: a first command to perform a first set of tasks of the plurality of tasks and a second command to perform a second set of tasks of the plurality of tasks; and a first device identifier corresponding to a second electronic device of the plurality of electronic devices and a second device identifier corresponding to a third electronic device of the plurality of electronic devices; transmitting the first command to the second electronic device based on the first device identifier, wherein the first command causes the second electronic device to perform the first set of tasks; and transmitting the second command to the third electronic device based on the second device identifier, wherein the second command causes the third electronic device to perform the second set of tasks.

Another example method includes, at a system including at least a first electronic device and a second electronic device that are participating in a context-sharing group associated with a first location, wherein the context-sharing group is a collection of at least two electronic devices that each share context information with at least one other electronic device included in the collection, and wherein the collection includes a context collector: receiving, at the first electronic device, a first user voice input; outputting, at the first electronic device, a first digital assistant response based on the first user voice input, wherein the first electronic device transmits context information including a digital assistant dialog session history for the first electronic device to the context collector after outputting the first digital assistant response; receiving, at the second electronic device, a second user voice input; receiving, at the second electronic device, an updated aggregate context of the context-sharing group from the context collector, wherein the updated aggregate context includes the digital assistant dialog session history for the first electronic device; and outputting, at the second electronic device, a second digital assistant response based on the second user voice input and the digital assistant dialog history for the first electronic device.

Another example method includes, at a first electronic device participating in a context-sharing group associated with a first location, wherein the context-sharing group is a collection of at least two electronic devices that each share context information with at least one other electronic device participating in the collection, and wherein the collection includes at least a second electronic device and a context collector: receiving a user voice input, wherein the user voice input includes a digital assistant trigger; in response to detecting the digital assistant trigger, transmitting a first trigger advertisement to the context collector, wherein the first trigger advertisement indicates a first time at which the digital assistant trigger ended according to the first electronic device; receiving, from the context collector, a second trigger advertisement, wherein the second trigger advertisement indicates a second time at which the digital assistant trigger ended according to the second electronic device; determining whether the second time is within a predetermined time range before the first time; and in accordance with a determination that the second time is within the predetermined time range before the first time, forgoing further processing of the user voice input.

Example non-transitory computer-readable media are disclosed herein. An example non-transitory computer-readable storage medium stores one or more programs. The one or more programs comprise instructions, which when executed by one or more processors of a first electronic device, cause the first electronic device to: join a context-sharing group associated with a first location, wherein the context-sharing group is a collection of at least two electronic devices that each share context information with at least one other electronic device included in the collection, and wherein the collection includes at least a second electronic device; after joining the context-sharing group, elect one electronic device of the collection of at least two electronic devices as a context collector of the context-sharing group, wherein electing the context collector includes: determining a first context collector score corresponding to the first electronic device based at least on a strength of connectivity between the first electronic device and a wireless network of the first location; receiving, from at least the second electronic device, one or more context collector scores corresponding to at least the second electronic device; and determining, based on the first context collector score and the one or more context collector scores corresponding to at least the second electronic device, which electronic device of the electronic devices included in the context-sharing group to elect as the context collector of the context-sharing group; and in accordance with a determination to elect the first electronic device as the context collector, receive context information from at least the second electronic device in response to at least the second electronic device undergoing a device state change.

Another example non-transitory computer-readable storage medium stores one or more programs, the one or more programs comprising instructions, which when executed by one or more processors of a first electronic device, cause the first electronic device to: while the first electronic device is participating in a context-sharing group associated with a first location, wherein the context-sharing group is a collection of at least two electronic devices that each share context information with at least one other electronic device included in the collection, and wherein the collection includes at least a second electronic device and a context collector: receive a user voice input; receive, from the context collector, an aggregate context of the context-sharing group; after receiving the aggregate context, provide at least a portion of the aggregate context and data corresponding to the user voice input to a remote device that is not participating in the context-sharing group; receive, from the remote device, a command to perform one or more tasks and a device identifier corresponding to the second electronic device, wherein the remote device determines the one or more tasks and the device identifier based on the data corresponding to the user voice input and context information included in the at least a portion of the aggregate context; and transmit the command to the second electronic device based on the device identifier, wherein the command causes the second electronic device to perform the one or more tasks.

Another example non-transitory computer-readable storage medium stores one or more programs, the one or more programs comprising instructions, which when executed by one or more processors of one or more servers, cause the one or more servers to: receive a user voice input and at least a portion of an aggregate context of a context-sharing group associated with a first location from a first electronic device that is participating in the context-sharing group, wherein the context-sharing group is a collection of a plurality of electronic devices that each share context information with at least one other electronic device included in the collection; determine a user intent based on the user voice input; determine one or more tasks corresponding to the user intent; identify a second electronic device of the plurality of electronic devices to perform the one or more tasks based on the one or more tasks and context information included in the at least a portion of the aggregate context; and transmit, to the first electronic device, a command to perform the one or more tasks and a device identifier corresponding to the second electronic device, wherein the first electronic transmits the command to the second electronic device based on the device identifier, and wherein the command causes the second electronic device to perform the one or more tasks.

Another example non-transitory computer-readable storage medium stores one or more programs, the one or more programs comprising instructions, which when executed by one or more processors of a first electronic device, cause the first electronic device to: while the first electronic device is participating in a context-sharing group associated with a first location, wherein the context-sharing group is a collection of a plurality of electronic devices that each share context information with at least one other electronic device included in the collection, and wherein the collection includes a context collector: receive a user voice input; receive, from the context collector, an aggregate context of the context-sharing group; after receiving the aggregate context, provide at least a portion of the aggregate context and data corresponding to the user voice input to a remote device that is not participating in the context-sharing group, wherein the remote device determines a plurality of tasks based on the data corresponding to the user voice input; receive, from the remote device: a first command to perform a first set of tasks of the plurality of tasks and a second command to perform a second set of tasks of the plurality of tasks; and a first device identifier corresponding to a second electronic device of the plurality of electronic devices and a second device identifier corresponding to a third electronic device of the plurality of electronic devices; transmit the first command to the second electronic device based on the first device identifier, wherein the first command causes the second electronic device to perform the first set of tasks; and transmit the second command to the third electronic device based on the second device identifier, wherein the second command causes the third electronic device to perform the second set of tasks.

A non-transitory computer-readable storage medium storing one or more programs, the one or more programs comprising instructions, which when executed by one or more processors of a first electronic device, cause the first electronic device to: while a first electronic device and a second electronic device are participating in a context-sharing group associated with a first location, wherein the context-sharing group is a collection of at least two electronic devices that each share context information with at least one other electronic device included in the collection, and wherein the collection includes a context collector: receive, at the first electronic device, a first user voice input; output, at the first electronic device, a first digital assistant response based on the first user voice input, wherein the first electronic device transmits context information including a digital assistant dialog session history for the first electronic device to the context collector after outputting the first digital assistant response; receive, at the second electronic device, a second user voice input; receive, at the second electronic device, an updated aggregate context of the context-sharing group from the context collector, wherein the updated aggregate context includes the digital assistant dialog session history for the first electronic device; and output, at the second electronic device, a second digital assistant response based on the second user voice input and the digital assistant dialog history for the first electronic device.

A non-transitory computer-readable storage medium storing one or more programs, the one or more programs comprising instructions, which when executed by one or more processors of a first electronic device, cause the first electronic device to: while the first electronic device is participating in a context-sharing group associated with a first location, wherein the context-sharing group is a collection of at least two electronic devices that each share context information with at least one other electronic device participating in the collection, and wherein the collection includes at least a second electronic device and a context collector: receive a user voice input, wherein the user voice input includes a digital assistant trigger; in response to detecting the digital assistant trigger, transmit a first trigger advertisement to the context collector, wherein the first trigger advertisement indicates a first time at which the digital assistant trigger ended according to the first electronic device; receive, from the context collector, a second trigger advertisement, wherein the second trigger advertisement indicates a second time at which the digital assistant trigger ended according to the second electronic device; determine whether the second time is within a predetermined time range before the first time; and in accordance with a determination that the second time is within the predetermined time range before the first time, forgo further processing of the user voice input.

Example electronic devices and systems are disclosed herein. An example first electronic device comprises one or more processors; a memory; and one or more programs, where the one or more programs are stored in the memory and are configured to be executed by the one or more processors, the one or more programs including instructions for: joining a context-sharing group associated with a first location, wherein the context-sharing group is a collection of at least two electronic devices that each share context information with at least one other electronic device included in the collection, and wherein the collection includes at least a second electronic device. After joining the context-sharing group, electing one electronic device of the collection of at least two electronic devices as a context collector of the context-sharing group, wherein electing the context collector includes: determining a first context collector score corresponding to the first electronic device based at least on a strength of connectivity between the first electronic device and a wireless network of the first location; receiving, from at least the second electronic device, one or more context collector scores corresponding to at least the second electronic device; and determining, based on the first context collector score and the one or more context collector scores corresponding to at least the second electronic device, which electronic device of the electronic devices included in the context-sharing group to elect as the context collector of the context-sharing group. In accordance with a determination to elect the first electronic device as the context collector, receiving context information from at least the second electronic device in response to at least the second electronic device undergoing a device state change.

Another example first electronic device comprises one or more processors; a memory; and one or more programs, where the one or more programs are stored in the memory and are configured to be executed by the one or more processors, the one or more programs including instructions for: while the first electronic device is participating in a context-sharing group associated with a first location, wherein the context-sharing group is a collection of at least two electronic devices that each share context information with at least one other electronic device included in the collection, and wherein the collection includes at least a second electronic device and a context collector: receiving a user voice input; receiving, from the context collector, an aggregate context of the context-sharing group; after receiving the aggregate context, providing at least a portion of the aggregate context and data corresponding to the user voice input to a remote device that is not participating in the context-sharing group; receiving, from the remote device, a command to perform one or more tasks and a device identifier corresponding to the second electronic device, wherein the remote device determines the one or more tasks and the device identifier based on the data corresponding to the user voice input and context information included in the at least a portion of the aggregate context; and transmitting the command to the second electronic device based on the device identifier, wherein the command causes the second electronic device to perform the one or more tasks.

An example system comprises one or more processors; memory; and one or more programs, where the one or more programs are stored in the memory and are configured to be executed by the one or more processors, the one or more programs including instructions for: receiving a user voice input and at least a portion of an aggregate context of a context-sharing group associated with a first location from a first electronic device that is participating in the context-sharing group, wherein the context-sharing group is a collection of a plurality of electronic devices that each share context information with at least one other electronic device included in the collection; determining a user intent based on the user voice input; determining one or more tasks corresponding to the user intent; identifying a second electronic device of the plurality of electronic devices to perform the one or more tasks based on the one or more tasks and context information included in the at least a portion of the aggregate context; and transmitting, to the first electronic device, a command to perform the one or more tasks and a device identifier corresponding to the second electronic device, wherein the first electronic transmits the command to the second electronic device based on the device identifier, and wherein the command causes the second electronic device to perform the one or more tasks.

Another example first electronic device comprises one or more processors; a memory; and one or more programs, where the one or more programs are stored in the memory and are configured to be executed by the one or more processors, the one or more programs including instructions for: while the first electronic device is participating in a context-sharing group associated with a first location, wherein the context-sharing group is a collection of a plurality of electronic devices that each share context information with at least one other electronic device included in the collection, and wherein the collection includes a context collector: receiving a user voice input; receiving, from the context collector, an aggregate context of the context-sharing group; after receiving the aggregate context, providing at least a portion of the aggregate context and data corresponding to the user voice input to a remote device that is not participating in the context-sharing group, wherein the remote device determines a plurality of tasks based on the data corresponding to the user voice input; receiving, from the remote device: a first command to perform a first set of tasks of the plurality of tasks and a second command to perform a second set of tasks of the plurality of tasks; and a first device identifier corresponding to a second electronic device of the plurality of electronic devices and a second device identifier corresponding to a third electronic device of the plurality of electronic devices; transmitting the first command to the second electronic device based on the first device identifier, wherein the first command causes the second electronic device to perform the first set of tasks; and transmitting the second command to the third electronic device based on the second device identifier, wherein the second command causes the third electronic device to perform the second set of tasks.

Another example system comprises one or more processors; memory; and one or more programs, where the one or more programs are stored in the memory and are configured to be executed by the one or more processors, the one or more programs including instructions for: while a first electronic device and a second electronic device are participating in a context-sharing group associated with a first location, wherein the context-sharing group is a collection of at least two electronic devices that each share context information with at least one other electronic device included in the collection, and wherein the collection includes a context collector: receiving, at the first electronic device, a first user voice input; outputting, at the first electronic device, a first digital assistant response based on the first user voice input, wherein the first electronic device transmits context information including a digital assistant dialog session history for the first electronic device to the context collector after outputting the first digital assistant response; receiving, at the second electronic device, a second user voice input; receiving, at the second electronic device, an updated aggregate context of the context-sharing group from the context collector, wherein the updated aggregate context includes the digital assistant dialog session history for the first electronic device; and outputting, at the second electronic device, a second digital assistant response based on the second user voice input and the digital assistant dialog history for the first electronic device.

Another example first electronic device comprises one or more processors; a memory; and one or more programs, where the one or more programs are stored in the memory and are configured to be executed by the one or more processors, the one or more programs including instructions for: while the first electronic device is participating in a context-sharing group associated with a first location, wherein the context-sharing group is a collection of at least two electronic devices that each share context information with at least one other electronic device participating in the collection, and wherein the collection includes at least a second electronic device and a context collector: receiving a user voice input, wherein the user voice input includes a digital assistant trigger; in response to detecting the digital assistant trigger, transmitting a first trigger advertisement to the context collector, wherein the first trigger advertisement indicates a first time at which the digital assistant trigger ended according to the first electronic device; receiving, from the context collector, a second trigger advertisement, wherein the second trigger advertisement indicates a second time at which the digital assistant trigger ended according to the second electronic device; determining whether the second time is within a predetermined time range before the first time; and in accordance with a determination that the second time is within the predetermined time range before the first time, forgoing further processing of the user voice input.

An example first electronic device comprises means for joining a context-sharing group associated with a first location, wherein the context-sharing group is a collection of at least two electronic devices that each share context information with at least one other electronic device included in the collection, and wherein the collection includes at least a second electronic device. After joining the context-sharing group, means for electing one electronic device of the collection of at least two electronic devices as a context collector of the context-sharing group, wherein electing the context collector includes: determining a first context collector score corresponding to the first electronic device based at least on a strength of connectivity between the first electronic device and a wireless network of the first location; receiving, from at least the second electronic device, one or more context collector scores corresponding to at least the second electronic device; and determining, based on the first context collector score and the one or more context collector scores corresponding to at least the second electronic device, which electronic device of the electronic devices included in the context-sharing group to elect as the context collector of the context-sharing group. In accordance with a determination to elect the first electronic device as the context collector, means for receiving context information from at least the second electronic device in response to at least the second electronic device undergoing a device state change.

Another example first electronic device comprises means for: while the first electronic device is participating in a context-sharing group associated with a first location, wherein the context-sharing group is a collection of at least two electronic devices that each share context information with at least one other electronic device included in the collection, and wherein the collection includes at least a second electronic device and a context collector: receiving a user voice input; means for receiving, from the context collector, an aggregate context of the context-sharing group; after receiving the aggregate context, means for providing at least a portion of the aggregate context and data corresponding to the user voice input to a remote device that is not participating in the context-sharing group; means for receiving, from the remote device, a command to perform one or more tasks and a device identifier corresponding to the second electronic device, wherein the remote device determines the one or more tasks and the device identifier based on the data corresponding to the user voice input and context information included in the at least a portion of the aggregate context; and means for transmitting the command to the second electronic device based on the device identifier, wherein the command causes the second electronic device to perform the one or more tasks.

Another example system comprises means for: receiving a user voice input and at least a portion of an aggregate context of a context-sharing group associated with a first location from a first electronic device that is participating in the context-sharing group, wherein the context-sharing group is a collection of a plurality of electronic devices that each share context information with at least one other electronic device included in the collection; means for determining a user intent based on the user voice input; means for determining one or more tasks corresponding to the user intent; means for identifying a second electronic device of the plurality of electronic devices to perform the one or more tasks based on the one or more tasks and context information included in the at least a portion of the aggregate context; and means for transmitting, to the first electronic device, a command to perform the one or more tasks and a device identifier corresponding to the second electronic device, wherein the first electronic transmits the command to the second electronic device based on the device identifier, and wherein the command causes the second electronic device to perform the one or more tasks.

Another example first electronic device comprises means for: while the first electronic device is participating in a context-sharing group associated with a first location, wherein the context-sharing group is a collection of a plurality of electronic devices that each share context information with at least one other electronic device included in the collection, and wherein the collection includes a context collector: receiving a user voice input; means for receiving, from the context collector, an aggregate context of the context-sharing group; after receiving the aggregate context, means for providing at least a portion of the aggregate context and data corresponding to the user voice input to a remote device that is not participating in the context-sharing group, wherein the remote device determines a plurality of tasks based on the data corresponding to the user voice input; means for receiving, from the remote device: a first command to perform a first set of tasks of the plurality of tasks and a second command to perform a second set of tasks of the plurality of tasks; and a first device identifier corresponding to a second electronic device of the plurality of electronic devices and a second device identifier corresponding to a third electronic device of the plurality of electronic devices; means for transmitting the first command to the second electronic device based on the first device identifier, wherein the first command causes the second electronic device to perform the first set of tasks; and means for transmitting the second command to the third electronic device based on the second device identifier, wherein the second command causes the third electronic device to perform the second set of tasks.

Another example system comprises means for: while a first electronic device and a second electronic device are participating in a context-sharing group associated with a first location, wherein the context-sharing group is a collection of at least two electronic devices that each share context information with at least one other electronic device included in the collection, and wherein the collection includes a context collector: receiving, at the first electronic device, a first user voice input; means for outputting, at the first electronic device, a first digital assistant response based on the first user voice input, wherein the first electronic device transmits context information including a digital assistant dialog session history for the first electronic device to the context collector after outputting the first digital assistant response; means for receiving, at the second electronic device, a second user voice input; means for receiving, at the second electronic device, an updated aggregate context of the context-sharing group from the context collector, wherein the updated aggregate context includes the digital assistant dialog session history for the first electronic device; and means for outputting, at the second electronic device, a second digital assistant response based on the second user voice input and the digital assistant dialog history for the first electronic device.

Another example first electronic device comprises means for: while the first electronic device is participating in a context-sharing group associated with a first location, wherein the context-sharing group is a collection of at least two electronic devices that each share context information with at least one other electronic device participating in the collection, and wherein the collection includes at least a second electronic device and a context collector: receiving a user voice input, wherein the user voice input includes a digital assistant trigger; in response to detecting the digital assistant trigger, transmitting a first trigger advertisement to the context collector, wherein the first trigger advertisement indicates a first time at which the digital assistant trigger ended according to the first electronic device; receiving, from the context collector, a second trigger advertisement, wherein the second trigger advertisement indicates a second time at which the digital assistant trigger ended according to the second electronic device; determining whether the second time is within a predetermined time range before the first time; and in accordance with a determination that the second time is within the predetermined time range before the first time, forgoing further processing of the user voice input.

In some examples, determining a first context collector score corresponding to a first electronic device based at least on a strength of connectivity between the first electronic device and a wireless network of the first location, and subsequently determining, based on the first context collector score and one or more context collector scores corresponding to at least a second electronic device, which electronic device of the electronic devices included in a context-sharing group to elect as the context collector of the context-sharing group, may improve a user's digital assistant experience. Specifically, determining the first context collector scores based at least on a strength of connectivity between the first electronic device and the wireless network of the first location helps ensure that an electronic device that has a strong connection to the wireless network will be elected as the context collector, as the context collector election is based on determined context collector scores. This in turn improves the stability of the context collector because the context collector is much less likely to lose its connection to the wireless network and leave the context-sharing group. In this manner, the collector will be able to consistently receive and transmit context information to electronic devices participating in the context-sharing group, which will allow the digital assistants of the electronic devices to respond to user requests based on the context information provided to and received from the context collector.

In some examples, providing at least a portion of an aggregate context and data corresponding to a user voice input to a remote device that is not participating in a context-sharing group so that the remote device may determine one or more tasks and a device identifier based on the data corresponding to the user voice input and context information included in at least a portion of the aggregate context, may improve a user's digital assistant experience. Specifically, by performing the above, the remote device is able to, for example, more accurately determine a user intent corresponding to the user voice input, as the context information included in the aggregate context informs the remote device of a user's context when providing the user voice input with respect to all of the devices participating in a context-sharing group instead of only the first electronic device that receives the user voice input. This in turn allows the remote device to determine an optimal electronic device for responding to the user based on the one or more tasks corresponding to the determined user intent and the context information included in the aggregate context. Thus, even if the first electronic device receives the user voice input, the first electronic device may transmit the one or more tasks to another electronic device that is more suitable for performing the one or more tasks (e.g., more closely positioned to the user, better device capabilities for performing the one or more tasks, etc.) based on the device identifier provided by the remote device. Thus, the first electronic device's provision of the aggregate context to the remote device, as well as the first electronic device's transmission of the one or more tasks to a second electronic device based on the received device identifier, allows the digital assistants of the electronic devices participating in a context-sharing group to intelligently coordinate the performance of tasks among one another, which creates an appearance of a single digital assistant that is interacting with the user across the multiple devices instead of multiple individual digital assistants at each of the multiple device.

In some examples, identifying a second electronic device of a plurality of electronic devices participating in a context-sharing group to perform one or more tasks based on the one or more tasks and context information included in at least a portion of an aggregate context of the context-sharing group, may improve a user's digital assistant experience. Specifically, as mentioned above, an electronic device that receives a user's digital assistant request may not be the most optimal device for performing the requested tasks. For example, the electronic device that receives a user's request may not be the most optimal device because the device may have a small display (or no display at all), the request may be directed to an event (e.g., an alarm, a timer, media playback, etc.) occurring at another electronic device, and/or there may be another electronic device that is more conveniently positioned relative to the user. Thus, because the aggregate context includes context information (associated with multiple devices participating in the context-sharing group) that indicates, for example, device capabilities, device position, and current and/or previous device activities and user interactions, a remote device (e.g., one or more servers) may identify a second, more suitable electronic device for performing the one or more tasks based on the context information instead of simply instructing the electronic device that receives the user's request to perform the one or more tasks. This in turn improves the user's digital assistant experience, as it creates an appearance of a single digital assistant that is intelligently interacting with the user across multiple devices in order to provide an optimal response to the user's request.

Transmitting a first command to perform a first set of tasks of a plurality of tasks to a second electronic device and transmitting a second command to perform a second set of tasks of the plurality of tasks to a third electronic device, may improve a user's digital assistant experience. Specifically, when a user's digital assistant request requires the performance of a plurality of tasks such as, for example, the output of a digital assistant response and the display of corresponding data/information, assigning the performance of certain tasks to different devices helps ensure that those tasks are being performed by optimal devices. For example, while the second electronic device may have suitable audio capabilities for providing a digital assistant response, it may have a small display (or no display at all). Thus, instead of displaying data/information on a small display (or not displaying it at all), the second electronic device may be instructed to provide an audio digital assistant response via the first command while the third electronic device (e.g., that has a larger display than the second electronic device) may be instructed to display the corresponding data/information. This in turn improves the user's digital assistant experience, as it creates an appearance of a single digital assistant that is intelligently interacting with the user across multiple devices in order to provide an optimal response to the user's request.

In some examples, outputting, at a second electronic device, a second digital assistant response based on a second user voice input and a digital assistant dialog history for a first electronic device may improve a user's digital assistant experience. Specifically, using a digital assistant dialog history for a first electronic device to determine the second digital assistant response allows a digital assistant of the second electronic device to provide a digital assistant response that is based on, and/or is in furtherance to, a first user input even though the first user input was provided to the first electronic device instead of the second electronic device. In this manner, a user of the second electronic device may provide a digital assistant request (e.g., in the second user input) in a more natural and conversational manner, and without having to repeat certain aspects of a request if those aspects were already introduced in the first user input. For example, if the first user voice input includes the user request "Hey Siri, what's the weather like in Palo Alto?", a user of the second electronic device can subsequently request weather information with respect to New York by providing the second user voice input "Hey Siri, how about in New York?" instead of having to repeat that weather information is desired (e.g., "Hey Siri, what's the weather like in New York?"). This in turn improves the user's digital assistant experience, as it creates an appearance of a single digital assistant that is interacting with the user across multiple devices instead of multiple individual digital assistants at each of the multiple devices.

In some examples, determining whether a second time at which a digital assistant trigger included in a user voice input ended according to a second electronic device is within a predetermined time range before a first time at which the digital assistant trigger ended according to a first electronic device, and forgoing further processing of the user voice input in accordance with a determination that the second time is within the predetermined time range before the first time, may improve a user's digital assistant experience. Specifically, if an electronic device's digital assistant trigger detection is delayed, the electronic device will begin processing a user voice input even if another nearby electronic device (that did not have a delayed digital assistant trigger detection) has already begun processing the user voice input and/or has already provided a response to the user voice input. This in turn may result in multiple devices providing a response to the same user voice input at different times, which may result in a poor digital assistant experience for the user (e.g., due to user confusion and/or annoyance). Accordingly, forgoing further processing of a user voice input if an electronic device determines that another electronic device has already detected a digital assistant trigger (within a predetermined time range) will ensure that multiple devices do not provide a response to the same user voice input at different times, which in turn will improve a user's digital assistant experience.

BRIEF DESCRIPTION OF THE DRAWINGS

FIG. 5B illustrates an exemplary user interface for a multifunction device with a touch-sensitive surface that is separate from the display, according to various examples.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
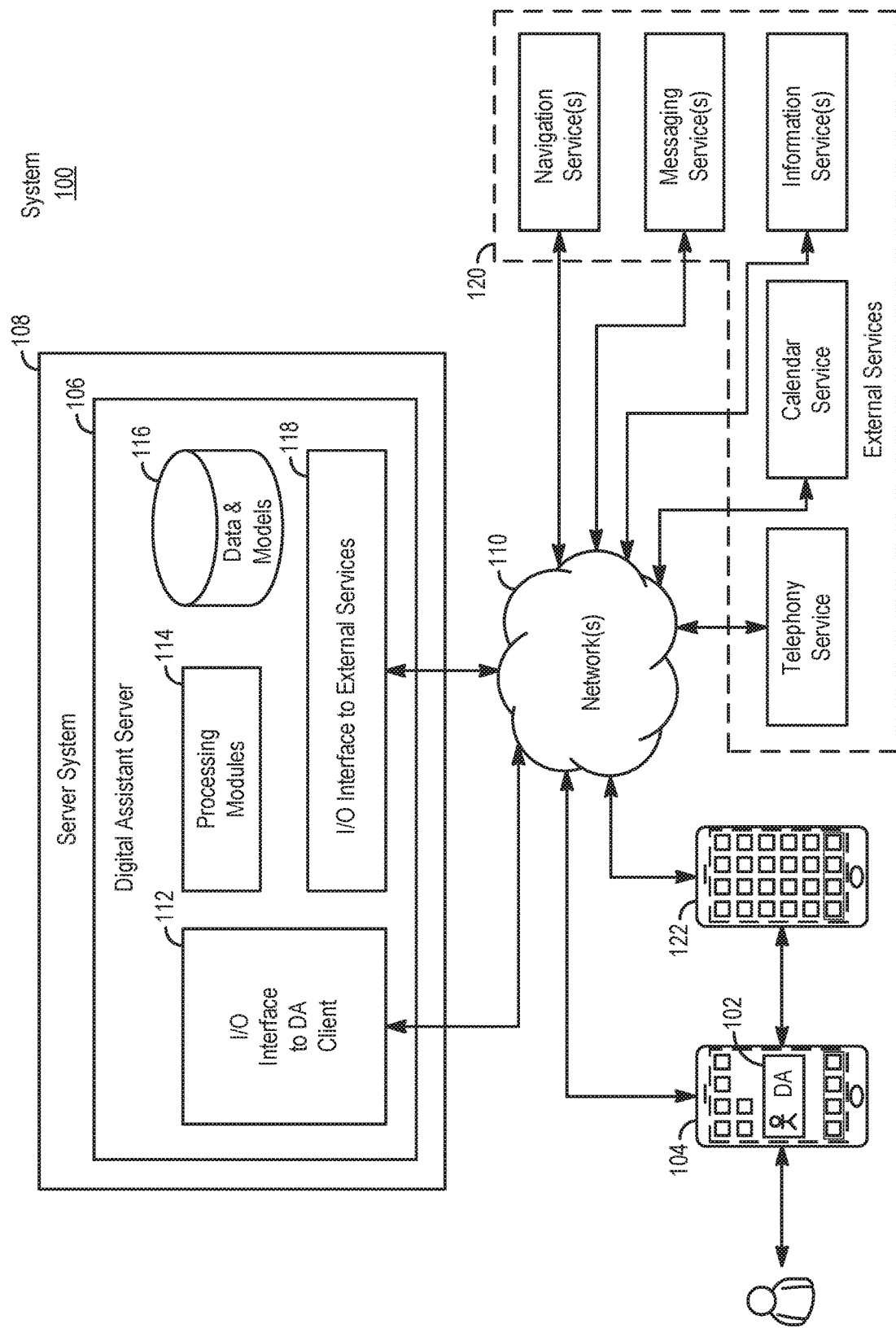
FIG. 1 is a block diagram illustrating a system and environment for implementing a digital assistant, according to various examples.

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIGS. 6A-6B.) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, Calif. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), WiMAX, or any other suitable communication protocol.

Server system 108 is implemented on one or more standalone data processing apparatus or a distributed network of computers. In some examples, server system 108 also employs various virtual devices and/or services of thirdparty service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-6B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
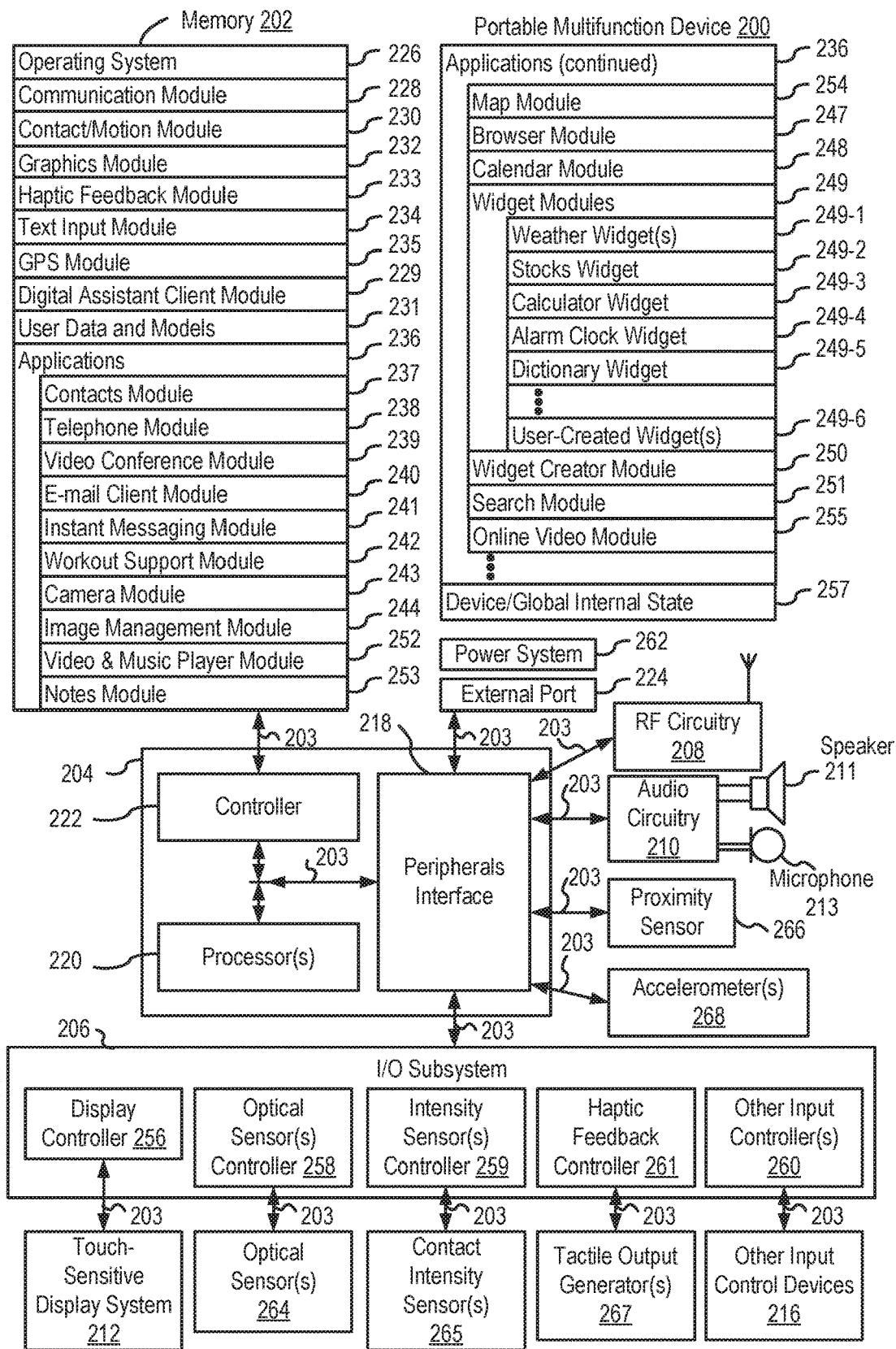
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
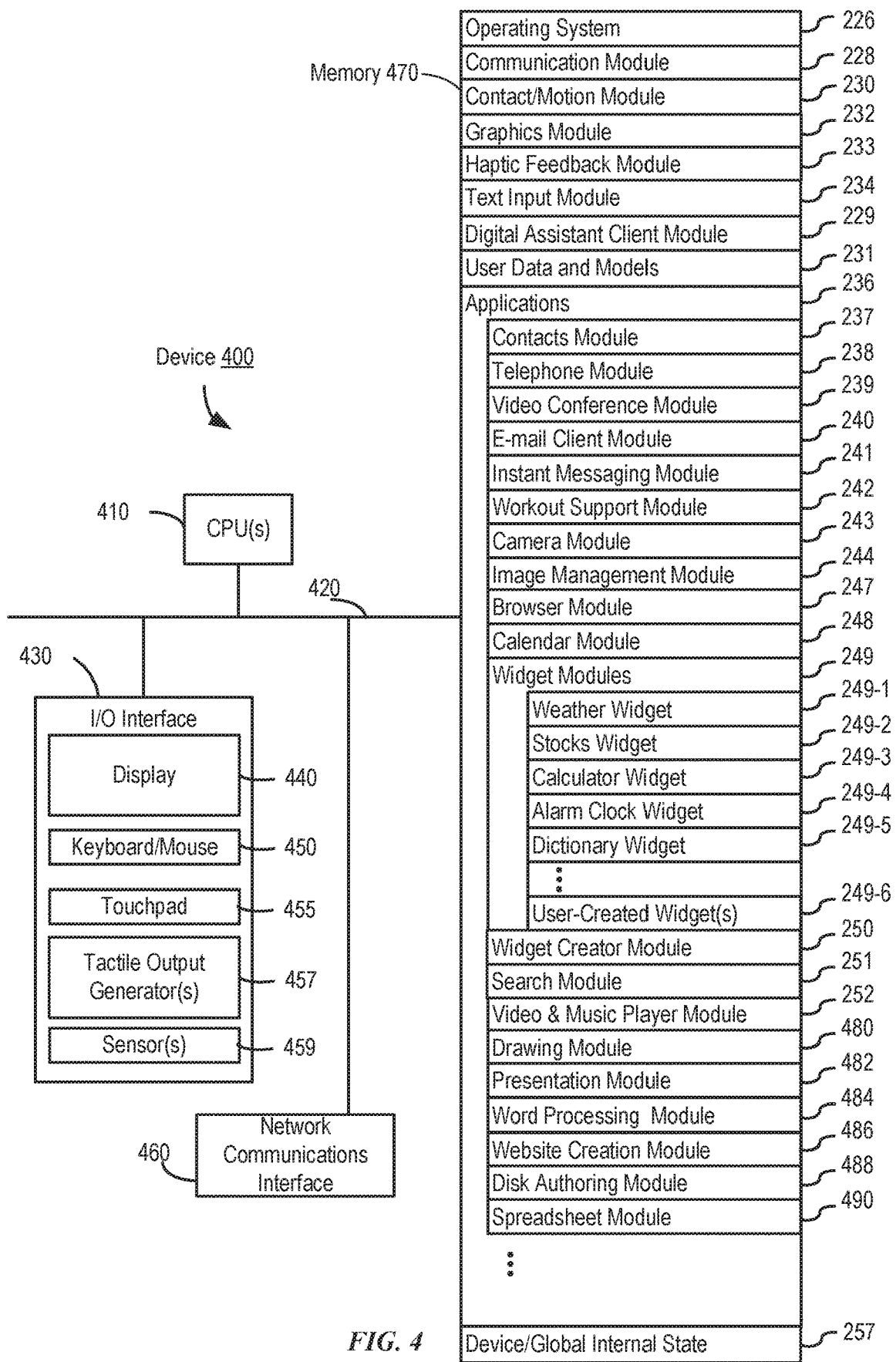
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 include the following modules (or sets of instructions), or a subset or superset thereof:
- Contacts module 237 (sometimes called an address book or contact list);
- Telephone module 238;
- Video conference module 239;
- E-mail client module 240;
- Instant messaging (IM) module 241;
- Workout support module 242;
- Camera module 243 for still and/or video images;
- Image management module 244;
- Video player module;
- Music player module;
- Browser module 247;
- Calendar module 248;
- Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
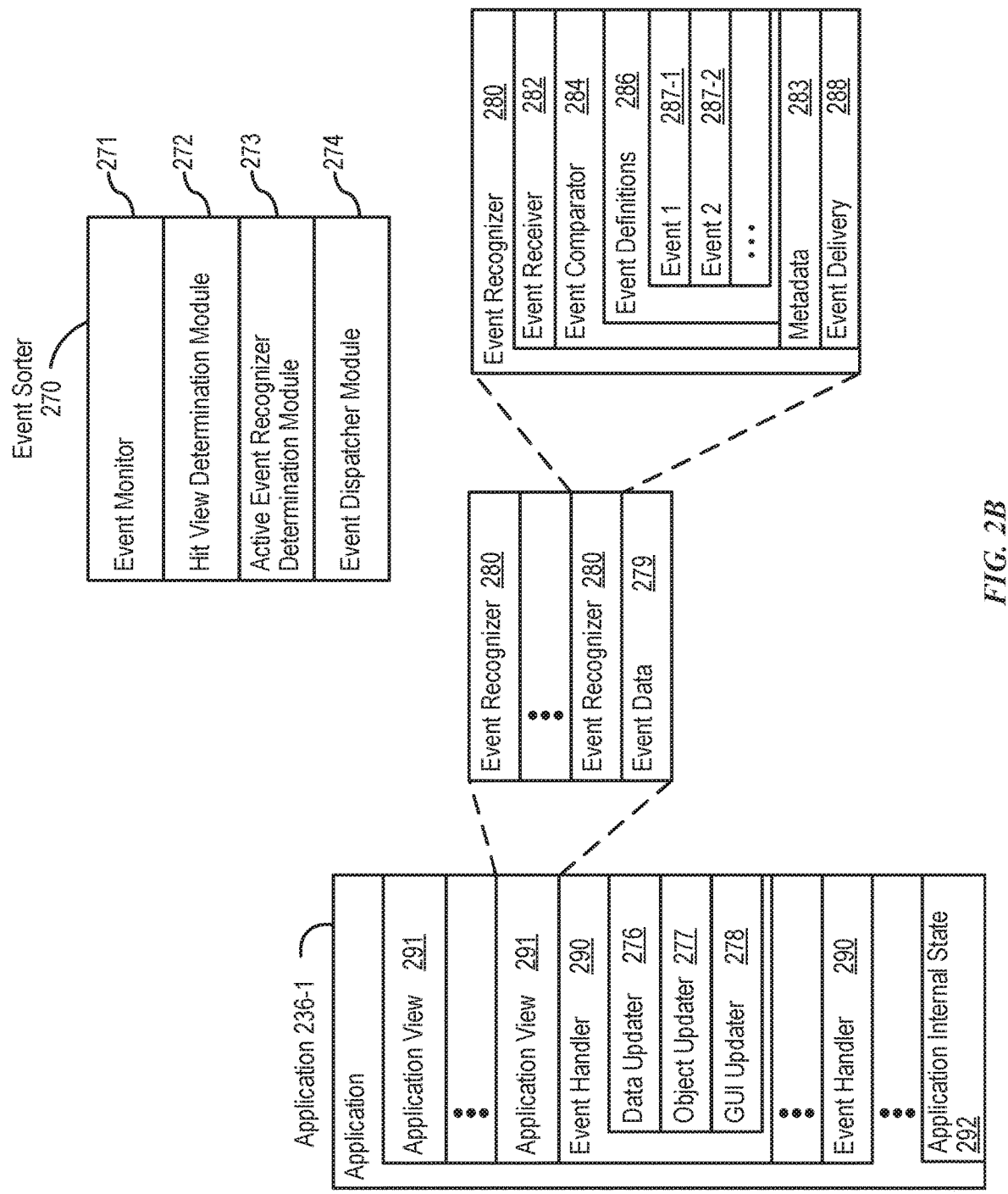
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
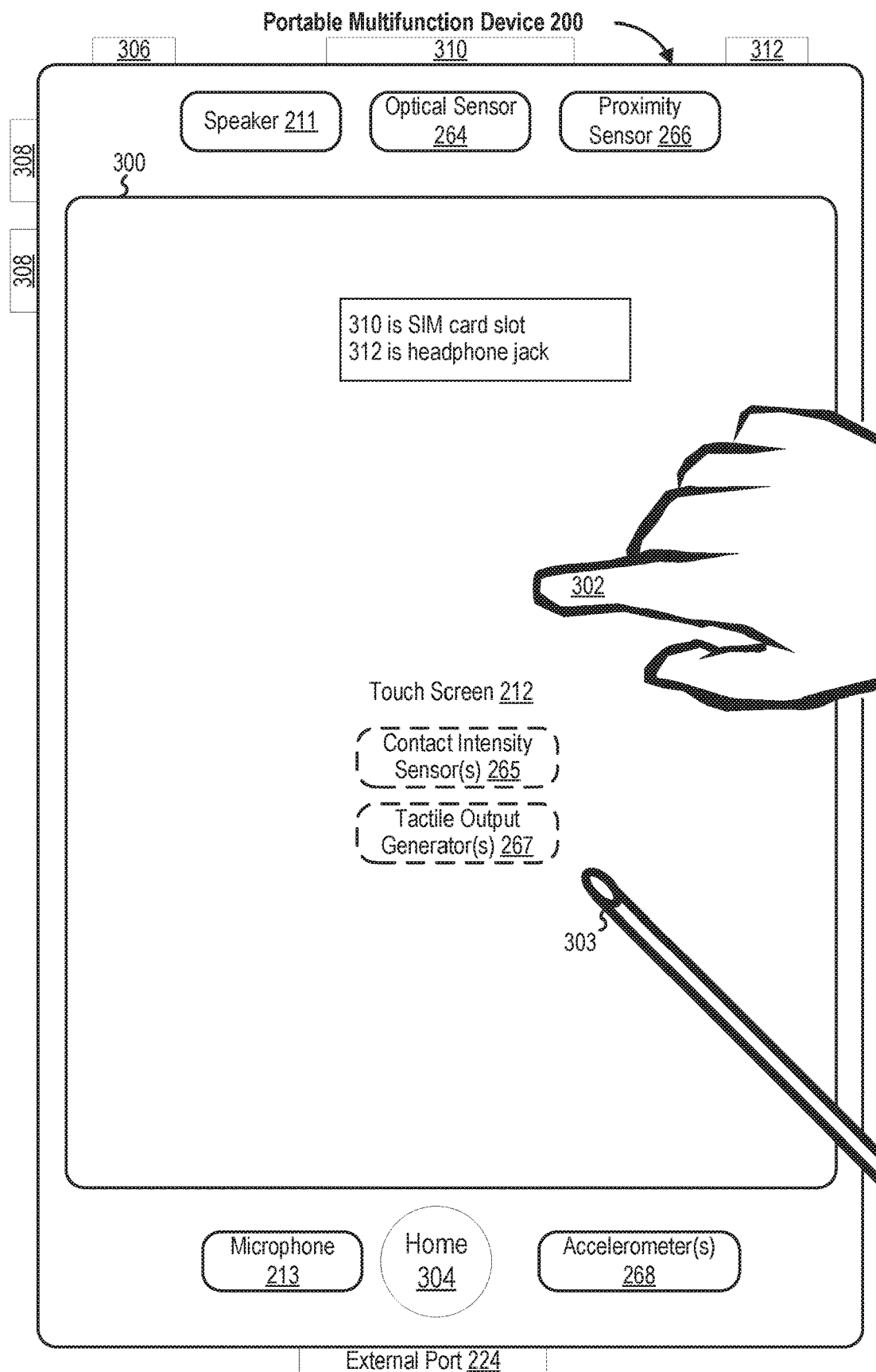
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
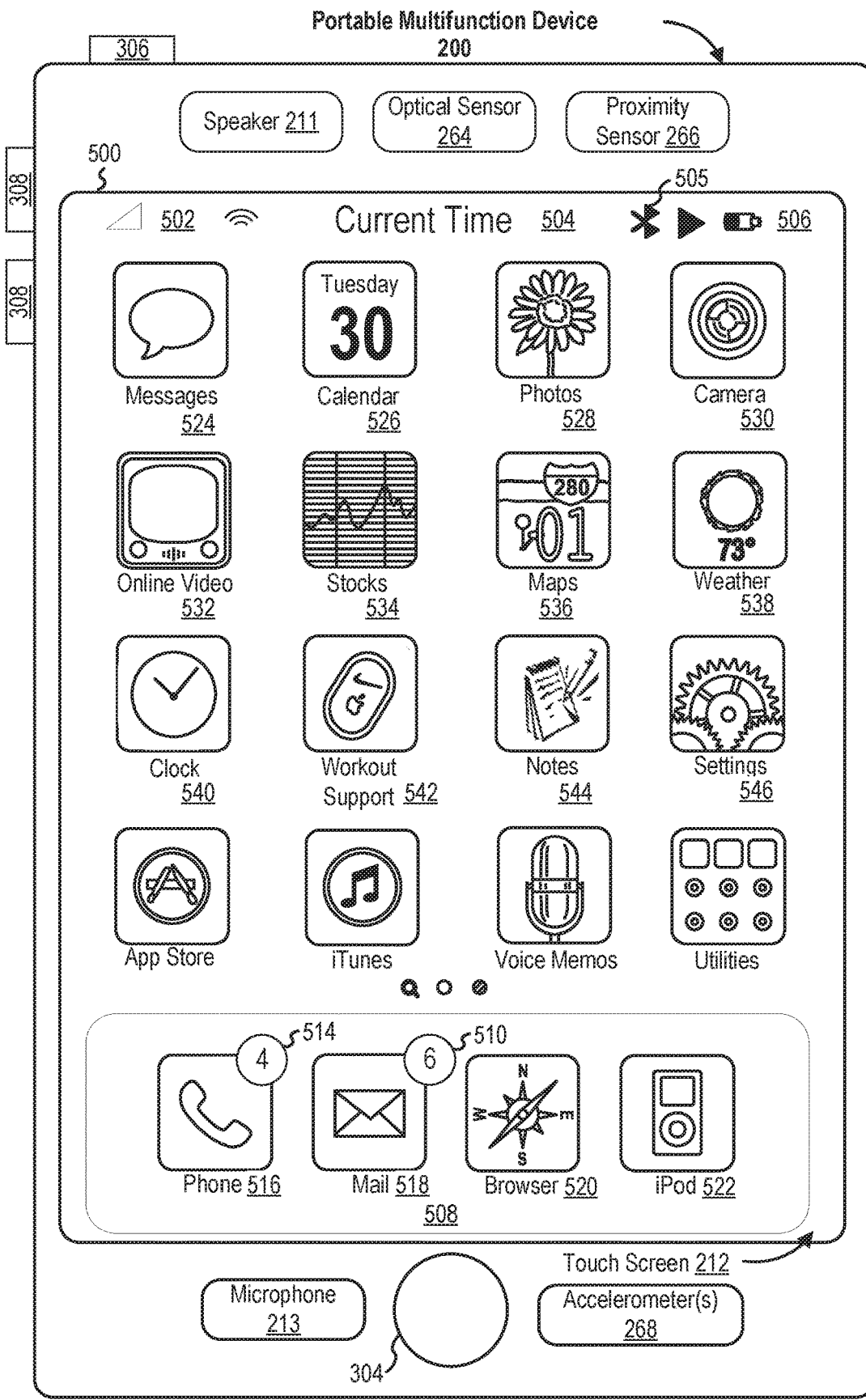
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:
    Icon 516 for telephone module 238, labeled "Phone," which optionally includes an indicator 514 of the number of missed calls or voicemail messages;
    Icon 518 for e-mail client module 240, labeled "Mail," which optionally includes an indicator 510 of the number of unread e-mails;
    Icon 520 for browser module 247, labeled "Browser;" and
    Icon 522 for video and music player module 252, also referred to as iPod (trademark of Apple Inc.) module 252, labeled "iPod;" and
Icons for other applications, such as:
    Icon 524 for IM module 241, labeled "Messages;"
    Icon 526 for calendar module 248, labeled "Calendar;"
    Icon 528 for image management module 244, labeled "Photos;"
    Icon 530 for camera module 243, labeled "Camera;"
    Icon 532 for online video module 255, labeled "Online Video;"
    Icon 534 for stocks widget 249-2, labeled "Stocks;"

Icon 536 for map module 254, labeled "Maps;"
Icon 538 for weather widget 249-1, labeled "Weather;"
Icon 540 for alarm clock widget 249-4, labeled "Clock;"
Icon 542 for workout support module 242, labeled "Workout Support;"
Icon 544 for notes module 253, labeled "Notes;" and
Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
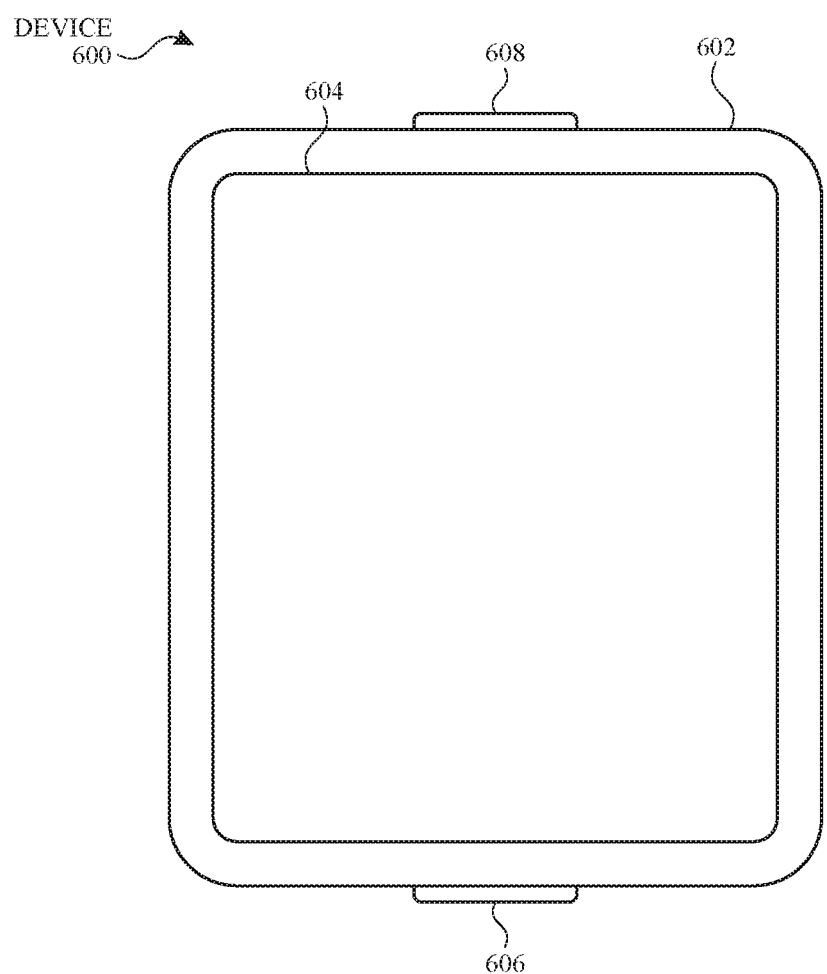
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
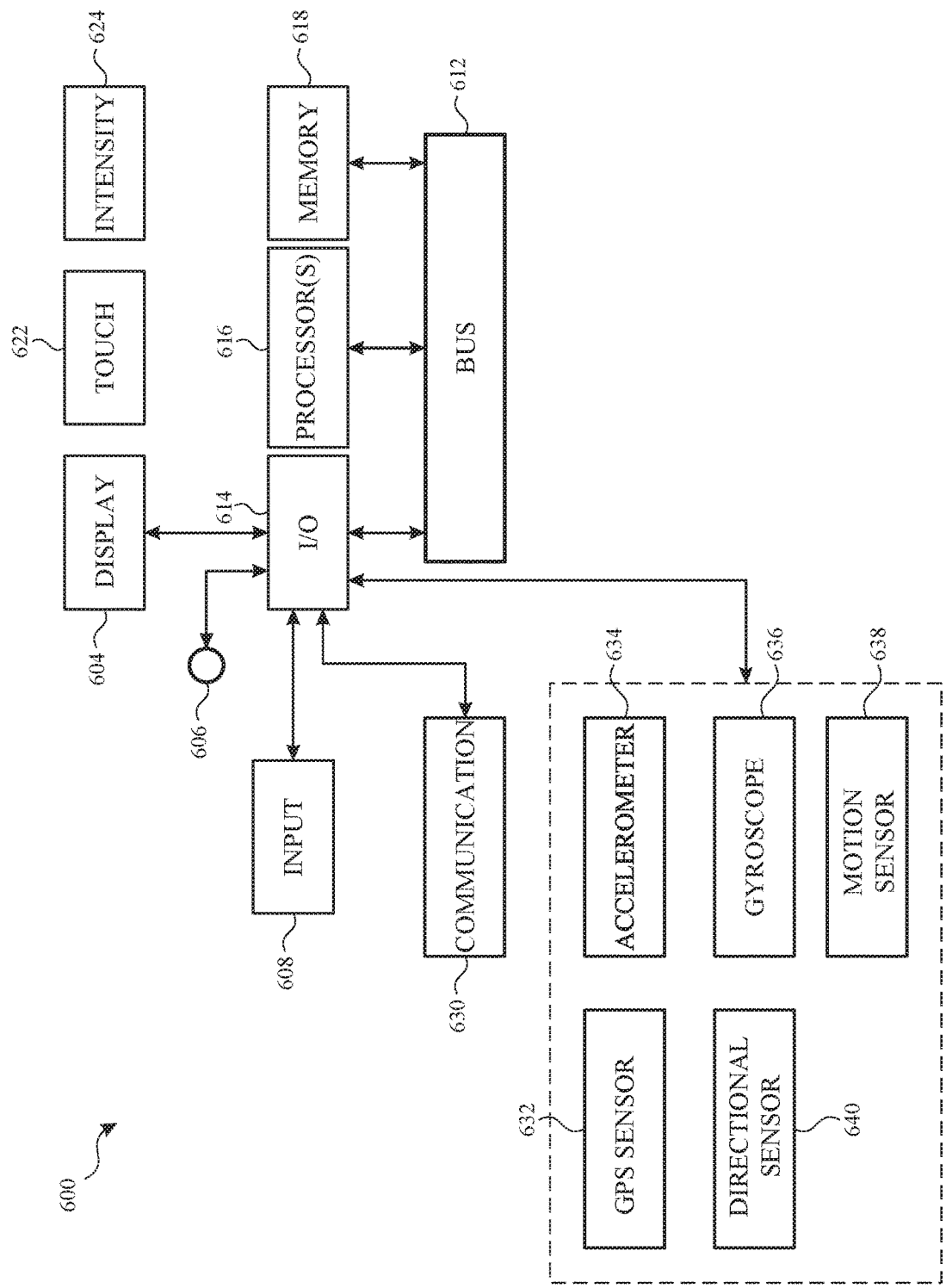
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and/or 600 (FIGS. 2A, 4, and 6A-6B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
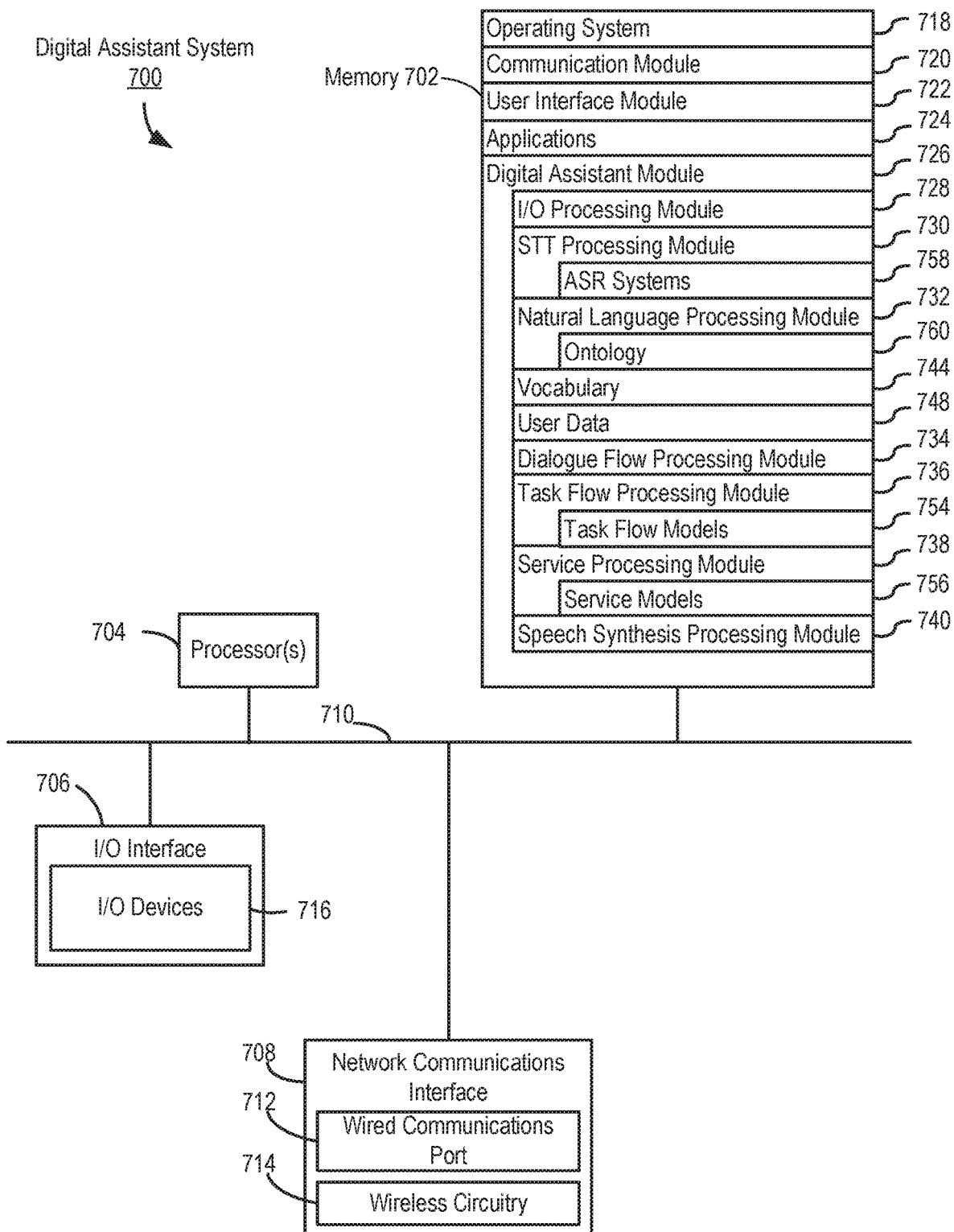
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4, 6A-6B, respectively. In some examples, digital assistant system 700 represents the server portion of a digital assistant implementation, and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-6B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following submodules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
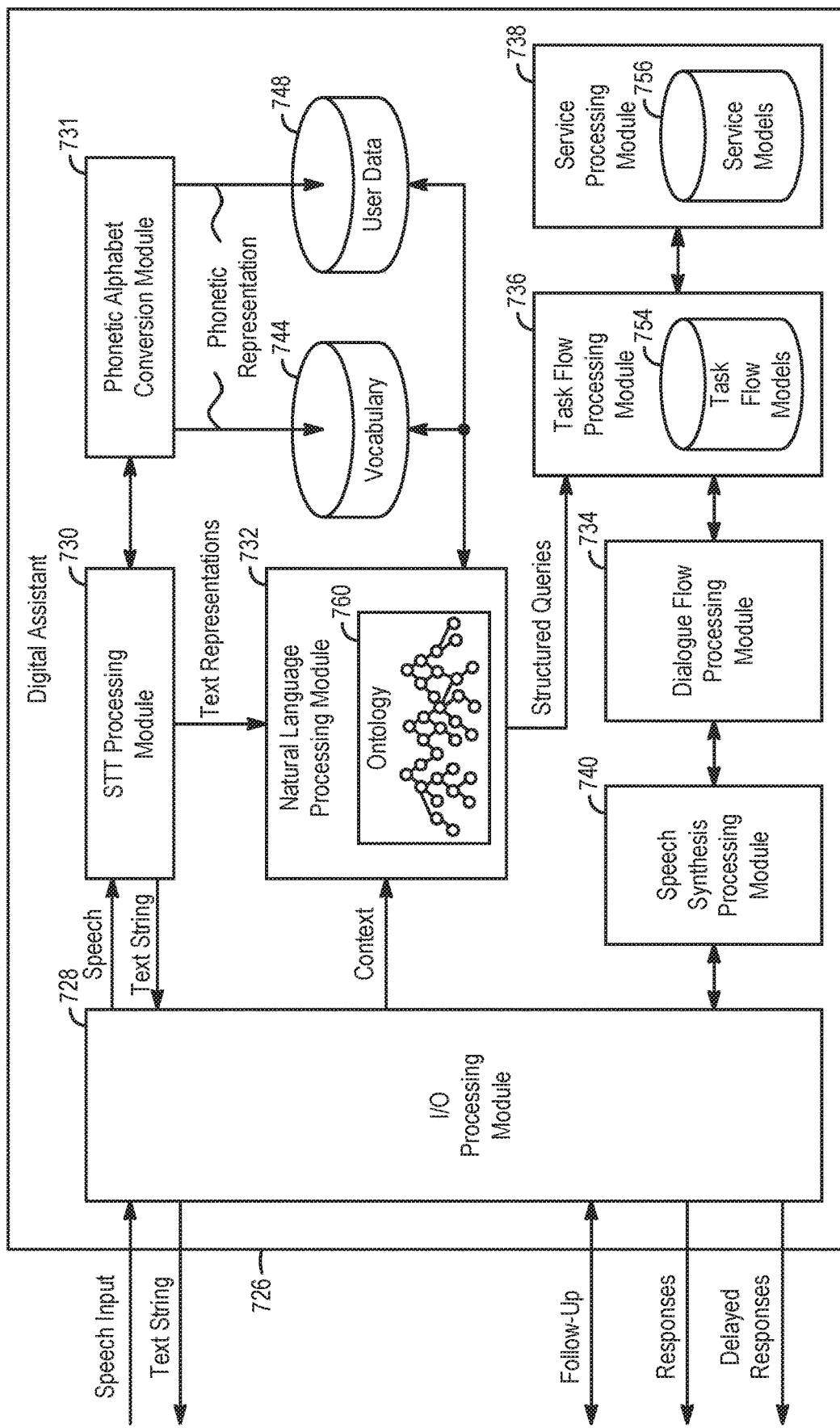
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /tə'meɪroʊ/ and /tə'matoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /tə'meɪroʊ/ is ranked higher than /tə'matoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /tə'meɪroʊ/ is associated with the United States, whereas the candidate pronunciation /tə'matoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) is ranked higher than the candidate pronunciation /tə'matoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /tə'meɪroʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes/tə'meɪroʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
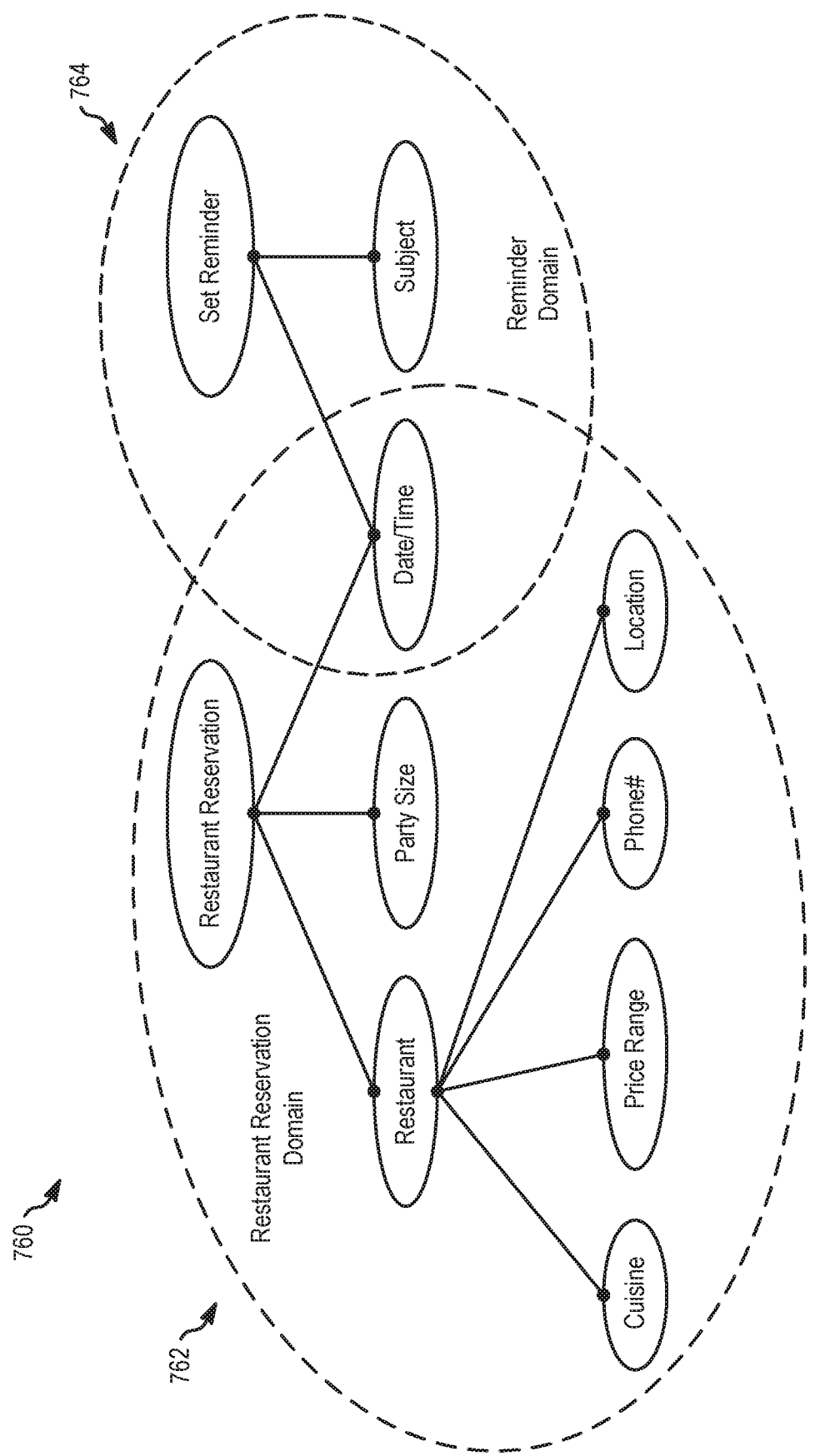
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses.

The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited to, concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

Figure 8:
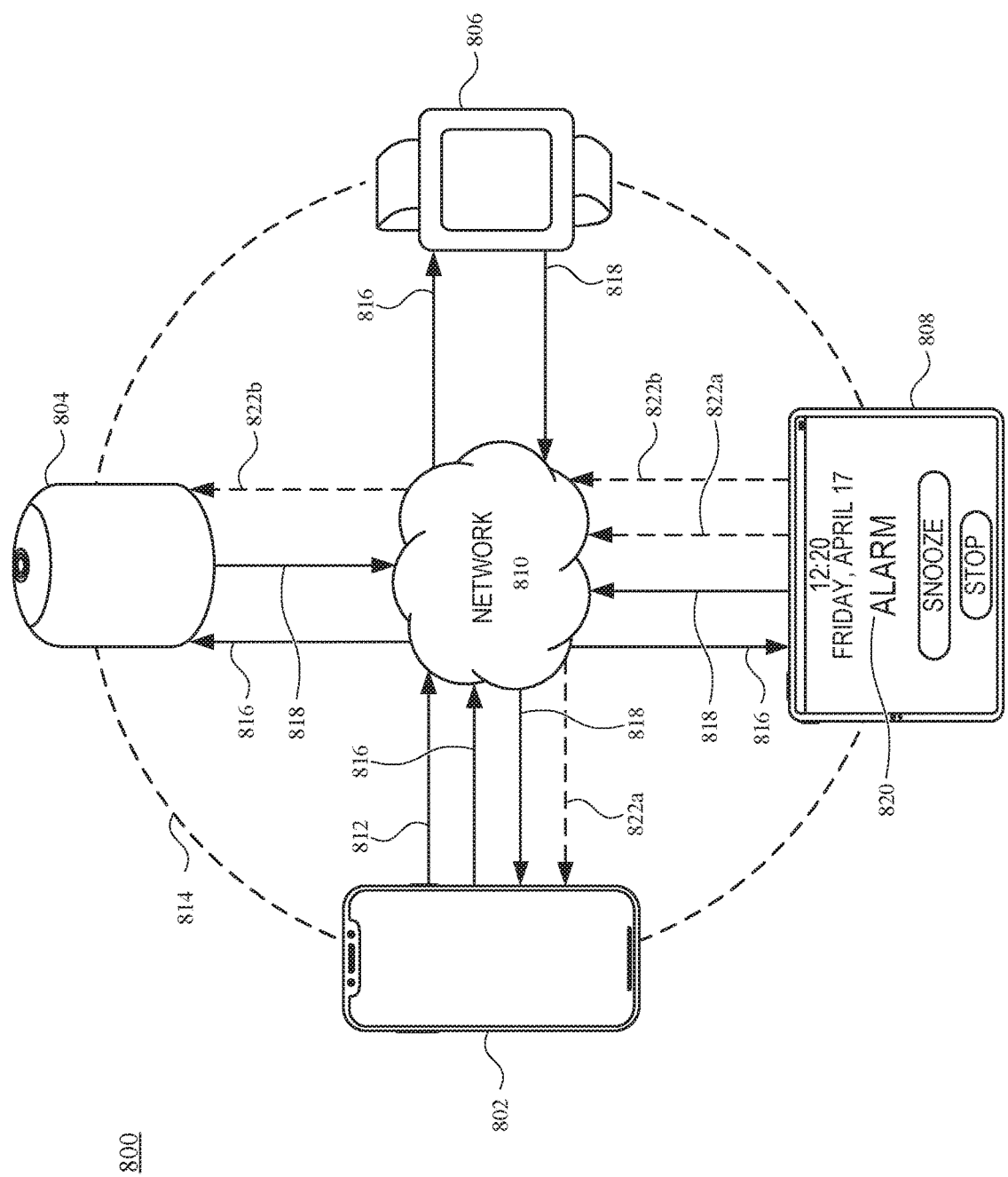
FIG. 8 illustrates a system and technique for electing a context collector of a context-sharing group, according to various examples.

4. System and Technique for Electing a Context Collector of a Context-Sharing Group FIG. 8 illustrates a system and technique for electing a context collector of a device circle, according to various examples. System 800 includes user device 802, communal device 804, user device 806, and user device 808. User device 802, user device 806, and user device 808 are all client devices (e.g., user devices 104, 122, 200, 400, or 600). For example, user device 802 is an iPhone®, user device 806 is an Apple Watch®, and user device 808 is an iPad®. A client device is registered to a single user. For example, user device 802 may be registered to a first user and user device 806 and user device 808 may be registered to a second user. Communal device 804 is a smart speaker that has the same or similar digital assistant capabilities as the various user devices. A communal device is an electronic device that is not registered to a single user or that is registered to multiple users (e.g., such that the communal device may be used by multiple users without additional user registration and/or user authentication requirements). For example, communal device 804 is a HomePod®. Another example of a communal device is a smart TV (e.g., Apple TV®).

System 800 further includes network 810. Network 810 is a wireless communications network (e.g., network(s) 110). In some examples, system 800 includes one or more remote devices (e.g., one or more remote servers (e.g., DA server 106), a local server, a cloud-computing system, or the like). It should be recognized that, in these examples, any of the operations performed by user device 802, communal device 804, user device 806, and/or user device 808 can instead be performed by the one or more remote devices. For example, the one or more servers can perform the operations of the respective DA client modules (e.g., DA client module 229) of user device 802, communal device 804, user device 806, and/or user device 808.

As represented by arrow 812, user device 802 connects to network 810. At this point in the process, communal device 804, user device 806, and user device 808 are also connected to network 810. After user device 802 connects to network 810, user 802 joins context-sharing group 814, which also includes communal device 804, user device 806, and user device 808. A "context-sharing group" (also referred to as a "device circle") is a collection of two or more electronic devices (e.g., within a specific location) that share context information with at least one electronic device participating in the context-sharing group (e.g., with a "context collector" of the context-sharing group). Context-sharing group 814 is associated with a specific location (e.g., a home, an office, or the like). As such, the electronic devices participating in context-sharing group 814 are each located in an area (e.g., a room, a floor, or the like) of the specific location. In some examples, context-sharing group 814 is not associated with a specific location and thus the electronic devices participating in context-sharing group 814 do not need to be located in a single location (e.g., the electronic devices may be located in two separate homes).

In some examples, electronic devices participating in a context-sharing group automatically share context information with a "context collector" of the context-sharing group in response to undergoing a "device state change" (device state changes are described in greater detail below). A context collector is an electronic device that receives, aggregates, and stores context information from electronic devices participating in the context-sharing group. Further, a context collector provides the "aggregate context" of the context-sharing group (which includes context information received from one or more electronic devices participating in the context-sharing group) to one or more electronic devices participating in the context-sharing group (e.g., in response to, for example, requests for the aggregated context information received from the one or more electronic devices). In some examples, the context collector of a context-sharing group is an electronic device (e.g., a user device or a communal device) that is participating in the context-sharing group. In other examples, the context collector is a remote device that is not participating in the context-sharing group and thus does not share its own context information with the electronic devices participating in the context-sharing group. Examples of remote devices that can serve as a context collector include one or more servers (e.g., DA server 106), one or more cloud-computing systems, one or more local servers, or the like.

As will be described below with reference to FIG. 8, an electronic device participating in the context-sharing group is first "elected" (i.e., selected) to be the context collector before it begins receiving and aggregating context information from the other electronic devices participating in the context-sharing group. Note, while FIG. 8 and the corresponding description below discuss the election of a single context collector for context-sharing group 814, in some examples, context-sharing group 814 includes more than one context collector (e.g., two or three context collectors).

In some examples, user device 802 automatically joins context-sharing group 814 in response to connecting to network 810. In some examples, user device 802 must connect to network 810 in order to join context-sharing group 814. In these examples, each of the electronic devices participating in context-sharing group 814 are also connected to network 810. In other words, in these examples, each electronic device participating in context-sharing group 814 must be connected to network 810. In some examples, user device 802 joins context-sharing group 814 without having to connect to network 810. In some of these examples, user device 802 joins context-sharing group 814 upon establishing a communications connection (e.g., a short distance communications connection (e.g., a Bluetooth connection, a Bluetooth Low Energy (BTLE) connection, or the like)) with at least one electronic device that is already participating in the context-sharing group (e.g., with communal device 804).

In some examples, user device 802 must be enrolled in context-sharing group 814 in order to join context-sharing group 814. For example, enrolling user device 802 in context-sharing group 814 may include a user of user device 802 registering user device 802 with context-sharing group 814 via a software application stored on user device 802 that has context-sharing group functionality (e.g., via the HomeKit® application) and/or via a web site that has context-sharing group functionality. This may include user device 802 registering with an already-existing context-sharing group 814 (e.g., created by another electronic device participating in context-sharing group 814) or creating context-sharing group 814 and subsequently registering with context-sharing group 814 after it has been created. In some examples, enrolling in context-sharing group 814 includes user device 802 granting access to/allowing other electronic devices enrolled in context-sharing group 814 to receive, share, store, and/or utilize context information, personal information (e.g., email addresses, home addresses, payment information, or the like), and/or user data (e.g., a user's media, contacts, speech profiles, preferences, or the like) associated with user device 802 (which includes context information, user data, and/or personal information locally stored on user device 802 and/or remotely stored on one or more remote devices (e.g., synced from user device 802 onto one or more servers)).

In the above examples, prior to user device 802 joining context-sharing group 814, user device 802 determines whether or not it is enrolled in context-sharing group 814. Then, user device 802 joins context-sharing group 813 only if it determines that it is enrolled in context-sharing group 814. If user device 802 determines that is it not enrolled in context-sharing group 814, user device 802 forgoes joining context-sharing group 814.

After user device 802 joins context-sharing group 814 (e.g., immediately after or soon after (e.g., several minutes after)), the electronic devices participating in context-sharing group 814 perform a context collector "election," which is a process via which one electronic device of the electronic devices participating in context-sharing group 814 is elected (i.e., selected) as a context collector of the context-sharing group. As mentioned above, in some examples, more than one electronic device participating in context-sharing group 814 is elected as context collector. In some examples, user device 802 (and the other electronic devices participating in context-sharing group 814) performs the context collector election in response to joining context-sharing group 814 (e.g., immediately after joining). In some examples, user device 802 (and the other electronic devices participating in context-sharing group 814) performs the context collector election in response to an electronic device participating in context-sharing group 814 (e.g., a current context collector) leaving the context-sharing group (e.g., disconnecting from network 810, disconnecting from a communications connection with another electronic device participating in context-sharing group 814, and/or leaving the specific location associated with context-sharing group 814). Note, as will be discussed below, the electronic devices participating in context-sharing group 814 may perform a context collector election even if context-sharing group 814 already includes a context collector and even if context-sharing group 814 only allows for a single context collector.

The context collector election begins with user device 802 (and each of the other electronic devices participating in context-sharing group 814) determining a collector score based on a strength of connectivity between user device 802 and network 810 and/or based on a power source status of user device 802 (e.g., wired power connection versus battery power and/or amount of battery power remaining). For example, a stronger connection between user device 802 and network 810 will result in a higher context collector score. Similarly, the more stable the power source of user device 802 is, the higher the context collector score for user device 802 will be (e.g., with a wired power connection being more stable than battery power, and with a full battery being more stable than a low battery). In some examples, the collector score is further based on a frequency of movement of user device 802 in and out of context-sharing group 814 (e.g., a frequency of user device 802 connecting to/disconnecting from network 810 and/or a frequency of user device 802 entering and/or leaving the specific location associated with context-sharing group 814). In some examples, the context collector score is further based on a stability with which user device 802 holds context information in its memory. In some examples, the context collector score is further based on a stability of communication connections between user device 802 and the other electronic devices participating in context-sharing group 814. In some examples, the context collector score is further based on a reachability of user device 802 to other electronic devices participating in context-sharing group 814 (e.g., the more devices user device 802 can reach through various network/other communication protocols, the higher the context collector score). The above factors that are considered when determining a context collector score emphasize the stability of an electronic device's participation in a context-sharing group, ability to communicate with other electronic devices, and/or ability to store context information, as it is desirable for context-sharing group 814 to have a context collector that is available as often as possible to receive, aggregate, store, and/or transmit context information.

As represented by arrows 816, after user device 802 determines a context collector score, user device 802 transmits the context collector score (e.g., data corresponding to the context collector score) to each of the other electronic devices participating in context-sharing group 814 (i.e., communal device 804, user device 806, and user device 808) via network 810. In some examples, user device 802 further transmits a context collector indication (also referred to as a context collector "flag") that indicates whether or not user device 802 is currently a context collector. For example, user device 802 transmits the context collector indication at the same time as, or soon after, transmitting its context collector score. The context collector indication of user device 802 will indicate that user device 802 is a context collector if (1) user device 802 was previously elected as context collector after joining context-sharing group 814 (i.e., after connecting to network 810 as represented by arrow 812) and/or if (2) user device 802 was elected as context collector the last time user device 802 participated in context-sharing group 814 (i.e., prior to leaving context-sharing group 814 and once again joining context-sharing 814 after connecting to network 810 as represented by arrow 812). Otherwise, the context collector indication will indicate that user device 802 is not a context collector.

As represented by arrows 818, communal device 804, user device 806, and user device 808 each transmit their respective context collector scores (and, in some examples, their respective context collector indications) to user device 802 before, at the same time, or soon after user device 802 transmits is context collector score (and, in some examples, its context collector indication as represented by arrow 816). Although not shown in FIG. 8, communal device 804, user device 806, and user device 808 also transmit their respective context collector scores (and, in some examples, their respective context collector indications) to one another. In this manner, after arrows 816 and arrows 818, each electronic device that is participating in context-sharing group 814 will possess a context collector score (and, in some examples, a context collector indication) corresponding to each of the other electronic devices participating in context-sharing group 814.

After receiving the context collector scores, user device 802 (and the other electronic devices participating in context-sharing group 814) determines which electronic device of the electronic devices participating in context-sharing group 814 to elect as the context collector based on the context collector scores. The other electronic devices also make this determination based on the context collectors scores that have been provided. Determining which electronic device of the electronic devices included in context-sharing group 814 to elect as the context collector includes user device 802 comparing its own context collector score to the context collector scores received from communal device 804, user device 806, and user device 808. The other electronic devices also compare their own context collector score to the scores they have received. Then, based on the comparison, user device 802 (and the other electronic devices participating in context-sharing group 814) identifies the highest context collector score and elects the electronic device with the highest context collector score as context collector.

Since communal device 804, user device 806, and user device 808 make the above determination based on the same data and information as user device 802, they each also elect the same electronic device to be context collector as user device 802. Thus, an electronic device participating in context-sharing group 814 will be aware of whether or not it is elected as context collector based on its own context collector score comparison. However, in some examples, each electronic device participating in context-sharing group 814 transmits an election indication to the other electronic devices that indicates the context collector that each electronic device elected.

In the examples described above where user device 802, communal device 804, user device 806, and user device 808 each transmit a context collection indication, determining which electronic device of the electronic devices participating in context-sharing group 814 to elect as the context collect further includes user device 802 (and the other electronic devices participating in context-sharing group 814) determining whether or not context-sharing group 814 currently includes a context collector based on the received context collector indications. In these examples, if user device 802 determines that context-sharing group 814 already includes a context collector, then user device 802 elects the existing context collector as context collector of context-sharing group 814 regardless of the context collector score comparison outcome. If user device 802 determines that context-sharing group 814 already includes two or more context collectors, then user device 802 elects a context collector based on the determined context collector scores (as described above). This in turn improves the stability of the context collector, as it ensures that the context collector of context-sharing group 814 will not change unless the existing context collector leaves context-sharing group 814.

Note, in the examples mentioned above in which context-sharing group 814 includes more than one (e.g., two) context collectors, user device 802 (and the other electronic devices participating in context-sharing group 814) will elect a context collector based on a comparison of the determined context collector scores if the received context collector indications indicate that context-sharing group 814 includes more than the allowable number of context collectors. For example, if context-sharing group can include two context collectors and the received context collector indications indicate that there are currently two context collectors participating in context-sharing group 814, then user device 802 will elect the two existing context collectors regardless of the context collector score comparison outcome. However, if the received context collector indications indicate that there are currently three or more context collectors participating in context-sharing group 814, then user device 802 will elect a context collector based on a comparison of the determined context collector scores.

If, for example, user device 802 (and the other electronic devices participating in context-sharing group 814) elect user device 802 as context collector of context-sharing group 814, user device 802 will establish a communications connection with communal device 804, user device 806, and user device 808 (via network 810) so that user device 802 may receive context information from one or more of those electronic devices and transmit an aggregate context of context-sharing group (e.g., a stored collection of context information received from one or more (e.g., each) electronic devices participating in context-sharing group 814) to one or more of those electronic devices (e.g., in response to a received request for the aggregate context). Communal device 804, user device 806, and user device 808 will similarly establish communications connections with the other electronic device participating in context-sharing group 814 if one of those electronic devices is elected as context collector.

As mentioned above, in some examples, electronic devices participating in a context-sharing group automatically share context information with a context collector of a context-sharing group in response to undergoing a "device state change." Examples of a device state change include media playback, activation (e.g., opening) of a stored software application, a timer event (e.g., a timer of an electronic device going off), an alarm event (e.g., an alarm of an electronic device going off), a change in power state (e.g., an electronic device is turned on or off), a change in display visibility (e.g., a display of an electronic device is repositioned from a display down position to a display up position (such that the display is visible to a user of the electronic device in the display up position)), detection of a digital assistant trigger word or phrase (e.g., "Hey Siri," "Siri," or the like), initiation of a digital assistant dialog session via the pressing or holding of a physical button on a device, and an end of a digital assistant dialog session (e.g., after a digital assistant of an electronic device provides/outputs a digital assistant response to a user request).

For example, as shown in FIG. 8, user device 808 undergoes a device state change once alarm event 820 begins. Thus, user device 808 transmits context information associated with user device 808 to the elected context collector of context-sharing group 814 soon after (e.g., immediately after or several seconds after (e.g., 0.5 seconds after, 1 second after, or the like)) alarm event 820 begins. As represented by arrows 822a, if user device 802 is elected as context collector, user device 808 transmits context information to user device 802. Alternatively, as represented by arrows 822b, if communal device 804 is elected as context collector, user device 808 transmits context information to communal device 804. In addition to transmitting the context information to the context collector (e.g., user device 802 or communal device 804), user device 808 transmits a device identification (also referred to as a device identifier) to the context collector (e.g., with the context information). In some examples, the device identifier is predetermined (e.g., a predetermined serial number or the like). In some examples, the device identifier is randomly generated by user device 808 (e.g., a randomly generated number). In some examples, user device 808 is assigned a device identifier by the context collector of context-sharing group 814 upon joining context-sharing group 814.

In response to receiving the device identifier, the context collector stores an association between user device 808 and the device identifier. As will be described in greater detail below with reference to FIG. 9, the stored associations between electronic devices and their device identifiers are used to transmit commands to specific electronic devices. Specifically, in some examples, the context collector informs the electronics devices participating in a context-sharing group of the stored associations so that each of the electronic devices is capable of relaying/transmitting commands (e.g., that are received from a remote device) to one or more other electronic devices based on the device identifiers corresponding to the one or more other electronic devices. The context collector also associates the device identifier corresponding to user device 808 with the context information received from user device 808 when adding the context information to the stored aggregate context of context-sharing group 814. In this manner, the context information included in the aggregate context may be organized based on its associated device identifier. As will be described in greater detail below with reference to FIG. 9, one or more remote devices (e.g., one or more servers) use the device identifiers included in the aggregate context when selecting one or more electronic devices to perform one or more tasks in response to a user request.

The context information transmitted by an electronic device (e.g., user device 808) in response to undergoing a device state change includes various types of context information associated with the electronic device. Examples of context information that an electronic device transmits in response to undergoing a device state change include device state change information (e.g., a state change type (e.g., timer event, alarm event, end of digital assistant dialog session, etc.), a state change time, or the like), device capability information (e.g., type of device, processing power, memory availability, display information (e.g., whether a device has a display and/or a size of the display), speaker information (e.g., whether a device has a speaker and/or a loudness of the speaker), and/or the like), and contextual state information (e.g., device location (e.g., based on GPS data from GPS module 235 and/or information from a software application that has context-sharing group functionality (e.g., HomeKit®)), display visibility (e.g., display up or down), user attention information (e.g., whether a user is currently looking at the device display (e.g., based on information from an optical sensor 264 on the front and/or back of a device)), strength of network connection (e.g., to network 810), amount of battery power, type of power source (e.g., battery vs wired power source), and/or the like).

As discussed above, the elected context collector of context-sharing group 814 receives the above context information from one or more electronic device participating in context-sharing group 814 and subsequently aggregates and stores that context information in an aggregate context. Further, the context collector updates the aggregate context as it receives additional context information from the one or more electronic devices. For example, if user device 808 were to undergo another device state change after alarm event 820, user device 808 would send its most up-to-date/recent context information to the context collector of context-sharing group 814 so that the context collector may incorporate new context information associated with user device 808 into the aggregate context and/or remove outdated/previous context information associated with user device 808 from the aggregate context (e.g., remove previous context information that is different from/conflicts with newly-received context information).

In some examples, the context collector only stores the most recent context information received from each electronic device participating in context-sharing group 814 (because the context collector removes/deletes previously-received context information associated with a device after receiving new context information associated with the same device). In some examples, the context collector stores context information associated with an electronic device for a predetermined period of time (e.g., 1 hour, 1 day, 1 week, or the like) before removing/deleting the context information. In some examples, the context collector stores context information associated with an electronic device from a predetermined number (e.g., 3, 5, 10, or the like) of previous context information transmissions. For example, the context collector may store context information from each electronic device's last five context information transmissions. In some examples, the context collector stores a short history of events for each electronic device. In some examples, this short history is based on a type of event. For example, the context collector may store data corresponding to each electronic device's last three alarm events. In some examples, the context collector removes/deletes an electronic device's context information when the electronic device leaves context-sharing group 814.

Then, as will be described in greater detail below with reference to FIGS. 9, 10, and 12A-13, the context collector transmits the aggregate context (or, at least a portion of the aggregate context) to one or more electronic devices participating in context-sharing group 814 in response to receiving a request for the aggregate context from the one or more electronic devices. In some examples, transmitting the aggregate context to the one or more electronic devices causes the one or more electronic devices to obtain a digital assistant response to a user request based on the aggregate context (or, based on at least a portion of the aggregate context).

5. System and Technique for Task Performance in a Context-Sharing Group

Figure 9:
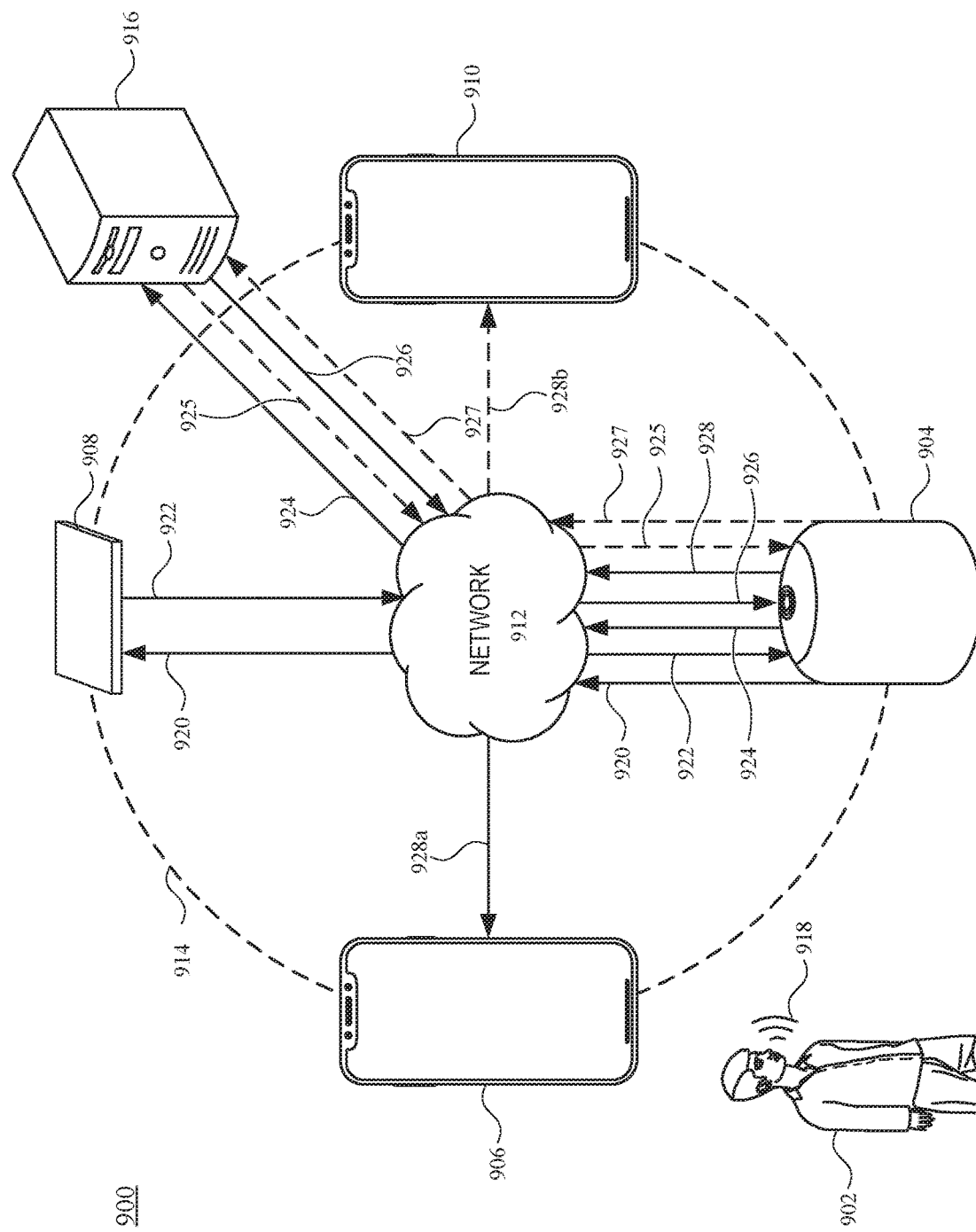
FIG. 9 illustrates a system and technique for performing one or more tasks in a context-sharing group, according to various examples.

FIG. 9 illustrates a system and technique for performing one or more tasks in a context-sharing group, according to various examples. System 900 includes communal device 904, user device 906, communal device 908, and user device 910, all of which are participating in context-sharing group 914 (which is associated with a specific location (e.g., a home, an office, or the like)). User device 906 and user device 910 are both client devices (e.g., user devices 104, 122, 200, 400, or 600). For example, user device 906 and user device 910 are both an iPhone®. In the examples described below, user device 906 is registered to user 902 whereas user device 910 is not registered to user 902. Communal device 904 is a smart speaker that has the same or similar digital assistant capabilities as the user devices. Communal device 908 is a smart TV (connected display not shown) that has the same or similar digital assistant capabilities as the user devices. Communal device 908 is the context collector of context-sharing group 914 (e.g., because communal device 908 was previously elected to be context collector). As discussed above with reference to FIG. 8, communal devices are not registered to a single user or are registered to multiple users (e.g., such that the communal device may be used by multiple users without additional user registration and/or user authentication requirements). For example, communal device 904 is a HomePod® and communal device 910 is an Apple TV®.

System 900 further includes network 912 and server 916 (e.g., DA server 106). Network 912 is a wireless communications network (e.g., network(s) 110). As shown, communal device 904, user device 906, communal device 908, and user device 910 communicate with one another and with server 916 via network 912 (and thus are each connected to network 912). Further, server 916 is a remote device that is not participating in context-sharing group 914. In some examples, system 900 includes one or more other remote devices (e.g., a local server, a cloud-computing system, or the like) instead of server 916. It should be recognized that, in these examples, any of the operations performed by communal device 904, user device 906, communal device 908, and/or user device 910 can instead be performed by server 916. For example, server 916 can perform the operations of the respective DA client modules (e.g., DA client module 229) of communal device 904, user device 906, communal device 908, user device 806, and/or user device 910.

As shown in FIG. 9, user 902 provides user voice input 918 (e.g., "Hey Siri, stop the timer." or "Hey Siri, play music."), which is received by communal device 904. User voice input 918 includes a digital assistant trigger. A digital assistant trigger is a word or phrase that initiates a dialog session with a digital assistant of an electronic device (e.g., "Hey Siri," "Siri," of the like). Thus, after receiving user voice input 918, communal device 904 detects the digital assistant trigger (e.g., determines that user voice input 918 includes the digital assistant trigger), determines that user voice input 918 represents a digital assistant request (based on the detection of the digital assistant trigger), and begins processing user voice input 918 to determine and/or obtain a response to user voice input 918 (e.g., the performance of one or more tasks and/or the output of a digital assistant response).

Typically, it takes a communal device/user device less than 2 seconds (e.g., 1 second, 1.5 seconds, or the like) to begin processing a user voice input as described above from when the communal device/user device detects the digital assistant trigger. During this time, the communal device/user device communicates (e.g., via a wireless network (e.g., network 912) and/or a short distance communication connection (e.g., Bluetooth, BTLE, or the like)) with one or more nearby electronic devices (e.g., a second communal device/user device participating in the same context-sharing group) that also received the user voice input and detected the digital assistant trigger included in the user voice input in order to determine which device should process the received user voice input.

However, in some examples, a communal device/user device (e.g., participating in a context-sharing group) that receives the user voice input takes longer than 2 seconds (e.g., 3 seconds, 5 seconds, or the like) to detect the digital assistant trigger included in the voice input, and thus misses out on the opportunity to communicate with other nearby electronic devices that detected the digital assistant trigger within the two-second window and determine which device will respond to the user voice input. As such, the communal device/user device with the delayed digital assistant trigger detection will begin processing the user voice input even if another communal device/user device (that did not have a delayed digital assistant trigger detection) has already begun processing the user voice input and/or has already provided a response to the user voice input. This in turn may result in multiple devices (participating in the same context-sharing group) providing a response to the same user voice input at different times, which may result in a poor user experience (e.g., due to user confusion and/or annoyance). For example, if user device 906 also receives user voice input 918 but detects the digital assistant trigger included therein 3 seconds after communal device 904 detects the digital assistant trigger, user device 906 and communal device 904 may each end up providing a response to user voice input 918 (e.g., at different times). Accordingly, it can be desirable to suppress a communal device's and/or user device's delayed digital assistant trigger detection.

Figure 10:
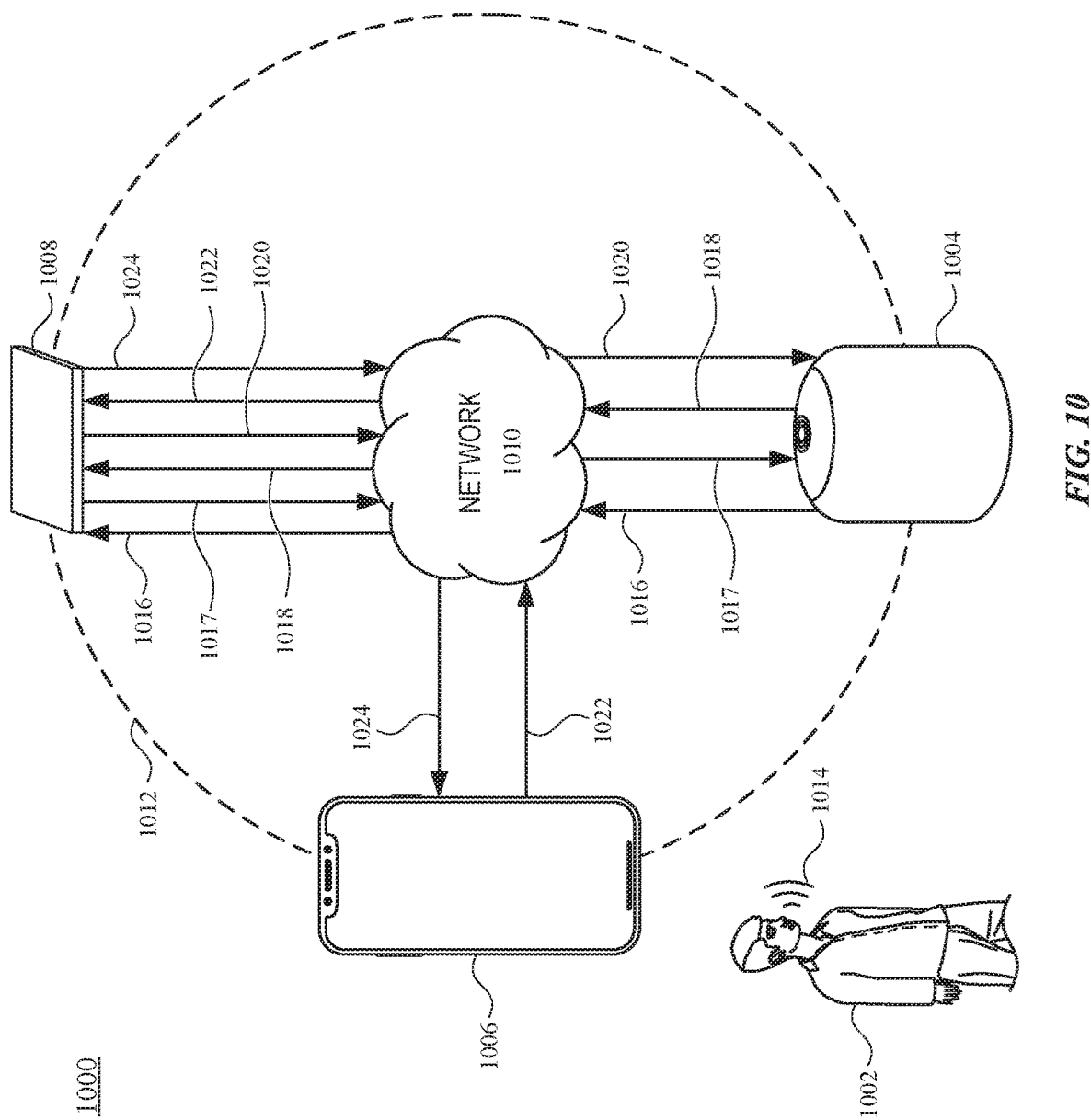
FIG. 10 illustrates a system and technique for suppressing a delayed digital assistant trigger detection using a context collector of a context-sharing group, according to various examples.

FIG. 10 illustrates a system and technique for suppressing a delayed digital assistant trigger detection using a context collector of a context-sharing group, according to various examples. System 1000 is similar to system 900. Specifically, system 1000 includes communal device 1004 (corresponding to communal device 904), user device 1006 (corresponding to user device 906), and communal device 1008 (corresponding to communal device 908), all of which are participating in context-sharing group 1012 (corresponding to context-sharing group 914). System 1000 further includes network 1010 (corresponding to network 912). For simplicity, a user device corresponding to user device 910 and a server corresponding to server 916 are not shown. As with system 900, communal device 1008 is the context collector of context-sharing group 1012 in the examples described below (e.g., because communal device 1008 was previously elected to be context collector).

It should be recognized that, in these examples, any of the operations performed by communal device 1004, user device 1006, and communal device 1008 can instead be performed by one or more servers (e.g., a server corresponding to with server 916) and/or one or more other remote devices (e.g., a cloud-computing system). For example, one or more servers can perform the operations of the respective DA client modules (e.g., DA client module 229) of communal device 1004, user device 1006, and/or communal device 1008.

As shown in FIG. 10, user 1002 provides user voice input 1014 (e.g., corresponding to user voice input 918 (e.g., "Hey Siri, stop the timer." or "Hey Siri, play music.")) that includes a digital assistant trigger. User voice input 1014 is received by communal device 1004 and user device 1006 (e.g., because communal device 1004 and user device 1006 are located near one another (e.g., in the same room)). However, communal device 1004 detects the digital assistant trigger before user device 1006. Thus, while user device is still determining whether user voice input 1014 includes a digital assistant trigger, communal device 1004 initiates a digital assistant dialog session. Further, as represented by arrows 1016, communal device 1004 transmits contextual information (and a device identifier corresponding to communal device 1004) to communal device 1008 (because the detection of a digital assistant trigger is a device state change and communal device 1008 is the context collector). For example, communal device 1004 transmits the contextual information and device identifier in response to detecting the digital assistant trigger.

Because the device state change of communal device 1004 was the detection of a digital assistant trigger, the contextual information transmitted to communal device 1008 includes a trigger advertisement (e.g., along with other device state change information). The trigger advertisement includes a digital assistant trigger end time, which is a time at which the digital assistant trigger ended according to communal device 1004 (e.g., a time at which communal device 1004 stopped receiving the audio signal corresponding to the digital assistant trigger). In some examples, the trigger advertisement further includes data indicating an energy level (e.g., a decibel level) of the digital assistant trigger (e.g., the energy level of the audio signal corresponding to the digital assistant trigger). In some examples, the first trigger advertisement further includes data indicating a confidence score corresponding to a confidence of communal device 1004 that user voice input 1014 includes a digital assistant trigger.

After receiving the context information and trigger advertisement from communal device 1004, communal device 1008 updates the aggregate context of context-sharing group 1012 to include the context information and trigger advertisement. Further, as represented by arrows 1017, in response to receiving the trigger advertisement, communal device 1008 retrieves and transmits trigger advertisements (associated with one or more other electronic devices participating in the context-sharing group) that are already included in the aggregate context to communal device 1004 (e.g., trigger advertisements received within a predetermined period of time (e.g., within the last 30 seconds, within the last minute, within the last 5 minutes, or the like)). In some examples, communal device 1008 transmits the aggregate context (including the received trigger advertisements) to communal device 1004 instead of only transmitting the trigger advertisements. As will be described in greater detail below with respect to user device 1006, communal device 1004 uses the trigger advertisements received from communal device 1008 (e.g., the data included in the trigger advertisements) to determine whether it should suppress its own digital assistant trigger detection (and thus forgo further processing of user voice input 1014).

However, in this case, communal device 1004 does not suppress the detection of the digital assistant trigger (e.g., because communal device 1004 is the first electronic device to detect the digital assistant trigger included in user voice input 1014) and continues processing user voice input 1014 (e.g., to determine/obtain a response to user voice input 1014 (e.g., the performance of one or more tasks and/or the output of a digital assistant response)). Thus, as represented by arrows 1018, communal device 1004 transmits a request for the aggregate context of context-sharing group 1012 to communal device 1008. As represented by arrows 1020, in response to receiving the request for the aggregate context, communal device 1008 transmits the aggregate context to communal device 1004. In some of the examples mentioned above where communal device 1008 transmits the aggregate context at arrows 1017 instead of only transmitting the trigger advertisements, arrows 1018 and 1020 do not occur because communal device had already received the aggregate context. After communal device 1004 receives the aggregate context (as represented by arrows 1020 or, in some examples, arrows 1017) and determines that it should continue processing user voice input 1014, communal device 1004 obtains a response to user voice input 1014 based on user voice input 1014 and context information included in the aggregate context (as will be described in greater detail below with reference to FIG. 9).

As represented by arrows 1022, in response to detecting the digital assistant trigger included in user voice input 1014, user device 1006 transmits context information (and a device identifier corresponding to user device 1006) to communal device 1008 (because the detection of a digital assistant trigger is a device state change and communal device 1008 is the context collector). Note, while FIG. 10 illustrates user device 1006 transmitting the context information to communal device 1008 after arrows 1020, user device 1006 transmits the context information at any time after communal device 1004 detects the digital assistant trigger and transmits context information to communal device 1008 (as represented by arrows 1016). For example, User device 1006 may transmit context information to communal device 1008 before communal device 1004 receives the aggregate context from communal device 1008 (ad represented by arrows 1020). As discussed above, because the device state change of user device 1006 was the detection of a digital assistant trigger, the contextual information transmitted to communal device 1008 includes a trigger advertisement corresponding to the digital assistant trigger detection of user device 1006. The trigger advertisement transmitted by user device 1006 includes the same type of data and information that is included in the trigger advertisement previously transmitted by communal device 1004 (e.g., data indicating a time at which the digital assistant trigger ended (e.g., a time at which user device 1006 stopped receiving the audio signal corresponding to the digital assistant trigger)).

After receiving the context information and trigger advertisement from user device 1006, communal device 1008 updates the aggregate context of context-sharing group 1012 to include the context information and trigger advertisement. Further, as represented by arrows 1024, in response to receiving the trigger advertisement from user device 1006, communal device 1008 retrieves and transmits trigger advertisements (associated with one or more other electronic devices participating in the context-sharing group, including communal device 1004) that are already included in the aggregate context to user device 1006 (e.g., trigger advertisements received within a predetermined period of time (e.g., within the last 30 seconds, within the last minute, within the last 5 minutes, or the like)). In some examples, communal device 1008 transmits the aggregate context (including the received trigger advertisements) to user device 1006 instead of only transmitting the trigger advertisements.

In some examples, in addition to transmitting the context information and trigger advertisement to communal device 1008 (via network 1010), user device 1006 transmits the trigger advertisement (e.g., data corresponding to the trigger advertisement) to one or more electronic devices with which user device 1006 shares a short distance communications connection (e.g., Bluetooth, BTLE, or the like). For example, if user device 1006 and communal device 1004 share a BTLE connection, user device 1006 will transmit the trigger advertisement directly to communal device 1004 via the BTLE connection (e.g., before or soon after transmitting the context information and trigger advertisement to communal device 1008). Then, in response to receiving the trigger advertisement from user device 1006, the one or more electronic devices transmit their own trigger advertisements to user device 1006 via their respective short distance communications connections. For example, the one or more electronic devices transmit trigger advertisements corresponding to digital assistant triggers that they have detected within a predetermined period of time (e.g., within the last 5 seconds, within the last 30 seconds, within the last minute, or the like)).

After receiving the trigger advertisements from communal device 1008 (and, in some examples, from one or more electronic devices with which user device 1006 shares a short distance communications connection) user device 1006 determines whether it should suppress its own digital assistant trigger detection (and thus forgo further processing of user voice input 1014). Specifically, user device 1006 determines whether or not each trigger advertisement it has received (e.g., within the last second) is "sane" based on the digital assistant trigger end time (i.e., the time at which a digital assistant trigger ends according to an electronic device) included in each trigger advertisement. A trigger advertisement is sane if its digital assistant trigger end time falls within a predetermined time range (e.g., 750 milliseconds, 500 milliseconds, 100 milliseconds, or the like) before the digital assistant trigger end time of user device 1006 (i.e., the time at which the digital assistant trigger included in user voice input 1014 ended according to user device 1006).

If user device 1006 determines that one or more of the trigger advertisements it has received is sane (i.e., includes a digital assistant trigger end time that falls within the predetermined time range before the digital assistant trigger end time of user device 1006), then user device 1006 forgoes further processing of user voice input 1014. For example, if user device 1006 determines that a trigger advertisement corresponding to communal device 1004 (e.g., a trigger advertisement received from communal device 1008 and/or received from communal device 1004) is sane, then user device forgoes further processing of user voice input 1014 so that communal device 1004 will be the only electronic device to provide a response to user voice input 1014. However, in some examples, communal device 1004 receives one or more sane trigger advertisements corresponding to one or more other electronic devices that detected the digital assistant trigger (e.g., from communal device 1008 (e.g., as represented by arrows 1017)) and thus also forgoes further processing of user voice input 1014 (e.g., instead of transmitting a request for the aggregate context to communal device 1008 (e.g., as represented by arrows 1018)).

If user device 1006 determines that none of the trigger advertisements it has received is sane (i.e., none of the trigger advertisements include a digital assistant trigger end time that falls within the predetermined time range before the digital assistant trigger end time of user device 1006), then user device 1006 continues processing user voice input 1014 (e.g., by transmitting a request for the aggregate context to communal device 1008). Such a scenario would occur, for example, if (1) the trigger advertisement of user device 1006 corresponded to a digital assistant trigger detected 30 seconds after communal device 1004 detected the digital assistant trigger included in user voice input 1014 and (2) the predetermined time range was 500 milliseconds before the digital assistant trigger end time corresponding to the digital assistant trigger detected by user device 1006. In this example, the digital assistant trigger end time of communal device 1004 clearly does not fall within the 500-millisecond time range before the digital assistant trigger end time of user device 1006. Thus, the user voice input received by user device 1006 represents a separate user request (e.g., separate from the user request of user voice input 1014) that user device 1006 should continue processing.

Returning to FIG. 9, in some examples, user voice input 918 does not include a digital assistant trigger. For example, communal device 904 may receive user voice input 918 during a digital assistant dialog session initiated in response to user 902 pressing or holding a physical button on communal device 904. In these examples, communal device 904 determines that user voice input 918 represents a digital assistant request and begins processing user voice input 918 (e.g., as represented by arrows 920) to determine and/or obtain a response to user voice input 918 without having to determine whether it should suppress the detection of a digital assistant trigger (e.g., according to the process described above with reference to FIG. 10). Note, in these examples, the initiation of the digital assistant dialog session via the pressing or holding of a physical button on communal device 904 represents a device state change and thus communal device 904 transmits context information (and a device identifier corresponding to communal device 904) to communal device 908 in response to initiating the dialog session.

As represented by arrows 920, in response to receiving user voice input 918 (or, in some examples, in response to detecting the digital assistant trigger included in user voice input 918), communal device 904 transmits a request (via network 912) to communal device 908 (i.e., the context collector of context-sharing group 914) for communal device 908 to transmit an aggregate context of context-sharing group 914 to communal device 904. Because the detection of a digital assistant trigger is a device state change, communal device 904 also transmits context information (and a device identifier corresponding to communal device 904) to communal device 908 before transmitting the request for the aggregate context (although this step is not shown in FIG. 9).

As represented by arrows 922, after receiving the request for the aggregate context from communal device 904, communal device 908 transmits the aggregate context (or, in some examples, at least a portion of the aggregate context) to communal device 904. In some examples, the request for the aggregate context causes communal device 908 to transmit the aggregate context (e.g., data corresponding to the aggregate context), or at least a portion of the aggregate context, to communal device 904. The aggregate context transmitted to communal device 904 includes context information (e.g., device state change information, contextual state information, device capability information, and/or the like) associated with at least communal device 904, user device 906, and user device 910 (e.g., because communal device 904, user device 906, and user device 910 each recently transmitted context information to communal device 908 in response to undergoing a device state change (e.g., a timer event)). Specifically, the context information is associated with at least communal device 904, user device 906, and user device 910 based on the device identifiers that communal device 908 receives with the context information from at least communal device 904, user device 906, and user device 910. In some examples, the aggregate context does not include any other type of device identification or identifying information other than the device identifiers received with context information included in the aggregate context. This in turn helps ensure the anonymity of the electronic devices participating in context-sharing group 914 when server 916 receives the aggregate context (e.g., as represented by arrows 924).

In other examples, the aggregate context does include other types of device identifications and/or information identifying a registered user of each electronic device (in addition to the device identifiers). This in turn allows server 916 to determine whether electronic devices participating in a context-sharing group are registered to a single user or two or more different users (as this information may influence the commands that server 916 provides). In some examples, device identifications and/or information identifying a registered user of each electronic device included in the aggregate context allows server 916 to determine whether or not a user voice input is provided by a registered. Further, as will be described below, in some examples, server 916 uses this additional identifying information to access and/or utilize user data that is stored on server 916 and that is associated with one or more of the electronic devices (e.g., user data that an electronic device participating in the context-sharing group 914 previously synced/transmitted to the remote devices (e.g., during an automatic and/or periodic user data sync)).

As represented by arrows 924, after receiving the aggregate context from communal device 908, communal device 904 provides (e.g., transmits) data corresponding to user voice input 918 and at least a portion of the aggregate context to server 916.

In some examples, communal device 904 provides audio data corresponding to user voice input 918 to server 916. In some examples, communal device 904 performs speech-to-text processing of user voice input 918 (e.g., using STT processing module 730) and provides text data corresponding to user voice input 918 (e.g., a textual representation of user voice input 918) to server 916. In some examples, communal device 904 further performs natural language processing of the text data corresponding to user voice input 918 (e.g., using natural language processing module 732) and provides results of the natural language processing (e.g., one or more user intents) to server 916.

In some examples, communal device 904 provides all of the aggregate context to server 916. In some examples, communal device 904 determines what context information included in the aggregate context is relevant to user voice input 918 (e.g., when communal device 904 performs natural language processing of user voice input 918) and only provides the relevant context information to server 916. In some examples, communal device 904 determines what context information is relevant based on one or more domains of an active ontology (e.g., ontology 760) that correspond to user voice input 918 (e.g., by identifying the context information that is related to or associated with the one or more domains corresponding to user voice input 918). In some examples, communal device 904 removes personal information (e.g., email addresses, home addresses, payment information, or the like) and/or user data (e.g., a user's preferences, media, contacts, speech profiles, or the like) included in the aggregate context prior to providing the aggregate context to server 916. In some examples, communal device 904 encrypts personal information and/or user data included in the aggregate context prior to providing the aggregate context to server 916.

In some examples, prior to transmitting the at least a portion of the aggregate context to server 916, communal device 904 transmits a request to each electronic device participating in context-sharing group 914 (including user device 906, communal device 908, and user device 910) for each electronic device to provide communal device 904 with an indication of whether or not it detected the digital assistant trigger included in user voice input 918. In some examples, communal device 904 requests each electronic device to provide communal device 904 with an indication of whether the electronic device has detected a digital assistant trigger within a predetermined period of time (e.g., within the last 2 seconds, 5 seconds, or 10 seconds). In response to receiving the request, the electronic devices transmit the requested indications (also referred to as trigger indications) with their respective device identifier.

After receiving a trigger indication from one or more (e.g., all) of the electronic devices participating in context-sharing group 914 (indicating whether each of the one or more electronic devices did or did not detect the digital assistant trigger included in user voice input 918), communal device 904 incorporates the trigger indications into the aggregate context based on the device identifiers received with the trigger indications. Specifically, communal device 904 incorporates the trigger indication received from each electronic device into the context information of the electronic device that is included in the at least a portion of the aggregate context (according to the device identifier of each electronic device). For example, communal device 904 would incorporate a trigger indication received from user device 906 into the context information associated with the device identifier of user device 906 that is included in the at least a portion of the aggregate context. In some examples, a trigger indication includes data indicating an energy level (e.g., decibel level) of the detected digital assistant trigger (e.g., the energy level of the digital assistant trigger when received by an electronic device). In some examples, a trigger indication includes a confidence score corresponding to a confidence of an electronic device (e.g., user device 906) that user voice input 918 includes a digital assistant trigger.

Note, in some examples, user devices participating in a context-sharing group are not aware of other user devices that are also participating in the context-sharing group (and that are not a context collector). For example, user device 906 is not aware of user device 910. Thus, in these examples, user devices cannot transmit trigger indication requests or trigger indications directly to other user devices. Accordingly, in these examples, user devices transmit trigger indication requests to the context collector of a context-sharing group so that the context-collector may transmit the trigger indication requests to all other electronic devices participating in the context-sharing group. Then, the context collector transmits all trigger indications it receives back to the user devices that transmitted the trigger indication requests to the context collector. For example, in order to receive a trigger indication from user device 910, user device 906 transmits a trigger indication request to communal device 908 so that communal device 908 may transmit the trigger indication request to both user device 910 and communal device 904. As a result, communal device will receive trigger indications from communal device 904 and user device 910, and subsequently transmit those trigger indications (along with its own trigger indication) to user device 906. In some examples, user device 906 transmits the trigger indication request directly to communal device 904 (e.g., in addition to transmitting the request to communal device 908), as user device 906 is still aware of communal devices participating in context-sharing group 914.

As will be described in greater detail below, in some examples, server 916 determines a physical proximity of user device 906, communal device 908, and/or user device 910 to communal device 904 (e.g., within the specific location associated with context-sharing group 914) based on trigger indications corresponding to user device 906, communal device 908, and/or user device 910 that are included in the aggregate context. For example, based on the trigger indications (e.g., data included in the trigger indications), server 916 can determine whether user device 906 or communal device 908 is closer to communal device 904 and/or determine whether user device 906 or communal device 908 is within a same area of the location associated with context-sharing group 914 as communal device 904 (e.g., within a same room or office). In some examples, each individual device determines its own physical proximity to communal device 904. In these examples, a trigger indication includes data indicating a physical proximity of the associated electronic device (e.g., user device 906, communal device 908, or user device 910) to communal device 904, and thus server 916 is informed of the proximity of each device to communal device 904 based on the data included in the trigger indication (instead of server 916 determining the physical proximity of each device to communal device 904).

As will be described in greater detail below with reference to FIG. 11, upon receiving the data corresponding to user voice input 918, server 916 (specifically, one or more modules of server 916) processes the data corresponding to user voice input 918 (e.g., based on context information included in the aggregate context) and determines one or more user intents corresponding to user voice input 918, one or more tasks corresponding to the one or more user intents, one or more electronic devices participating in context-sharing group 914 to perform the one or more tasks, and one or more commands to perform the one or more tasks. Note, in some examples, communal device 904 does not transmit the data corresponding to user voice input 918 and aggregate context to server 916. In these examples, communal device 904 (specifically, one or more modules of communal device) processes the data corresponding to user voice input 918 (e.g., based on context information included in the aggregate context) and performs the determinations listed above (instead of server 916).

Figure 11:
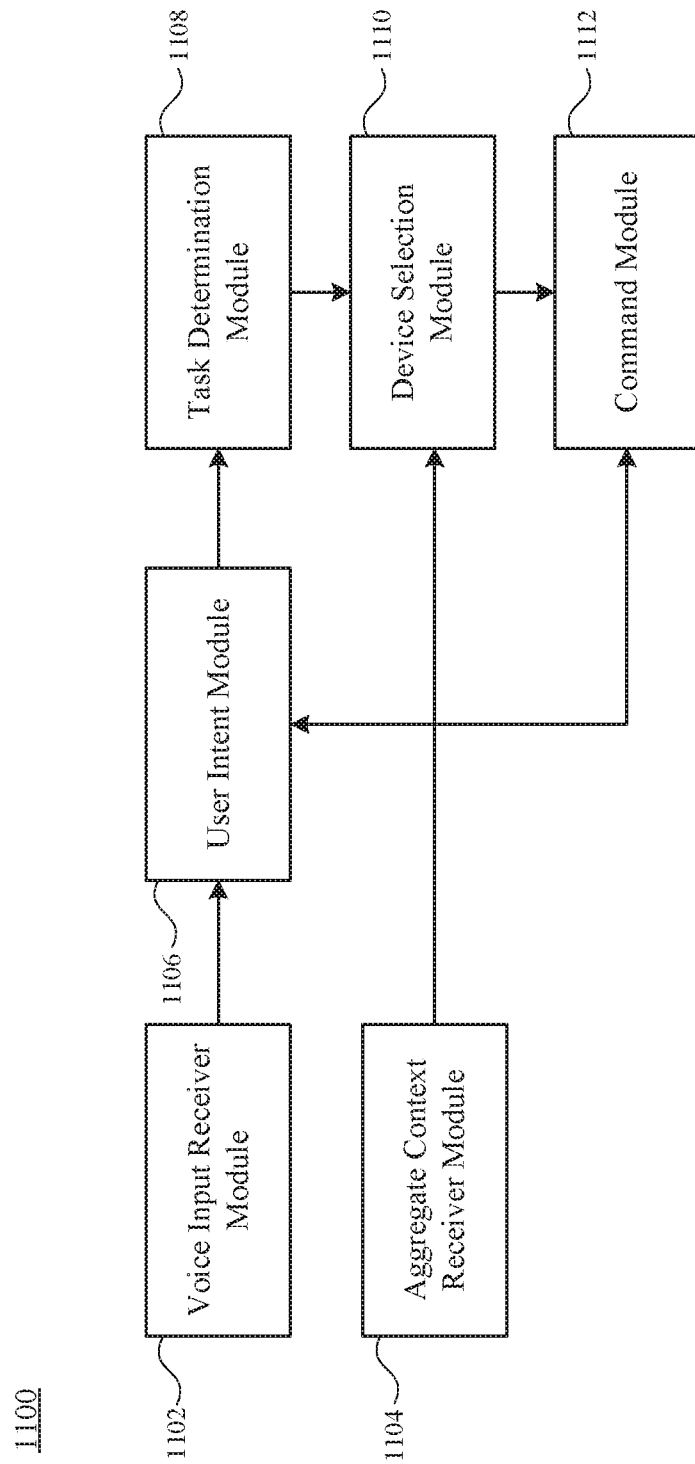
FIG. 11 is a block diagram illustrating a system for task determination and device selection in a context-sharing group, according to various examples.

FIG. 11 is a block diagram illustrating a system for task determination and device selection in a context-sharing group, according to various examples. System 1100 is implemented on one or more remote devices that are communicatively connected (e.g., via one or more networks (e.g., network 912)) to one or more electronic devices (e.g., one or more user devices and/or one or more communal devices) that are participating in a context-sharing group (e.g., context-sharing group 914). For example, system 1100 is implemented on server 916. In some examples, system 1100 is implemented one or more electronic devices that are participating in a context-sharing group (e.g., communal device 904, user device 906, communal device 908, and/or user device 910). In some examples, the modules and functions of system 1100 are distributed between one or more remote devices and one or more electronic devices that a participating in a context-sharing group.

System 1100 is implemented using hardware, software, or a combination of hardware and software to carry out the functions discussed herein. Further, system 1100 is exemplary, and thus system 1100 can have more or fewer components than shown, can combine two or more components, or can have a different configuration or arrangement of the components. Although the below discussion describes functions being performed at a single module of system 1100, it is to be understood that such functions can be performed at other modules of system 1100 and that such functions can be performed at more than one module of system 1100.

To illustrate the examples discussed herein, system 1100 is described with reference to FIG. 9 and the various components of system 900. Unless otherwise stated, system 1100 is implemented on server 916 in the examples described below.

System 1100 includes voice input receiver module 1102. Voice input receiver module 1102 receives data corresponding to a user voice input (e.g., audio data, text data, natural language processing results, and/or the like) from an electronic device participating in a context-sharing group (e.g., from communal device 904). For example, voice input receiver module 1102 receives data corresponding to user voice input 918 from communal device 904 (e.g., as represented by arrows 924). In some examples, voice input receiver module 1102 receives a user voice input directly from a user. For example, voice input receiver module 1102 receives user voice input 918 directly from user 902 when system 1100, or just voice input receiver module 1102, is implemented on communal device 904 (as communal device 904 receives user voice input 918 from user 902). After voice input receiver module 1102 receives data corresponding to a user voice input, voice input receiver module 1102 provides the data corresponding to the user voice input to user intent module 1106.

System 1100 includes aggregate context receiver module 1104. Aggregate context receiver module 1104 receives at least a portion of an aggregate context of a context-sharing group from an electronic device participating in a context-sharing group (e.g., from communal device 904). As described above, the at least a portion of the aggregate context includes one or more device identifiers corresponding to one or more electronic devices participating in the context-sharing group. For example, aggregate context receiver module 1104 receives at least a portion of an aggregate context of context-sharing group 914 from communal device 904 (e.g., as represented by arrows 924). In some examples, aggregate context receiver module 1104 receives the at least a portion of the aggregate context from a context collector of a context-sharing group. For example, aggregate context receiver module 1104 receives the at least a portion of the aggregate context from communal device 908 (the context collector of context-sharing group 914) when system 1100, or just aggregate context receiver module 1104, is implemented on communal device 904 (as communal device 904 receives the at least a portion of the aggregate context from communal device 908 (e.g., as represented by arrows 922)). After receiving the at least a portion of the aggregate context of a context-sharing group, aggregate context receiver module 1104 provides context information (e.g., device state change information, contextual state information, and/or device capability information) and device identifiers associated with the context information to user intent module 1106, device selection module 1110, and/or command module 1112.

System 1100 includes user intent module 1106. User intent module 1106 determines one or more user intents based on data corresponding to a user voice input (received from voice input receiver module 1102). For example, user intent module 1106 determines one or more user intents based on the data corresponding to user voice input 918. After determining one or more user intents, user intent module 1106 provides the one or more user intents to task determination module 1108.

In some examples, determining the one or more user intents includes user intent module 1106 performing speech-to-text processing, natural language processing, and/or the like based on the data corresponding to the user voice input. In these examples, user intent module 1106 includes a speech-to-text processing module (e.g., STT processing module 730), a natural language processing module (e.g., natural language processing module 732), and/or the like. For example, if the data corresponding to user voice input 918 is audio data (e.g., an audio signal of user voice input 918), determining the one or more user intents includes user intent module 1106 performing speech-to-text processing based on the audio data. As another example, if the data corresponding to user voice input 918 is text data (e.g., a textual representation of user voice input 918), determining the one or more user intents includes user intent module 1106 performing natural language processing based on the text data (but not speech-to-text processing, as user voice input 918 has already been recognized (e.g., by communal device 904)).

In some of the examples where user intent module 1106 performs speech-to-text processing of the data corresponding to user voice input, user intent module 1106 determines one or more recognition results (e.g., one or more candidate text representations) corresponding to the user voice input based on user data (e.g., stored contacts, user speech profiles, media (e.g., songs), and/or the like) that is associated with a user that provided the user voice input. For example, if user voice input 918 includes a unique and/or uncommon word and/or name (e.g., "Hey Siri, call Daenerys Targaryen."), user intent module 1106 can utilize speech profile data associated with user 902 (e.g., speech profile data associated with stored contacts of user 902) to recognize the unique and/or uncommon word and/or name. For example, user intent module 1106 can match the utterance of "Daenerys Targaryen" included in user voice input 918 (e.g., an audio signal or intermediate recognition result corresponding to the utterance) to an utterance of the stored contact name "Daenerys Targaryen" included in a user speech profile of user 902.

In some examples, the user data utilized by user intent module 1106 includes user data that is stored on the electronic device that provides the data corresponding to the user voice input to voice input receiver module 1102 (e.g., communal device 904). For example, communal device 904 may transmit stored user data to server 916 when transmitting the data corresponding to user voice input 918 to server 916 (e.g., the user data may be included in the aggregate context). The user data may then be accessed and utilized by user intent module 1106. In some examples, the user data utilized by user intent module 1106 includes user data that is stored on the remote device that is implementing user intent module 1106 (e.g., server 916). For example, the user data may already be stored on server 916 because communal device 904 previously synced/transmitted the user data to server 916 (e.g., during an automatic and/or periodic user data sync).

In some examples, the user data utilized by user intent module 1106 includes user data associated with an electronic device that (1) is participating in a context sharing group and (2) does not provide the data corresponding to the user voice input to voice input receiver module 1102. For example, the user data that user intent module 1106 utilizes when performing speech-to-text processing of the data corresponding to user voice input 918 can include user data that user device 906 previously synced/transmitted to server 916. For example, if user voice input 918 includes the unique name "Daenerys Targaryen," user intent module 1106 can recognize the unique name based on speech profile data associated with user 902 that user device 906 previously synced/transmitted to server 916. In this example, the user data associated with user device 906 is not stored on communal device 904 and has not been synced/transmitted to server 916 by communal device 904.

In some examples, an electronic device participating in context-sharing group that does not provide data corresponding to a user voice input to voice input receiver module 1102 (e.g., user device 906, communal device 908, or user device 910)) must be registered to the user that provides the user voice input (e.g., user 902) in order for user intent module 1106 to utilize user data associated with the electronic device. For example, if user device 906 is not registered to user 902, user intent module 1106 will not be able to utilize user data associated with user device 906 to recognize the unique name "Daenerys Targaryen" included in user voice input 918. In some examples, user intent module 1106 utilizes user data from an electronic device registered to the user that provides the user voice input only if the electronic device is participating in the same context-sharing group as the electronic device that receives the user voice input. For example, if an electronic device registered to user 902 is not participating in context-sharing group 914, then user intent module 1106 cannot access user data associated with that electronic device when processing the data corresponding to user voice input 918. As another example, if user device 906 is registered to user 902, but user device 906 leaves context-sharing group 914 (e.g., by disconnecting from network 912) before user intent module 1106 receives the data corresponding to user voice input 918, then user intent module 1106 will not be able to utilize user data associated with user device 906 (e.g., that is stored on server 916) to recognize user voice input 918. Note, in some examples, communal devices (e.g., communal device 904) do not store user data and/or do not sync user data to remote devices (e.g., server 916). In these examples, user intent module 1106 can only access and utilize user data associated with user devices (e.g., user device 906 and/or user device 910) that are registered to the user that provides the user voice input.

As mentioned above, aggregate context receiver module 1104 provides context information (e.g., device state change information, contextual state information, and/or device capability information) and device identifiers associated with the context information to user intent module 1106. In some examples, user intent module 1106 determines the one or more user intents further based on context information (associated with one or more electronic devices) received from aggregate context receiver module 1104.

In some examples, determining the one or more user intents further based on context information included in the at least apportion of the aggregate context includes user intent module 1106 disambiguating a user voice input based on the context information. For example, if user voice input 918 is ambiguous with respect to a user-requested task (e.g., "Hey Siri, stop." is ambiguous with respect to what task user 902 wants a device to perform as it is unclear whether user 902 wants to stop media playback, stop an alarm, stop a timer, or the like)), user intent module 1106 can use device state change information associated with communal device 904, user device 906, communal device 908, and/or user device 910 (e.g., a type of device state change and/or a time of device state change) to determine/disambiguate what task user 902 is referring to in user voice input 918. For example, if device state change information associated with user device 906 (e.g., data indicating a type of device state change at user device 906) indicates that there is a timer event currently occurring at user device 906 (e.g., a timer is going off at user device 906), user intent module 1106 may determine that user 902 wants to stop the timer event at user device 906. Thus, in this example, user intent module 1106 would determine a user intent of stopping a timer.

In some examples, when a user voice input is ambiguous with respect to a user-requested task, and two or more events (e.g., timer event, alarm event, media playback, and/or the like) are occurring at two or more separate electronic devices in a context-sharing group, user intent module 1106 uses device state change time information (e.g., data indicating a time when each event began) to determine the one or more user intents based on the most recent device state change. For example, if in the example above (where user voice input 918 is "Hey Siri, stop."), the device state change information also indicates that there is a media playback event occurring at communal device 904 (e.g., communal device 904 is currently playing music while a timer is going off at user device 906 (e.g., in another room)), user intent module 1106 can disambiguate user voice input 918 based on device state change time information indicating a time when each event began. Specifically, user intent module 1106 can determine which event began most recently based on the device state change time data, as that it the event user 902 is most likely referring to. Thus, if the timer event at user device 906 began more recently than the media playback event at communal device 904, user intent module 1106 would determine a user intent of stopping a timer instead of a user intent of stopping media playback.

In some examples, when a user voice input is ambiguous with respect to a user-requested task, and two or more events (e.g., timer event, alarm event, media playback, and/or the like) are occurring at two or more separate electronic devices in a context-sharing group, user intent module 1106 uses device state change type information (e.g., data indicating a type of event) to determine the one or more user intents based on the type of events occurring at the two or more separate electronic devices. Specifically, in these examples, user intent module 1106 determines the one or more user intents based on event priority rules that indicate which event types are given preference when determining a user intent. For example, the event type priority rules may indicate that alarm events are prioritized over media playback events. Thus, if in the example above (where user voice input 918 is "Hey Siri, stop."), the device state change information also indicates that there is a media playback event occurring at communal device 904 (e.g., communal device 904 is currently playing music while a timer is going off at user device 906 (e.g., in another room)), user intent module 1106 can disambiguate user voice input 918 based on the event priority rules and thus determine a user intent of stopping a timer instead of a user intent of stopping media playback (as timer events are prioritized over media playback events).

Similarly, in yet another example, if user voice input 918 is "Hey Siri, resume" and device state change information included in the at least a portion of the aggregate context indicates that music previously playing at user device 906 was stopped 10 minutes ago whereas a movie playing at communal device 908 was stopped 5 minutes ago (because stopping or pausing a media playback is a device state change), user intent module 1106 would determine, based on the device state change time data, that the movie playing at communal device 908 was stopped or paused more recently. Thus, user intent module 1106 would determine a user intent of resuming a movie instead of a user intent of resuming music.

As will be described in greater detail below with reference to FIG. 13, in some examples, user intent module 1106 uses one or more digital assistant dialog session histories associated with one or more electronic devices (included in the aggregate context) to disambiguate a user voice input and determine one or more user intents corresponding to the user voice input.

System 1100 includes task determination module 1108. Task determination module 1108 determines one or more tasks to be performed by one or more electronic devices that are participating in a context-sharing group based on one or more user intents received from user intent module 1106. For example, task determination module 1108 determines one or more tasks to be performed by communal device 904, user device 906, communal device 908, and/or user device 910 based on one or more user intents that user intent module 1106 determines based on data corresponding to user voice input 918 received by voice input receiver module 1102 (and, in some examples, further based on context information included in the aggregate context received by aggregate context receiver module 1104). After determining one or more tasks, task determination module 1108 provides the one or more tasks and the one or more user intents to device selection module 1110.

As will be described in greater detail below, the one or more tasks are performed by one or more electronic devices participating in a context-sharing group to fulfill the one or more user intents. For example, if user intent module 1106 determines a user intent of stopping an alarm (e.g., based on the user voice input "Hey Siri, stop." or "Hey Siri, stop the alarm."), task determination module 1108 will determine one or more tasks that, when performed by an electronic device, would result in the electronic device stopping an alarm. In some examples, the one or more tasks that task determination module 1108 determines are predetermined based on the one or more user intents (e.g., a determined user intent corresponds to one or more tasks). Examples of the one or more tasks that can be determined by task determination module 1108 include performing a search, retrieving information/data, opening an application stored on an electronic device, playing media (e.g., songs, videos, movies, and/or the like), making a purchase, user authentication, displaying retrieved information/data, and/or the like.

As will be described in greater detail below with reference to FIG. 13, in some examples, task determination module 1108 uses one or more digital assistant dialog session histories associated with one or more electronic devices to disambiguate a user voice input and determine one or more parameters for one or more tasks determined based on the user intent corresponding to the user voice input.

System 1100 includes device selection module 1110. Device selection module 1110 selects/identifies one or more electronic devices participating in a context-sharing group to perform one or more tasks (received from task determination module 1108) based at least on context information included in the aggregate context (received from aggregate context receiver module 1104). For example, device selection module 1110 can select one electronic device that is participating in context-sharing group 914 (e.g., user device 906) to perform the one or more tasks. As another example, as will be discussed in greater detail below with reference to FIGS. 12A-12B, device selection module 1110 can select two or more electronic devices that are participating in context-sharing group 914 (e.g., communal device 904 and user device 906) to perform at least one task each (e.g., when task determination module 1108 determines at least two tasks). In some examples, device selection module 1110 selects the electronic device that provides the data corresponding to a user voice input to voice input receiver module 1102 (e.g., communal device 904). In some examples, device selection module 1110 selects an electronic device that does not provide the data corresponding to a user voice input to voice input receiver module 1102 (e.g., user device 906, communal device 908, and/or user device 910). In some examples, device selection module 1110 selects a context collector of a context-sharing group (e.g., communal device 908).

After receiving the one or more tasks, the one or more user intents, and the aggregate context, device selection module 1110 determines, based on device state change information included in the aggregate context (e.g., device state change information associated with one or more electronic devices participating in a context-sharing group), whether an event (e.g., a timer event, an alarm event, media playback, or the like) that corresponds to a user intent of the one or more user intents is currently occurring at one or more electronic devices participating in a context sharing group. For example, if device selection module 1110 receives a user intent of stopping a timer (e.g., based on the user voice input "Hey Siri, stop."), user intent module 1110 will determine whether there is a timer event occurring at one or more electronic devices based on the device state change information (e.g., data indicating a type of device state change) associated with the electronic devices (e.g., associated with the device identifier of the one or more electronic devices included in the aggregate context). As another example, if device selection module 1110 receives a user intent of playing a next song (e.g., based on the user voice input "Hey Siri, play the next song."), device selection module 1110 will determine whether there is a music playback event occurring at one or more electronic devices based on the device state change information associated with the electronic devices.

If device selection module 1110 determines that an event that corresponds to the user intent is currently occurring at a single electronic device participating in the context-sharing group, device selection module 1110 selects the single electronic device (at which the event is occurring) to perform the one or more tasks.

If device selection module 1110 determines that an event that corresponds to the user intent is currently occurring at two or more electronic devices participating in the context-sharing group, device selection module 1110 determines which event (of the two or more events) began most recently based on data indicating a time of device state change included in device state change information associated with the two or more electronic devices. For example, if device selection module 1110 receives a user intent of stopping an alarm (e.g., based on the user voice input "Hey Siri, stop.") and device selection module 1110 determines that an alarm event is occurring at user device 906 and user device 910 (i.e., a separate alarm is going off at each device), then device selection module 1110 will determine whether the alarm event at user device 906 began more recently than the alarm event at user device 910 (based on the device state change data indicating a time at which each alarm event began). Then, after device selection module 1110 determines which event (of the two or more events) began most recently, device selection module 1110 selects the electronic device at which the event began most recently to perform the one or more tasks. Returning to the previous example, if device selection module 1110 determines that the alarm event at user device 910 began more recently than the alarm event at user device 906 (e.g., the alarm at user device 910 started going off when the alarm at user device 906 was already going off), device selection module 1110 will select user device 910 (specifically, device selection module 1110 will select the device identifier corresponding to user device 910).

In some examples, if device selection module 1110 determines that an event that corresponds to the user intent is currently occurring at two or more electronic devices participating in the context-sharing group, device selection module 1110 determines, based on proximity information included in the aggregate context, which electronic device of the two or more electronic devices is physically closest to the electronic device that provided the user voice input data to voice input receiver module 1102. Then, device selection module 1110 selects the electronic device that is physically closest to the electronic device that provided the user voice input data. For example, if device selection module 1110 receives a user intent of stopping an alarm (e.g., based on the user voice input "Hey Siri, stop.") and device selection module 1110 determines that an alarm event is occurring at user device 906 and user device 910 (i.e., a separate alarm is going off at each device), device selection module 1110 will determine (based on proximity information associated with user device 906 and user device 910) whether user device 906 or user device 910 is physically closest to communal device 904. Then, if device selection module 1110 determines that user device 906 is physically closest to communal device 904, device selection module 1110 will select user device 906.

In some examples, device selection module 1110 determines, based on device state change information included in the aggregate context (e.g., device state change information associated with one or more electronic devices participating in a context-sharing group), whether an event that corresponds to a user intent of the one or more user intents previously occurred at one or more electronic devices (participating in a context sharing group) within a predetermined period of time (e.g., within the last 5 minutes, 10 minutes, 30 minutes, or the like). For example, if the one or more user intents include a user intent of resuming movie playback and the predetermined period of time is 10 minutes, device selection module 1110 will determine whether a movie was paused within the last 10 minutes at one or more of the electronic devices participating in context-sharing group 914 (based on data indicating a type of device state change and a time of device state change included in the device state change information) because the event of pausing a movie corresponds to the user intent of resuming movie playback. In some examples, device selection module 1110 makes this determination in response to determining that an event that corresponds to a user intent of the one or more user intents is not currently occurring at one or more electronic devices participating in the context sharing group. In some examples, device selection module 1110 determines whether an event that corresponds to a user intent of the one or more user intents previously occurred at one or more electronic devices in response to determining that the one or more user intents include a user intent of resuming media playback (e.g., resuming music playback, movie playback, or the like). In some of these examples, in response to determining that the one or more user intents include a user intent of resuming media playback, device selection module 1110 determines whether an event that corresponds to a user intent of the one or more user intents previously occurred at one or more electronic devices within a predetermined period of time instead of determining whether an event that corresponds to a user intent of the one or more user intents is currently occurring at one or more electronic device.

In the above examples, if device selection module 1110 determines that an event that corresponds to a user intent of the one or more user intents previously occurred at a single electronic device participating in the context-sharing group within the predetermined period of time, device selection module 1110 selects the single electronic device (at which the event previously occurred) to perform the one or more tasks. For example, if a user intent is resuming music playback and device selection module 1110 determines that communal device 904 was the only electronic device participating in context-sharing group 914 to pause music playback within the predetermined period of time (e.g., 30 minutes), then device selection module 1110 selects communal device 904.

Alternatively, if device selection module 1110 determines that an event that corresponds to a user intent of the one or more user intents previously occurred at two or more electronic devices participating in the context-sharing group within the predetermined period of time, device selection module 1110 determines, based on proximity information included in the aggregate context (e.g., proximity information associated with one or more electronic devices participating in the context sharing group), which electronic device of the two or more electronic devices is physically closest to the electronic device that provided the user voice input data to voice input receiver module 1102 (e.g., because that electronic device is likely the closest device to the user that provided the user voice input). Returning to the previous example, if device selection module 1110 determines that user device 906 also paused music playback within the predetermined period of time (in addition to communal device 904), device selection module 1110 will determine whether user device 906 or communal device 904 is closer to communal device 904 (i.e., the device that provided the data corresponding to user voice input 918 to voice input receiver module 1102). In this case, communal device 904 is the closest device because communal device 904 itself provided the data corresponding to user voice input 918 to voice input receiver module 1102. Thus, in this example, device selection module 1110 would select communal device 904 to perform the one or more tasks. Determining which electronic device is closest in these examples prevents an electronic device that is located in an entirely different area of the location associated with the context-sharing group (e.g., from where the user is located) from being selected (e.g., and subsequently resuming media playback).

In some examples, the proximity information is based on data included in one or more trigger indications (e.g., associated with one or more electronic devices participating in the context-sharing group) that are included in the aggregate context. Specifically, as discussed above, each trigger indication includes data indicating whether or not an electronic device detected a digital assistant trigger included in the user voice input, such as data indicating an energy level (e.g., decibel level) of the detected digital assistant trigger (e.g., the energy level of the digital assistant trigger when received by an electronic device). In these examples, determining which electronic device of the two or more electronic devices is physically closest to the electronic device that provided the user voice input data to voice input receiver module 1102 includes device selection module 1110 comparing the digital assistant trigger energy levels of the two or more electronic devices and determining which electronic device corresponds to the highest energy level. Device selection module then selects the electronic device with the highest digital assistant trigger energy level to perform the one or more tasks.

In some examples, device selection module 1110 determines which electronic device of the two or more electronic devices is physically closest to the electronic device that provides the user voice input data to voice input receiver module 1102 based on contextual state information included in the aggregate context (e.g., instead of, or in addition to, proximity information). Specifically, in examples where the contextual state information includes a current location of electronic devices participating in the context-sharing group (e.g., based on GPS data from GPS module 235 and/or information from a software application that has context-sharing group functionality (e.g., HomeKit®)), device selection module 1110 compares the current location of the two or more electronic devices and determines which electronic device is physically closest to the electronic device that provided the voice input data to voice input receiver module 1102 based on the comparison. Device selection module 1110 then selects the closest electronic device to perform the one or more tasks.

In some examples, if device selection module 1110 determines, based on proximity information and/or contextual state information included in the aggregate context, that two or more electronic devices are equally as physically close to the electronic device that provided the user voice input data voice input receiver module 1102, device selection module 1110 selects the two or more electronic devices (instead of selecting a single electronic device). In some examples, two or more electronic devices are equally as physically close to the electronic device that provided the user voice input data to voice input receiver module 1102 if a difference between their respective digital assistant trigger energy levels is less than a predetermined threshold (e.g., less than 5 decibels). For example, if the digital assistant trigger energy levels of communal device 904 and user device 906 are 40 decibels and 42 decibels, respectively, and the predetermined threshold is 5 decibels, device selection module 1110 will determine that communal device 904 and user device 906 are equally as physically close to communal device 904 (i.e., the device that provided the data corresponding to user voice input 918). In some examples, two or more electronic devices are equally as physically close to the electronic device that provided the user voice input data to voice input receiver module 1102 if contextual state information associated with each of two or more electronic devices indicates that the two or more electronic devices are each currently located within a same area of the location associated with the context sharing group (e.g., the same room, same office, or the like)).

In some examples, in response to determining that an event that corresponds to a user intent of the one or more user intents previously occurred at two or more electronic devices within the predetermined period of time, device selection module 1110 simply selects the two or more electronic devices instead of determining which electronic device of the two or more electronic devices is physically closest to the electronic device that provided the user voice input data to voice input receiver module 1102.

As will be described in greater detail below, when device selection module 1110 selects two or more electronic devices in the above examples, device selection module 1110 provides command module 1112 with (1) device identifiers corresponding to the two or more electronic devices, (2) the one or more tasks, and (3) an instruction to provide a command that causes the electronic device that provided the user voice input data to voice input receiver module 1102 (e.g., communal device 904) to output a query requesting the user to select an electronic device of the two or more electronic devices to perform the one or more tasks.

If device selection module 1110 determines that an event that corresponds to a user intent of the one or more user intents is not currently occurring at an electronic device participating in the context-sharing group (and, in some examples, that an event that corresponds to a user intent did not previously occur at an electronic device within a predetermined period of time), device selection module 1110 determines that the user intent corresponds to a user request for causing a new event to occur at one or more electronic devices participating in the context-sharing group. For example, if the user intent is playing music (e.g., based on the user voice input "Hey Siri, play a Taylor Swift song.") and device selection module 1110 determines (based on device state change information included in the aggregate context) that a music playback event is not occurring at any of the electronic devices participating in context-sharing group 914, device selection module 1110 will determine that the user intent corresponds to a user request for causing a new event (in this case, music playback) to occur at one or more electronic devices of context-sharing group 914.

After determining that the user intent corresponds to a user request for causing a new event to occur, device selection module 1110 determines, based on device state change information included in the aggregate context (e.g., time of device state change, type of device state change, etc.), whether one or more electronic devices participating in the context-sharing group are available to perform the one or more tasks. In some examples, device selection module 1110 determines whether one or more electronic device is available further based on contextual state information associated with the electronic device (e.g., data indicating a display visibility of the electronic device). An electronic device is not available to perform the one or more tasks if the device state change information and/or contextual state information associated with the electronic device indicates that the electronic device is currently being used by a user (e.g., open/active software applications), currently performing a task, and/or currently unable to provide an audio and/or visual output (e.g., because the electronic device is face down, muted, playing media, and/or the like). For example, if the device state change information associated with communal device 908 indicates that communal device 908 is currently playing a movie, device selection module 1110 will determine that communal device 908 is not available to perform the one or more tasks. As another example, if the device state change information associated with user device 906 indicates that a gaming software application stored on user device 906 is currently open (e.g., such that a user is interacting with the gaming software application), device selection module 1110 will determine that user device 906 is not available to perform the one or more tasks.

If device selection module 1110 determines that one or more electronic devices are available to perform the one or more tasks, device selection module 1110 determines, based on device capability information included in the aggregate context (e.g., type of device, processing power, memory availability, display information (e.g., a size of display), speaker information (e.g., a loudness of the speaker), and/or the like), whether each of the one or more available electronic devices is capable of performing the one or more tasks. For example, if the one or more tasks include a task of displaying information, images, videos, and/or the like, an electronic device is capable of performing the one or more tasks only if the device has a display (or is communicatively connected to a display). As another example, if performing the one or more tasks requires an electronic device to have a minimum amount of processing power and/or memory, an electronic device will not be capable of performing the one or more tasks if the device capability information associated with the electronic device indicates that the electronic device does not have the minimum amount of processing power and/or memory. In some examples, device selection model determines whether the one or more available electronic devices are capable of performing the one or more tasks further based on contextual state information associated with the one or more available electronic devices (e.g., strength of network connection, amount of battery power, and/or the like). In some examples, device selection module 1110 determines that an electronic device is a capable electronic device if the electronic device is capable of performing at least one task of the one or more tasks.

If device selection module 1110 determines that only a single electronic device participating in the context-sharing group is both available and capable of performing the one or more tasks, device selection module selects the single electronic device to perform the one or more tasks.

If device selection module 1110 determines that two or more electronic devices participating in the context-sharing group are both available and capable of performing the one or more tasks, device selection module 1110 determines, based on proximity information associated with the two or more available and capable electronic devices, which of the two or more electronic devices is physically closest to the electronic device that provided the user voice input data to voice input receiver module 1102. For example, if device selection module 1110 determines that user device 906 and communal device 908 are both available and capable of performing the one or more tasks, device selection module 1110 will determine whether user device 906 or communal device 908 is physically closer to communal device 904. Determining which electronic device is physically closest to communal device 904 ensures that, for example, device selection module 1110 does not select user device 906 to perform the one or more tasks if user device 906 is in a different area of the location associated with the context-sharing group 914 (e.g., in a different room, on a different floor, and/or the like) relative to communal device 904 (and thus relative to user 902 (e.g., because a user is typically located near the electronic device that provides the user voice input data to voice input receiver module 1102)). This in turn improves a user's experience.

As discussed above, in some examples, the proximity information is based on data included in one or more trigger indications that are included in the aggregate context. Specifically, each trigger indication includes data indicating whether or not an electronic device detected a digital assistant trigger included in the user voice input, such as data indicating an energy level (e.g., decibel level) of the detected digital assistant trigger (e.g., the energy level of the digital assistant trigger when received by an electronic device). In these examples, determining which electronic device of the two or more available and capable electronic devices is physically closest to the electronic device that provided the user voice input data to voice input receiver module 1102 includes device selection module 1110 comparing the digital assistant trigger energy levels of the two or more available and capable electronic devices and determining which electronic device corresponds to the highest energy level. Device selection module then selects the electronic device with the highest digital assistant trigger energy level to perform the one or more tasks.

In some examples, device selection module 1110 determines which electronic device of the two or more available and capable electronic devices is physically closest to the electronic device that provides the user voice input data to voice input receiver module 1102 based on contextual state information included in the aggregate context (e.g., instead of, or in addition to, proximity information). Specifically, in examples where the contextual state information includes a current location of electronic devices participating in the context-sharing group (e.g., based on GPS data from GPS module 235 and/or information from a software application that has context-sharing group functionality (e.g., Home-Kit®)), device selection module 1110 compares the current location of the two or more available and capable electronic devices and determines which electronic device is physically closest to the electronic device that provided the voice input data to voice input receiver module 1102 based on the comparison. Device selection module 1110 then selects the closest electronic device to perform the one or more tasks.

In some examples, if device selection module 1110 determines, based on proximity information and/or contextual state information included in the aggregate context, that two or more available and capable electronic devices are equally as physically close to the electronic device that provided the user voice input data voice input receiver module 1102, device selection module 1110 determines, based on user attention information included in the aggregate context (e.g., data indicating whether a user is currently looking at a display of an electronic device (e.g., based on information from an optical sensor 264 on the front and/or back of the electronic device)), whether a user of the electronic device that provided the voice input data to voice input receiver module 1102 (e.g., the user that provided the user voice input) is looking at a display of an electronic device of the two or more available and capable electronic devices. As described above, in some examples, two or more electronic devices are equally as physically close to the electronic device that provided the user voice input data to voice input receiver module 1102 if a difference between their respective digital assistant trigger energy levels is less than a predetermined threshold (e.g., less than 5 decibels). In some examples, two or more electronic devices are equally as physically close to the electronic device that provided the user voice input data to voice input receiver module 1102 if contextual state information associated with each of two or more electronic devices indicates that the two or more electronic devices are each currently located within a same area of the location associated with the context sharing group (e.g., the same room, same office, or the like)).

In some examples, if device selection module 1110 determines, based on the user attention information associated with the two or more available and capable electronic devices, that a user of the electronic device that provided the user voice input data to voice input receiver module 1102 is looking at a single electronic device of the two or more available and capable electronic devices, device selection module 1110 selects the single electronic device to perform the two or more tasks. For example, if user device 906 and user device 910 are both (1) available and capable of performing the one or more tasks and (2) equally as physically close to communal device 904 (e.g., both devices are in the same room), but user attention information associated with the devices indicates that user 902 is looking at user device 906 (and not at user device 910), device selection module 1110 will select user device 906 to perform the one or more tasks. Selecting and electronic device that a user is looking at when two or more available and capable electronic devices are equally as physically close (as described above) improves a user's experience. For example, if the one or more tasks include the display of information, images, videos, or the like, a user will already be looking at the correct display to view the displayed information, images, videos, or the like instead of having to turn his or her attention to a display of another electronic device. This in turn improves a user's experience.

In some of the above examples, if the two or more available, capable, and physically close electronic devices includes the electronic device that provided the user voice input data to voice input receiver module 1102, but device selection module 1110 determines that a user is only looking at another electronic device of the two or more available and capable electronic devices, device selection module 1110 selects the electronic device that provided the user voice input data to voice input receiver module 1102. As will be described in greater detail below, in some examples, after making the above selection, device selection module 1110 instructs command module 1112 to provide a command that causes the selected electronic device to perform the one or more tasks and/or output (e.g., as an audio output and/or on a display) an offer to handoff the performance of the one or more tasks to the electronic device that the user is looking at. Device selection module provides the above instruction in addition to providing command module 1112 with the device identifier corresponding to the selected electronic device and the one or more tasks.

In some examples, if device selection module 1110 determines, based on the user attention information associated with the two or more available and capable electronic devices, that a user of the electronic device that provided the user voice input data to voice input receiver module 1102 is not looking at any of the two or more available and capable electronic devices (e.g., because none of the two or more available and capable electronic devices has a display or a communicatively connected display), device selection module 1110 determines, based on data indicating a display size included in device capability information associated with the two or more available and capable electronic devices, which electronic device of the two or more available and capable electronic devices has the largest display (including communicatively-connected displays (e.g., displays communicatively-connected to a smart TV)). For example, if device selection module 1110 determines that (1) user device 906 and communal device 908 are both available and capable of performing the one or more tasks, (2) user device 906 and communal device 908 are both equally as physically close to communal device 904 (e.g., both devices are in the same room), and (3) user 902 is not looking at user device 906 or communal device 908, then device selection module 1110 will determine whether user device 906 or communal device 908 has (or is communicatively connected to) the largest display. Device selection module 1110 then selects the single electronic device of the two or more available and capable electronic devices that has (or is communicatively connected to) the largest display.

In some examples, if device selection module 1110 determines, based on the user attention information associated with the two or more available and capable electronic devices, that a user of the electronic device that provided the user voice input data to voice input receiver module 1102 is not looking at any of the two or more available and capable electronic devices, device selection module 1110 determines, based on data indicating a speaker loudness (e.g., maximum decibel level) included in device capability information associated with the two or more available and capable electronic devices, which electronic device of the two or more available and capable electronic devices has (or is communicatively connected to) the loudest speaker(s). For example, if device selection module 1110 determines that (1) user device 906 and communal device 908 are both available and capable of performing the one or more tasks, (2) user device 906 and communal device 908 are both equally as physically close to communal device 904 (e.g., both devices are in the same room), and (3) user 902 is not looking at user device 906 or communal device 908, then device selection module 1110 will determine whether user device 906 or communal device 908 has (or is communicatively connected to) the largest speaker(s). Device selection module 1110 then selects the single electronic device of the two or more available and capable electronic devices that has (or is communicatively connected to) the loudest speaker(s).

In some examples, if device selection module 1110 determines, based on the user attention information associated with the two or more available and capable electronic devices, that a user of the electronic device that provided the user voice input data to voice input receiver module 1102 is not looking at any of the two or more available and capable electronic devices, device selection module 1110 simply selects the two or more available and capable electronic devices. As will be described in greater detail below, when device selection module 1110 selects two or more available and capable electronic devices in the above examples, device selection module 1110 provides command module 1112 with (1) device identifiers corresponding to the two or more available and capable electronic devices, (2) the one or more tasks, and (3) an instruction to provide a command that causes the electronic device that provided the user voice input data to voice input receiver module 1102 (e.g., communal device 904) to output a query requesting the user to select an electronic device of the two or more electronic devices to perform the one or more tasks.

As will be described in greater detail below with reference to FIGS. 12A-12B, in some examples, if task determination module 1108 determines a plurality of tasks (e.g., more than one task) and device selection module 1110 determines, based on proximity information and/or contextual state information included in the aggregate context, that two or more available and capable electronic devices are equally as physically close to the electronic device that provided the user voice input data voice input receiver module 1102, device selection module 1110 selects at least two of the two or more electronic devices to each perform at least one task of the plurality of tasks. These examples are referred to as "multimodal task performance," as the above selection results in two or more electronic devices concurrently performing tasks (of the plurality of tasks) to fulfill a user request. For example, if device selection module 1110 determines that user device 906 and communal device 908 are both available, capable, and proximate to communal device 904 (e.g., in the same room), device selection module may select both user device 906 and communal device 908 to perform at least one task of the plurality of tasks. In these examples, after selecting at least two electronic devices to perform the one or more tasks, device selection module 1110 assigns a set of tasks of the plurality of tasks to each of the selected electronic devices. A set of tasks can include one task of the plurality of tasks or multiple tasks of the plurality of tasks. Returning to the above example, device selection module 1110 may assign a first set of tasks to user device 906 (e.g., performing a search, retrieving data/information, and providing an audio output including the retrieved data/information (e.g., a digital assistant response)) and a second set of tasks to communal device 908 (e.g., performing a search, retrieving data/information, and providing (e.g., displaying) a visual output including the retrieved data/information (e.g., a textual representation of the digital assistant response output by user device 906)). As noted in the example above, in some examples, device selection module assigns one or more of the same tasks to each of the at least two selected electronic devices. For example, device selection module 1110 may assign the tasks of performing a search and retrieving data/information based on the search to all of the selected electronic devices (e.g., such that each electronic device is able to provide an output including the retrieved data/information).

In some examples, device selection module 1110 selects at least two of the two or more available, capable, and proximate electronic devices for multimodal task performance instead of determining, based on user attention information included in the aggregate context, whether a user is looking at an electronic device of the two or more electronic devices. In some examples, device selection module 1110 selects at least two of the two or more available, capable, and proximate electronic devices for multimodal task performance even if device selection module 1110 determines that a user of the electronic device that provided the user voice input data to voice input receiver module 1102 is looking at a single electronic device of the two or more available, capable, and proximate electronic devices.

In some examples, device selection module 1110 selects the at least two electronic devices for multimodal task performance based on the plurality of tasks including one or more specific tasks (e.g., if the plurality of tasks include displaying a particular type of information (e.g., images, recipes, or the like), if the plurality of tasks include providing an audio output and a visual output, if the plurality of tasks include user authentication (e.g., to make a purchase), or the like). In these examples, if device selection module 1110 determines that the plurality of tasks includes one or more specific tasks, device selection module 1110 selects the at least two electronic devices for multimodal task performance instead of (1) determining whether a user is looking at an electronic device and/or (2) selecting a single electronic device that the user is looking at. For example, device selection module 1110 may select the at least two electronic devices for multimodal task performance if device selection module 1110 determines that the plurality of tasks includes a task of user authentication.

In some examples, device selection module selects the at least two electronic devices for multimodal task performance based on the determined user intent corresponding to the plurality of tasks. In these examples, device selection module selects the at least two electronic devices for multimodal task performance instead of (1) determining whether a user is looking at an electronic device and/or (2) selecting a single electronic device that the user is looking at. For example, if the plurality of tasks correspond to a user intent of providing a food recipe or a user intent of purchasing a movie, device selection module 1110 will select at least two electronic devices for multimodal task performance in response to determining that the at least two electronic devices are available, capable, and proximate to the electronic device that provided the user voice input data to voice input receiver module 1102.

As will be described in greater detail below, when device selection module 1110 selects at least two electronic devices for multimodal task performance in the above examples, device selection module 1110 provides command module 1112 with (1) device identifiers corresponding to the at least two electronic devices, (2) a set of tasks (of the plurality of tasks) associated with each device identifier, and (3) an instruction to provide a command to each of the selected electronic devices that causes each electronic device to perform its associated set of tasks.

In some examples, device selection module 1110 determines that none of the electronic devices participating in the context-sharing group are available. For example, all of the electronic devices in context-sharing group would be unavailable if context information included in the aggregate context indicates that user device 906 and user device 910 are face down (and thus do not have visible displays) and if communal device 904 and communal device 908 are already performing a task for a user and/or have an open/active software application (e.g., that a user is interacting with). In these examples, device selection module 1110 selects a single capable and/or proximate electronic device (proximate to the electronic device that provided the voice input data to voice input receiver module 1102) as described above. In some examples, device selection module selects more than one capable and/or proximate electronic device. Then, as will be described in greater detail below, device selection module 1110 provides command module 1112 with (1) a device identifier corresponding to the selected electronic device, (2) the one or more tasks, and (3) an instruction to provide a command that causes the selected electronic device to output results of the performance of the one or more tasks (e.g., data retrieved based on the performance of the one or more tasks, audio and/or text output data generated based on the performance of the one or more tasks, etc.) within a notification. In some examples, the notification includes retrieved data/information. In some examples, the notification provides a link or an affordance that, when selected (e.g., pressed) by a user of the electronic device, causes the electronic device to output a digital assistant response as an audio output and/or as text on a display of the electronic device (e.g., a digital assistant response that includes retrieved data/information).

As described above, in some examples, system 1100 is able to access and utilize user data associated with one or more electronic devices participating in a context-sharing group when that user data is, for example, stored on the one or more remote devices that are implementing system 1100 (e.g., server 916). For example, user intent module 1106 may access and utilize user data when determining the one or more user intents. Similarly, in some of the above examples, after device selection module 1110 selects an electronic device to perform the one or more tasks (e.g., before device selection module provides device identifiers, the one or more tasks, and/or instructions to command module 1112), device selection module 1110 determines, based on the determined user intent and/or the one or more tasks, whether or not there is user data (e.g., a user's media, contacts, speech profiles, preferences, or the like) that is stored on the one or more remote devices that is needed for the performance of the one or more tasks. For example, if the one or more tasks include a task of playing a specific song (e.g., a song by a specific artist (e.g., based on the user voice input "Hey Siri, play a Taylor Swift song.")), device selection module may determine that audio data corresponding to the specific song is needed to perform the one or more tasks.

If device selection module 1110 determines that there is stored user data needed for the performance of the one or more tasks, device selection module determines whether the selected electronic device has access to that stored user data (e.g., if the stored user data is also stored locally on the selected electronic device, such that the selected electronic device may access and utilize the user data when performing the one or more tasks). Device selection module 1110 makes this determination based on the user data associated with the selected electronic device that is stored on the one or more remote devices (e.g., because the user data stored on the one or more remote devices indicates what user data is stored on the selected electronic device when, for example, the selected electronic device periodically syncs/transmits its stored user data to the one or more remote devices). Specifically, if the user data that is needed to perform the one or more tasks is not included in the user data associated with the selected electronic device that is stored on the one or more remote devices (e.g., the user data is only included in the stored user data associated with another electronic device participating in the context-sharing group), then device selection module 1110 determines that the selected electronic device does not have access to the user data that is needed. Returning to the previous example, if the selected electronic device is user device 906 and device selection module determines that the user data associated with user device 906 (stored on server 916) does not include the audio data corresponding to the specific song (e.g., the audio data is only included in stored user data associated with one or more other electronic devices (e.g., user device 910)), device selection module 1110 will determine that user device 906 does not have access to the audio data.

If device selection module 1110 determines that the selected electronic device does not have access to the user data needed to perform the one or more tasks, device selection module retrieves the stored user data and provides the user data to command module 1112 (e.g., when device selection module 1110 provides the device identifiers, one or more tasks, and/or instructions to command module 1112). Specifically, device selection module provides command module 1112 with (1) a device identifier corresponding to the selected electronic device, (2) the one or more tasks associated with the device identifier, (3) the retrieved user data, and (4) an instruction to provide a command to the selected electronic device that causes the selected electronic device to perform the one or more tasks based on the retrieved user data. Returning to the previous example, after determining that user device 906 does not have access to the stored audio data corresponding to the specific song, device selection module 1110 will retrieve the audio from the stored user data associated with another electronic device participating in context-sharing group 914 (e.g., user device 910) and subsequently provide the audio data to command module 1112 with the device identifier corresponding to user device 906 so that command module 1112 may generate a command that will cause user device 906 to play the specific song using the retrieved audio data.

In some examples, the other electronic device that is associated with the retrieved user data (e.g., user device 910) must be registered to the user that provides the user voice input (e.g., user 902) in order for device selection module 1110 to retrieve the user data for task performance at the selected electronic device (e.g., user device 906). For example, if user device 906 and user device 910 are registered to two separate users, device selection module 1110 will not be able to retrieve stored user data associated with user device 910 for task performance at user device 906 (and vice versa). In other examples, device selection module 1110 can retrieve stored user data associated with any electronic device that is currently participating in the context-sharing group (even if the registered user for an electronic device is different from the registered user that provided the user voice input).

In some examples, device selection module 1110 retrieves stored user data associated with an electronic device registered to the user that provides the user voice input only if the electronic device is participating in the same context-sharing group as the selected electronic device. For example, if user 902 is the registered user of another electronic device that is not currently participating in context-sharing group 914, then device selection module 1110 cannot retrieve user data associated with that other electronic device until that other electronic device joins context-sharing group 914. As another example, if user device 910 is registered to user 902, but user device 910 leaves context-sharing group 914 (e.g., by disconnecting from network 912) before device selection module 1110 retrieves user data from the stored user data associated with user device 910, then device selection module 1110 will not be able to retrieve user data from the stored user data associated with user device 910 or provide that user data to command module 1112. Note, in some examples, communal devices (e.g., communal device 904) do not store user data and/or do not sync user data to remote devices (e.g., server 916). In these examples, device selection module 1110 can only retrieve and provide user data associated with user devices (e.g., user device 906 and/or user device 910) that are registered to the user that provides the user voice input.

System 1100 includes command module 1112. Command module 1112 (1) receives device identifiers, tasks, instructions, and/or user data from device selection module 1110, (2) generates one or more commands based on the received device identifiers, tasks, instructions, and/or user data, and (3) provides the one or more commands with associated device identifiers (and, in some examples, user data) to the electronic device that provided the voice input data to voice input receiver module 1102 (e.g., because that is the only electronic device participating in the context-sharing group that the remote device (e.g., server 916) is in communication with). For example, after determining one or more commands, command module 1112 will transmit the one or more commands and a device identifier associated with each command to communal device 904. As discussed above, the commands generated by command module 1112 will cause electronic devices to perform various tasks based on the determinations and selections made by device selection module 1110. Specifically, there are several ways in which the one or more commands generated by command module 1112 may vary based on the device identifiers, tasks, instructions, and/or user data received from device selection module 1110, each of which is discussed in turn below.

If command module 1112 receives (1) a single device identifier corresponding to a selected electronic device and (2) one or more tasks, command module 1112 will generate a command that will cause the selected electronic device to perform the one or more tasks. In some examples, the command further causes the selected electronic device to output an audio and/or visual digital assistant response based on the performance of the one or more tasks (e.g., "I have stopped your alarm." or "Now playing Taylor Swift."). In some examples, command module 1112 generates an additional command that will cause the electronic device that provided the user voice input data to voice input receiver module 1102 (e.g., communal device 904) to output an audio and/or visual digital assistant response that indicates which electronic device was selected to perform the one or more tasks (e.g., "Directions to San Jose Airport are ready on your phone." or "Now showing photos on your TV.").

If command module 1112 receives (1) two or more device identifiers corresponding to two or more electronic devices, (2) the one or more tasks, and (3) an instruction to provide a command that causes the electronic device that provided the user voice input data to voice input receiver module 1102 (e.g., communal device 904) to output a query requesting the user to select an electronic device of the two or more electronic devices to perform the one or more tasks, command module 1112 will generate two commands. The first command will cause the user-selected electronic device to perform the one or more tasks. The second command will cause the electronic device that provided the user voice input data to voice input receiver module 1102 to (1) output a query (e.g., as an audio output and/or as text on a display) requesting the user to select an electronic device of the two or more selected electronic devices to perform the one or more tasks (e.g., "Do you want to see your photos on your iPhone or your iPad?") and (2) transmit the first command to the user-selected electronic device (e.g., after receiving the user's response to the query (e.g., the user's response being a second user voice input or a selection of a displayed affordance corresponding to one of the two or more electronic devices)).

In some examples, the first command further causes the user-selected electronic device to output an audio and/or visual digital assistant response based on the performance of the one or more tasks (e.g., "I have stopped your alarm." or "Now playing Taylor Swift."). In some examples, the second command further causes the electronic device that provided the user voice input data to voice input receiver module 1102 to output an audio and/or visual digital assistant response after receiving the user selection that indicates the electronic device that was selected to perform the one or more tasks (e.g., "Now showing photos on your iPad.").

If command module 1112 receives (1) a device identifier corresponding to the selected electronic device, (2) the one or more tasks, and (3) an instruction to provide a command that causes the selected electronic device to output results of the performance of the one or more tasks within a notification, command module 1112 will generate a command that will cause the selected electronic device to perform the one or more tasks and subsequently provide a notification (e.g., a notification that appears on a lock-screen interface of the selected electronic device, in a notification history interface of the selected electronic device, and/or the like) that includes results of the performance of the one or more tasks. In some examples, the command further causes the selected electronic device to output an audio indication when the notification is provided. In some examples, command module 1112 generates an additional command that will cause the electronic device that provided the user voice input data to voice input receiver module 1102 (e.g., communal device 904) to output an audio and/or visual digital assistant response that indicates that none of the electronic devices participating in the context-sharing group are available to perform the one or more tasks and/or indicates that further information related to the user's request may be found on the selected electronic device (e.g., "None of your devices can show pictures at the moment. Please see your iPhone for more information.").

If command module 1112 receives (1) a device identifier corresponding to the selected electronic device, (2) the one or more tasks, (3) an instruction to provide a command that causes the selected electronic device to output (e.g., as an audio output and/or on a display) an offer to handoff the performance of the one or more tasks to another electronic device (e.g., an electronic device that the user is looking at), and (4) a second device identifier corresponding to the other electronic device, command module 1112 will generate a command that will cause the selected electronic device to output the offer to handoff the performance of the one or more tasks to the other electronic device corresponding to the second device identifier (e.g., "Would you prefer to see the lasagna recipe on your iPad?"). In some examples, the command further causes the selected electronic device to perform the one or more tasks and subsequently output the offer to handoff the performance of the one or more tasks to the other electronic device along with results of the performance of the one or more tasks (e.g., "Here is a lasagna recipe that I found. Did you want to see that on your iPad?").

If command module receives (1) device identifiers corresponding to two or more selected electronic devices, (2) a set of tasks associated with each device identifier, and (3) an instruction to provide a command to each of the two or more selected electronic devices that causes each electronic device to perform its associated set of tasks, command module 1112 will generate a command for each device identifier. For example, if command module 1112 receives a device identifier corresponding to user device 906, a device identifier corresponding to communal device 908, and a sets of tasks associated with each device identifier, command module 1112 will generate a first command that will cause user device 906 to perform its associated set of tasks and a second command that will cause communal device 908 to perform its associated set of tasks. In some examples, at least one command of the two or more commands that command module 1112 generates further causes a selected electronic device to output an audio and/or visual digital assistant response based on the performance of the one or more tasks (e.g., "There are several Star Wars movies to choose from, as shown on your TV. The first movie is . . . ").

In some examples, command module 1112 determines whether or not a set of tasks received from device selection module 1110 includes a task of user authentication (e.g., user authentication to make a purchase). In these examples, if command module 1112 determines that a set of tasks includes a task of user authentication, command module 1112 will transmit that set of tasks to the electronic device that provided the user voice input data to voice input receiver module 1102 (e.g., communal device 904) and forgo transmitting the commands corresponding to the remaining sets of tasks. Command module 1112 will forgo transmitting the commands corresponding to the remaining sets of tasks until command module 1112 (or one or more other modules of system 1100) authenticates a user (e.g., based on a comparison of stored user authentication data to authentication data provided to the electronic device that performs the set of tasks that includes a task of user authentication) or until command module 1112 (or one or more other modules of system 1100) receives an indication that a user has been authenticated from the electronic device that provided the user voice input data (e.g., when the electronic device that performs the set of tasks locally authenticates a user instead of providing the authentication data for command module 1112 to authenticate the user). After authenticating a user or receiving an indication that a user has been authenticated, command module transmits the commands corresponding to the remaining sets of tasks to the electronic device that provided the user voice input data. An example of this process is described in greater detail below with reference to FIG. 12B.

If command module 1112 receives (1) a device identifier corresponding to a selected electronic device, (2) one or more tasks associated with the device identifier, (3) retrieved user data, and (4) an instruction to provide a command to the selected electronic device that causes the selected electronic device to perform the one or more tasks based on the retrieved user data, command module 1112 will generate a command that will cause the selected electronic device to perform the one or more tasks based on the retrieved user data. In some examples, the command further causes the selected electronic device to output an audio and/or visual digital assistant response based on the performance of the one or more tasks (e.g., "Now playing Taylor Swift." or "Calling Daenerys Targaryen."). In some examples, command module 1112 generates an additional command that will cause the electronic device that provided the user voice input data to voice input receiver module 1102 (e.g., communal device 904) to output an audio and/or visual digital assistant response that indicates which electronic device was selected to perform the one or more tasks (e.g., "Now playing Taylor Swift on your HomePod." or "Calling Daenerys Targaryen on your iPhone.").

Note, while the above description separately describes the different types of commands that command module 1112 generates, it should be appreciated that, in some examples, command module 1112 generates more than one type of command in response to a single user voice input. For example, if user voice input 918 is "Hey Siri, play a Taylor Swift song," device selection module 1110 may provide command module 1112 with (1) an instruction to provide a command that causes communal device 904 to output a query requesting user 902 to select an electronic device to perform the one or more tasks, (2) retrieved audio data corresponding to a Taylor Swift song, and (3) an instruction to provide a command to the user-selected electronic device that causes the user-selected electronic device to perform the one or more tasks based on the retrieved audio data. In response, command module 1112 may generate a first command that will cause the user-selected electronic device to perform the one or more tasks based on the retrieved audio data and a second command that will cause communal device 904 to (1) output a query (e.g., as an audio output and/or as text on a display) requesting the user to select an electronic device of two or more selected electronic devices to perform the one or more tasks based on the retrieved audio data and (2) transmit the first command to the user-selected electronic device along with the retrieved audio data. Thus, as shown in the above example, command module 1112 generates a first type of command (e.g., directed to the performance of one or more tasks based on retrieved user data) and a second type of command (e.g., directed to the user selection of an electronic device that will perform the one or more tasks) in response to a single user voice input.

After generating one or more commands (e.g., as described above), command module 1112 transmits the one or more commands (with associated device identifiers) to the electronic device that provided the user voice input data to voice input receiver module 1102. In the examples described above where command module 1112 receives user data retrieved by device selection module 1110, command module 1112 further transmits the user data (with associated device identifiers) to the electronic device that provided the user voice input data to voice input receiver module 1102. As will be described in greater detail below with reference to FIG. 9, after receiving the one or more commands (and, in some examples, user data), the electronic device that provided the user voice input data to voice input receiver module 1102 transmits the one or more commands to one or more electronic device participating in the context-sharing group based on the device identifiers associated with the one or more electronic devices.

Returning to FIG. 9, as represented by arrows 926, communal device 904 receives, from server 916, a command to perform one or more tasks (e.g., generated by command module 1112) and a device identifier (associated with the command) that corresponds to user device 906. In some examples, communal device 904 also receives user data that was stored on server 916 (e.g., when the command is to perform one or more tasks based on the user data). It should be appreciated that although arrows 926 represent communal device receiving a single command to perform one or more tasks at a single selected electronic device, communal device 904 may alternatively or additionally receive any of the types of commands described above with reference to command module 1112 (or any combination of those command types).

As represented by arrows 928 and 928*a*, after receiving the command to perform the one or more tasks and device identifier corresponding to user device 906, communal device 904 transmits the command to user device 906 (e.g., based on the stored associations between electronic devices participating in context-sharing group 914 and their device identifiers). After user device 906 receives the command, the command causes user device 906 to perform the one or more tasks. As discussed above, in some examples, communal device 904 receives an additional command from server 916 that causes communal device 904 to output an audio and/or visual digital assistant response that indicates that user device 906 was selected to perform the one or more tasks (e.g., "I have stopped the alarm on your iPhone." "Now showing photos on your iPhone.").

In some examples, prior to transmitting a command to an electronic device (e.g., as represented by arrows 928 and 928*a*), communal device 904 determines whether the device identifier associated with the command corresponds to a client device (e.g., user device 906 or user device 910). If communal device 904 determines that the device identifier corresponds to a client device, communal device determines whether user 902 is the registered user of the client device. For example, if the device identifier received by communal device corresponds to user device 910 (instead of user device 906), communal device 904 may determine whether user 902 is the registered user of user device 910. Then, if communal device determines that user 902 is not the registered user of user device 910, communal device 904 determines whether user 902 is an authorized user of user device 910.

In some examples, an authorized user is a user of a client device (other than the registered user of the client device) that the registered user has granted access to control and/or make user requests on the client device. In some examples, an authorized user of a client device may only control and/or make user requests on the client device when the client device is participating in a context-sharing group. Authorized user information is provided by a registered user of a client device (e.g., when the registered user is enrolling the client device in a context-sharing group, or any time after) via a software application stored on the client device (e.g., via the HomeKit® application) and/or via a website that has context-sharing group functionality. Thus, returning to the previous example, communal device 904 determines whether user 902 is an authorized user of user device 910 by accessing the authorized user information associated with user device 910 (e.g., via the software application and/or website). In some examples, determining whether user 902 is an authorized user of user device 910 includes communal device outputting a request for user authentication (e.g., voice authentication, password authentication, and/or biometric authentication (e.g., face and/or fingerprint authentication)). Then, after receiving user authentication data from user 902, communal device compares the user authentication data to user authentication data included in the authorized user information associated with user device 910 to determine whether user 902 is an authorized user of user device 910. As represented by arrows 928 and 928*b*, in response to determining that user 902 is an authorized user of user device 910, communal device 904 transmits the command to user device 910.

Note, in some examples, server 916 (e.g., device selection module 1110) determines whether user 902 is a registered user of user device 910 prior to transmitting a command and a device identifier (corresponding to user device 910) to communal device 904 (e.g., as represented by arrows 926). For example, server 916 determines whether user 902 is a registered user of user device 910 based on user data associated with user device 910 (e.g., user voice profile information associated with a registered user of user device 910) that is stored on server 916. In these examples, as represented by arrows 925, if server 916 determines that user 902 is not a registered user of user device 910, server 916 (e.g., command module 1112) transmits a command to communal device 904 that causes communal device 904 to output a request for user authentication, receive user authentication data (from user 902), and then determine whether user 902 is an authorized user of user device 910 based on the received authentication data. Then, as represented by arrows 927, if communal device 904 determines that user 902 is an authorized user of user device 910, communal device 904 transmits an indication that user 902 is an authorized user of user device 910 to server 916. After receiving this indication, server 916 transmits the command and the device identifier (corresponding to user device 910) to communal device 904 (e.g., as represented by arrows 926), and communal device 904 transmits the command to user device 910, as represented by arrows 928 and 928*b*.

6. System and Technique for Multimodal Task Performance in a Context-Sharing Group FIGS. 12A-12B illustrate a system and technique for multimodal task performance in a context-sharing group, according to various examples. As shown in FIGS. 12A-12B, system 1200 includes communal device 1204, communal device 1206, and user device 1210, all of which are participating in context-sharing group 1214 (which is associated with a specific location (e.g., a home, an office, or the like)). User device 1210 is a client device (e.g., user device 104, 122, 200, 400, or 600). For example, user device 1210 is an iPhone®. In the examples described below, user device 1210 is registered to user 1202. Communal device 1204 is a smart speaker that has the same or similar digital assistant capabilities as user device 1210. Communal device 1206 is a smart TV that has the same or similar digital assistant capabilities as the user devices. Communal device 1206 is communicatively connected to display 1208 (e.g., a TV, a monitor, or the like). Further, communal device 1206 is the context collector of context-sharing group 1214 (e.g., because communal device 1206 was previously elected to be context collector). As discussed above with reference to FIG. 8, communal devices are not registered to a single user or are registered to multiple users (e.g., such that the communal device may be used by multiple users without additional user registration and/or user authentication requirements). For example, communal device 1204 is a HomePod® and communal device 1206 is an Apple TV®.

System 1200 further includes network 1212 and server 1216 (e.g., DA server 106). Network 1212 is a wireless communications network (e.g., network(s) 110). As shown, communal device 1204, communal device 1206, and user device 1210 communicate with one another and with server 1216 via network 1212 (and thus are each connected to network 1212). Server 1216 is a remote device that is not participating in context-sharing group 1214. In some examples, system 1200 includes one or more other remote devices (e.g., a local server, a cloud-computing system, or the like) instead of server 1216. It should be recognized that, in these examples, any of the operations performed by communal device 1204, communal device 1206, and/or user device 1210 can instead be performed by server 1216. For example, server 1216 can perform the operations of the respective DA client modules (e.g., DA client module 229) of communal device 1204, communal device 1206, and/or user device 1210.

Figure 12A:
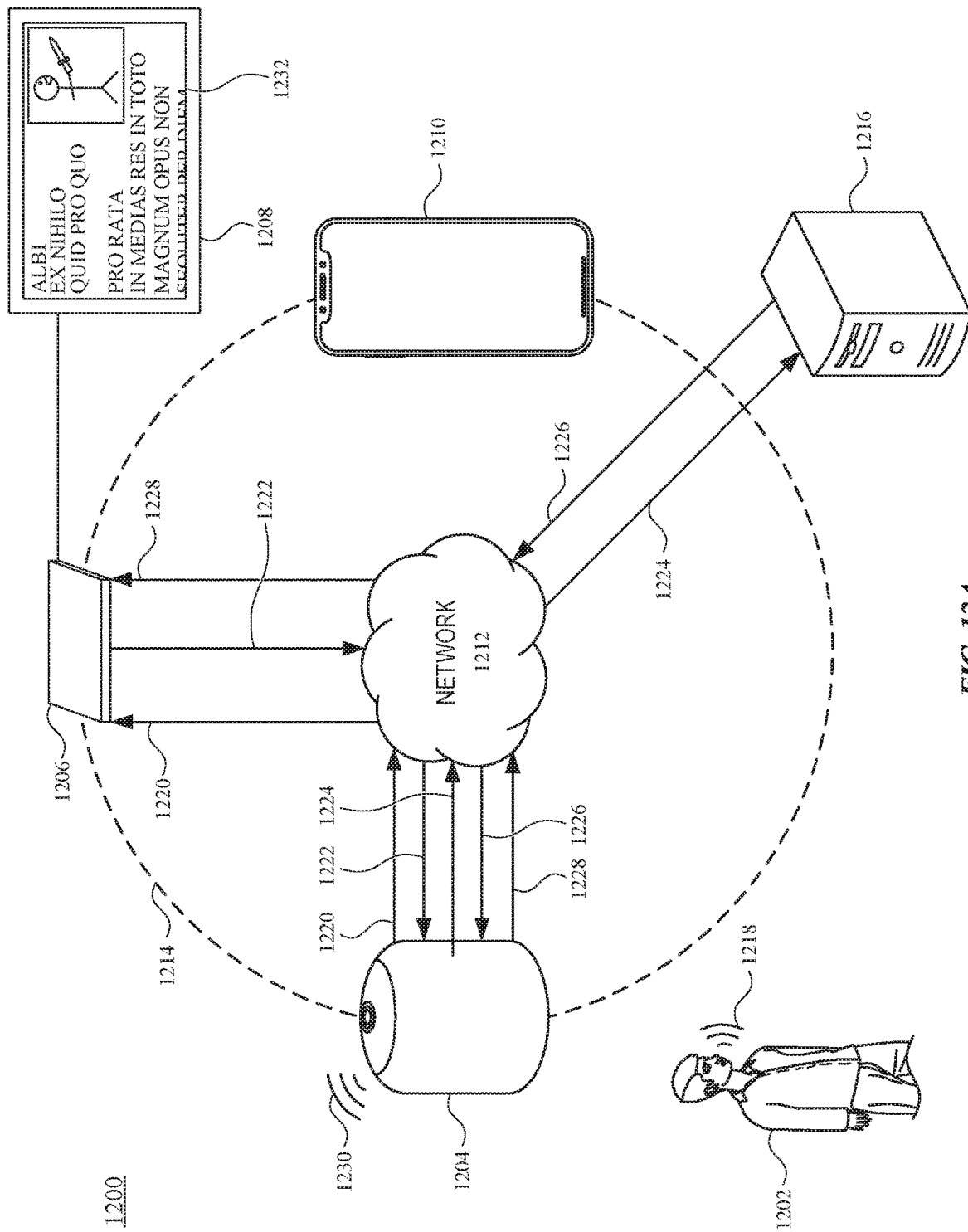
FIGS. 12A-12B illustrate a system and technique for multimodal task performance in a context-sharing group, according to various examples.

As shown in FIG. 12A, user 1202 provides user voice input 1218 (e.g., "Hey Siri, show me Star Wars movies." or "Hey Siri, what is Star Wars."), which is received by communal device 1204.

As represented by arrows 1220, in response to receiving user voice input 1218 (or, in some examples, in response to detecting a digital assistant trigger included in user voice input 1218), communal device 1204 transmits a request (via network 1212) to communal device 1206 (i.e., the context collector of context-sharing group 1214) for communal device 1206 to transmit an aggregate context of context-sharing group 1214 to communal device 1204.

As represented by arrows 1222, after receiving the request for the aggregate context from communal device 1204, communal device 1206 transmits the aggregate context (or, in some examples, at least a portion of the aggregate context) to communal device 1204. In some examples, the request for the aggregate context causes communal device 1206 to transmit the aggregate context (e.g., data corresponding to the aggregate context), or at least a portion of the aggregate context, to communal device 1204. The aggregate context transmitted to communal device 1204 includes context information (e.g., device state change information, contextual state information, device capability information, proximity information, and/or the like) associated with at least communal device 1204, communal device 1206, and user device 1210 (e.g., because communal device 1204, communal device 1206, and user device 1210 each recently underwent a device state change (e.g., a timer event, detecting a digital assistant trigger, playing a movie, etc.)). Specifically, the context information is associated with at least communal device 1204, communal device 1206, and user device 1210 based on the device identifiers that communal device 1206 receives with the context information from at least communal device 1204, communal device 1206, and user device 1210. In some examples, the aggregate context does not include any other type of device identification or identifying information other than the device identifiers received with context information included in the aggregate context.

In other examples, the aggregate context does include other types of device identifications and/or information identifying a registered user of each electronic device (in addition to the device identifiers). This in turn allows server 1216 to determine whether electronic devices participating in a context-sharing group are registered to a single user or two or more different users (as this information may influence the commands that server 1216 provides). In some examples, device identifications and/or information identifying a registered user of each electronic device included in the aggregate context allows server 1216 to determine whether or not a user voice input is provided by a registered. Further, in some examples, server 1216 uses this additional identifying information to access and/or utilize user data that is stored on server 1216 and that is associated with one or more of the electronic devices (e.g., user data that an electronic device participating in the context-sharing group 914 previously synced/transmitted to the remote devices (e.g., during an automatic and/or periodic user data sync)).

As represented by arrows 1224, after receiving the aggregate context from communal device 1206, communal device 1204 transmits data corresponding to user voice input 1218 and at least a portion of the aggregate context to server 1216.

In some examples, communal device 1204 provides audio data corresponding to user voice input 1218 to server 1216. In some examples, communal device 1204 performs speech-to-text processing of user voice input 1218 (e.g., using STT processing module 730) and provides text data corresponding to user voice input 1218 (e.g., a textual representation of user voice input 1218) to server 1216. In some examples, communal device 1204 further performs natural language processing of the text data corresponding to user voice input 1218 (e.g., using natural language processing module 732) and provides results of the natural language processing (e.g., one or more user intents) to server 1216.

In some examples, communal device 1204 provides all of the aggregate context to server 1216. In some examples, communal device 1204 determines what context information included in the aggregate context is relevant to user voice input 1218 (e.g., when communal device 1204 performs natural language processing of user voice input 1218) and only provides the relevant context information to server 1216. In some examples, communal device 1204 determines what context information is relevant based on one or more domains of an active ontology (e.g., ontology 760) that correspond to user voice input 1218 (e.g., by identifying the context information that is related to or associated with the one or more domains corresponding to user voice input 1218). In some examples, communal device 1204 removes personal information (e.g., email addresses, home addresses, payment information, or the like) and/or user data (e.g., a user's preferences, media, contacts, speech profiles, or the like) included in the aggregate context prior to providing the aggregate context to server 1216. In some examples, communal device 1204 encrypts personal information and/or user data included in the aggregate context prior to providing the aggregate context to server 1216 (instead of removing the personal information and/or user data).

After receiving the data corresponding to user voice input 1218 and the at least a portion of the aggregate context, server 1216 (1) determines one or more user intents, (2) determines a plurality of tasks corresponding to the one or more user intents, (3) selects two electronic devices to perform the plurality of tasks, and (4) generates two separate commands (based on the data corresponding to user voice input 1218 and context information included in the at least a portion of the aggregate context), as described above with reference to FIG. 11 and the modules of system 1100. Specifically, server 1216 (e.g., device selection module 1110) determines that communal device 1204 and communal device 1206 are both available, capable of performing at least one task of the plurality of tasks, and proximate to communal device 1204 (i.e., the device that provided the data corresponding to user voice input 1218 to server 1216 (e.g., to voice input receiver module 1102)). Thus, server 1216 selects communal device 1204 and communal device 1206 for multimodal task performance and assigns a set of tasks to each device (with each set of tasks including at least one tasks of the plurality of tasks). Accordingly, server 1216 (e.g., command module 1112) generates a first command to perform the first set of tasks and a second command to perform the second set of tasks. The first command is associated with a device identifier corresponding to communal device 1204, and the second command is associated with a device identifier corresponding to communal device 1206. Note, in some examples, one or more tasks of the first set of tasks are identical to one or more tasks of the second set of tasks (e.g., the first set and the second set both include a task of performing a search and a task of retrieving data/information based on the search). Further, in some examples, server 1216 selects more than two electronic devices for multimodal task performance (e.g., three electronic devices, four electronic devices, or the like) and thus assigns a set of tasks to each of the more than two electronic devices and generates a separate command to perform each set of tasks.

As represented by arrows 1226, server 1216 transmits the first and second commands with their associated device identifiers to communal device 1204. In some examples, server 1216 also transmits user data that was stored on server 1216 to communal device 1204 (e.g., so that communal device 1204 and/or communal device 1206 may perform one or more tasks based on the user data).

As represented by arrows 1228, after receiving the first and second commands with their associated device identifiers, communal device 1204 transmits the second command to communal device 1206 based on the device identifier corresponding to communal device 1206 (e.g., based on the stored associations between electronic devices participating in context-sharing group 1214 and their device identifiers). Further, based on the device identifier corresponding to communal device 1204 being associated with the first command, communal device 1204 determines that it is to perform the first set of tasks. Thus, after communal device 1206 receives the second command, communal device 1204 performs the first set of tasks and communal device 1206 performs the second set of tasks. In some examples, communal device 1204 and communal device 1206 concurrently perform their respective sets of tasks such that each device concurrently outputs results of the performance of their respective set of tasks.

In some examples, the performance of the first set of tasks (by communal device 1204) and the second set of tasks (by communal device 1206) causes a division of the audio and visual output of results of the performance of the tasks between communal device 1204 and communal device 1206. For example, if user voice input 1218 is "Hey Siri, show me Star Wars movies", the first set of tasks and the second set of tasks will each contain the tasks of performing a search for Star Wars movies and retrieving data/information for the Star Wars movies (e.g., movie titles, year of release, director, and/or the like). However, the first set of tasks will include a task of outputting the retrieved data/information within an audio output (e.g., within a digital assistant response) whereas the second set of tasks will include a task of outputting the retrieved data/information within a visual audio output. Thus, as represented by audio output 1230, after performing the first set of tasks, communal device 1204 will, for example, output an audio digital assistant response (via one or more speakers) that includes at least a portion of the retrieved data/information (e.g., "I found several Star Wars movies. Star Wars: A New Hope. Star Wars: The Empire Strikes Back . . . ."). Further, as represented by results interface 1232, after performing the second set of tasks, communal device 906 will, for example, display (on display 1208) an interface including at least a portion of the retrieved data/information (e.g., Star Wars movie titles with corresponding images). Although two separate devices are providing outputs in the above example, the data/information included in the outputs is the same. As such, user 1202 will be able to view the data/information included in interface while listening to the corresponding data/information included in audio output 1230. Accordingly, the division of audio and visual outputs between at least two electronic devices (as described above) improves a user's digital assistant experience, as it ensures that a user is able to both view and hear a response to a user request even if the device that initially receives the user request does not, for example, have a display.

In some examples, the performance of the first set of tasks (by communal device 1204) and the second set of tasks (by communal device 1206) causes one device to provide a summary response and another device to provide a more detailed response. For example, if user voice input 1218 is "Hey Siri, what is Star Wars?", the first set of tasks and the second set of tasks will each contain the tasks of performing a search for Star Wars and retrieving data/information associated with Star Wars (e.g., genre information, creator information, plot information, country of origin, and/or the like). However, the first set of tasks will include a task of outputting a brief summary of the retrieved data/information, such as outputting short list of data/information and/or a high-level overview of the data/information. Thus, as represented by audio output 1230, after performing the first set of tasks, communal device 1204 will, for example, output an audio digital assistant response (via one or more speakers) that includes a brief summary of the data/information retrieved by communal device 1204. In some examples, audio output 1230 further directs user 1202 to refer to communal device 1206 for a more detailed response (e.g., "More information about Star Wars is displayed on your TV."). As represented by results interface 1232, after performing the second set of tasks, communal device 1206 will, for example, display (on display 1208) an interface including a detailed summary of the retrieved data/information that includes hyperlinks, images, and/or other information that is not included in the brief summary output by communal device 1204 (e.g., Star Wars movie titles with corresponding images, hyperlinks to Star Wars fan pages, links to purchase Star Wars movies, and/or the like). Note, while the above example separates the brief summary and the detailed summary between audio and visual outputs, in some examples, the brief summary and the detailed summary are both provided as visual outputs (e.g., on displays of two separate devices). Providing a brief summary and a detailed summary of retrieved data/information in response to a user request (as described above) improves a user's digital assistant experience, as it ensures that a user is able to view and/or hear a brief response to the user request while having the option to quickly view and/or hear a more detailed response if the user wants to know more about the topic of the request (e.g., instead of having to provide a follow-up user request or perform manual searching for more detailed information).

Although not illustrated in FIG. 12A, after communal device 1204 provides audio output 1230, communal device 1204 transmits context information to communal device 1206 (e.g., because the provision of audio output 1230 is a device state change (e.g., the end of a digital assistant dialog session)). The context information includes a digital assistant dialog session history that includes data (e.g., text data) corresponding to audio output 1230, as well as data indicating the data/information retrieved as a result of the performance of the first set of tasks. Upon receiving the context information from communal device 1204, communal device 1206 incorporates the context information into the aggregate context. Similarly, after communal device 1206 provides results interface 1232 (via display 1208), communal device incorporates its own context information into the aggregate context (e.g., because the provision of results interface 1232 is a device state change (e.g., the end of a digital assistant response and/or opening/activation of a software application)). The context information that communal device incorporates into the aggregate context includes data indicating the data/information that is displayed in results interface 1232 (e.g., data indicating the results of the performance of the second set of tasks). The aggregate context that includes the new context information associated with communal device 1204 and communal device 1206 is referred to as the "updated aggregate context" in the description below.

Figure 12B:
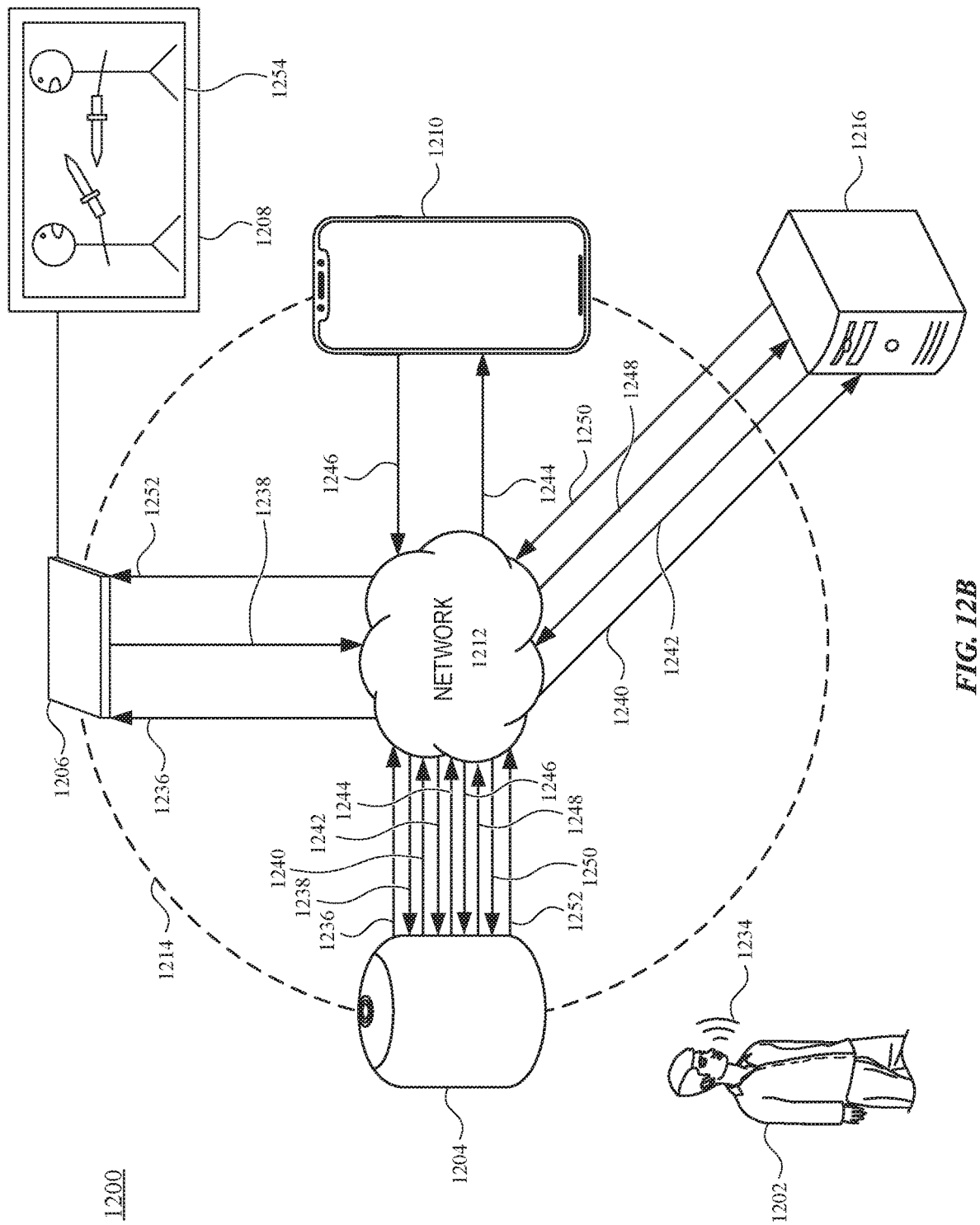

As shown in FIG. 12B, after communal device 1204 provides audio output 1230 and communal device 1206 provides results interface 1232, user 1202 provides user voice input 1234, which is received by communal device 1204. In the below examples, user voice input 1234 is a user request to purchase media corresponding to a media item (e.g., a representation of an image, a video, a song, a movie, an e-book, a gaming software application, or the like) that is included in results interface 1232. For example, if results interface 1232 includes media items corresponding to Star Wars movies (or links and/or affordances for purchasing media), user voice input 1234 may be "Hey Siri, purchase Star Wars: The Empire Strikes Back."

As represented by arrows 1236, in response to receiving user voice input 1234 (or, in some examples, in response to detecting a digital assistant trigger included in user voice input 1234), communal device 1204 transmits a request (via network 1212) to communal device 1206 for communal device 1206 to transmit an aggregate context of context-sharing group 1214 to communal device 1204.

As represented by arrows 1238, after receiving the request for the aggregate context from communal device 1204, communal device 1206 transmits the updated aggregate context to communal device 1204. As discussed above, the updated aggregate context includes updated context information associated with communal device 1204 and updated context information associated with communal device 1206.

As represented by arrows 1240, communal device 1204 transmits data corresponding to user voice input 1234 and at least a portion of the updated aggregate context to server 1216 (e.g., to voice input receiver module 1102 and aggregate context receiver module 1104). After receiving the data corresponding to user voice input 1234 and the at least a portion of the updated aggregate context, server 1216 (1) determines one or more user intents, (2) determines a plurality of tasks corresponding to the one or more user intents, (3) selects two electronic devices to perform the plurality of tasks, and (4) generates two separate commands (based on the data corresponding to user voice input 1234 and context information included in the at least a portion of the updated aggregate context), as described above with reference to FIG. 11 and the modules of system 1100. Specifically, server 1216 (e.g., device selection module 1110) determines that communal device 1206 and user device 1210 are both available, capable of performing at least one task of the plurality of tasks, and proximate to communal device 1204 (i.e., the device that provided the data corresponding to user voice input 1234 to server 1216). Thus, server 1216 selects communal device 1206 and user device 1210 for multimodal task performance and assigns a set of tasks to each device (with each set of tasks including at least one tasks of the plurality of tasks).

Because user voice input 1234 is a user request to purchase media, server 1216 assigns a set of tasks to user device 1210 (referred to as the third set of tasks) that includes one or more tasks for user authentication. Further, server 1216 assigns a separate set of tasks to communal device 1206 (referred to as the fourth set of tasks) that includes one or more tasks for purchasing the requested media. Accordingly, server 1216 (e.g., command module 1112) generates a third command to perform the third set of tasks and a fourth command to perform the fourth set of tasks. The third command is associated with a device identifier corresponding to user device 1210, and the fourth command is associated with a device identifier corresponding to communal device 1206.

Prior to transmitting the third command and the fourth command, server 916 (e.g., command module 1112) determines that the third set of tasks includes one or more tasks for user authentication. Thus, as represented by arrows 1242, server 1216 (1) transmits the third command and the device identifier corresponding to user device 1210 to communal device 1204 and (2) forgoes transmitting the fourth command and the device identifier corresponding to communal device 1206.

As represented by arrows 1244, after receiving the third command and the device identifier corresponding to user device 1210, communal device 1204 transmits the third command to user device 1210. The third command then causes user device 1210 to perform the third set of tasks, including the one or more tasks for user authentication. For example, the third set of tasks includes outputting a request for a user (e.g., user 1202) to provide user device 1210 with user authentication data (e.g., voice authentication data, password authentication data, and/or biometric authentication data (e.g., data corresponding to a face and/or a fingerprint authentication)). In some examples, the request includes user device 1210 displaying a user authentication interface (e.g., a password input interface).

In this example, the third set of tasks includes a task of transmitting the received user authentication data to communal device 1204. Thus, as represented by arrows 1246, after user device 1210 receives user authentication data from a user, user device 1210 transmits the user authentication data to communal device 1204. Then, as represented by arrows 1248, communal device transmits the user authentication data to server 1216. Upon receiving the user authentication data, server 1216 compares the received user authentication to stored user authentication data associated with user device 1210 (e.g., included in stored user data associated with user device 1210 that was previously synced to server 1216).

As represented by arrows 1250, if server 1216 determines, based on the above comparison, that the user that provided the user authentication data is authorized to make the requested purchase (e.g., because server 1216 determines that the received user authentication data matches the stored user authentication data), server 1216 transmits, to communal device 1204, the fourth command and the device identifier corresponding to communal device 1206. Alternatively, if server 1216 determines that the user that provided the user authentication data is not authorized to make the requested purchase (e.g., because server 1216 determines that the received user authentication data does not match the stored user authentication data or because server 1216 determines that stored restrictions associated with the user (e.g., parental restrictions) prevent the user from making the request purchase), server 1216 forgoes transmitting the fourth command to communal device 1204.

In some examples, the third set of tasks includes a task of locally authenticating a user based on received user authentication data instead of a task of transmitting the received user authentication data to communal device 1204. Thus, in these examples, after user device 1210 receives user authentication data from a user, user device 1210 compares the received user authentication to user authentication data stored on user device 1210 and determines whether or not the user that provided the user authentication data is authorized to make the requested purchase. If user device 1210 determines that the user is authorized to make the requested purchase, user device 1210 transmits an indication that the user is authorized to make the requested purchase to communal device 1204. Communal device 1204 then transmits the indication to server 1216. In response to receiving the indication, server 1216 transmits, to communal device 1204, the fourth command and the device identifier corresponding to communal device 1206.

In some of the examples where the third set of tasks includes a task of locally authenticating a user based on received user authentication data instead of a task of transmitting the received user authentication data to communal device 1204, server 1216 concurrently transmits the third command and the fourth command to communal device 1204. Then, communal device transmits the third set of tasks to user device 1210, but forgoes transmitting the fourth command to communal device 1206 until communal device 1204 receives the indication that the user is authorized to make the requested purchase from user device 1210. Thus, communal device 1204 will not transmit the fourth command to communal device 1206 if user device 1210 determines that the user is not authorized to make the requested purchase.

As represented by arrows 1252, communal device 1204 transmits the fourth command to communal device 1206. The fourth command causes communal device 1206 to perform the fourth set of tasks, which results in communal device 1206 purchasing the requested media. In some examples, after purchasing the requested media, communal device 1206 outputs the requested media via display 1208, as represented by media output 1254. Note, while the above examples are directed to purchasing digital media, the above system and process is applicable to other types of user-requested purchases, such as purchasing physical items (e.g., books, groceries, etc.) from a website. Allocating tasks for user authentication and purchasing to separate electronic devices (as described above) allows a user to quickly and easily provide user authentication data when, for example, the electronic device that is to make a user-requested purchase is further away from the user and/or only has less efficient user authentication capabilities (e.g., only performs user authentication via manual password entry).

Overall, multimodal task performance improves a user's digital assistant experience because it creates an appearance of a single digital assistant that is aware of a user's context and surroundings and that interacts with the user across multiple devices (as opposed to an individual digital assistant for each device).

7. System and Technique for a Continuous Digital Assistant Conversation in a Context-Sharing Group FIG. 13 illustrates a system and technique for continuous digital assistant conversations across multiple devices participating in a context-sharing group, according to various examples. As shown in FIG. 13, system 1300 includes user device 1304, user device 1306, and communal device 1308, all of which are participating in context-sharing group 1312 (which is associated with a specific location (e.g., a home, an office, or the like)). User device 1304 and user device 1306 are client devices (e.g., user device 104, 122, 200, 400, or 600). For example, user device 1304 is an iPhone® and user device 1306 is an Apple Watch®. In the examples described below, user device 1304 and user device 1306 are registered to user 1302. In some examples, only one of user device 1304 and user device 1306 is registered to user 1302. Communal device 1308 is a smart speaker that has the same or similar digital assistant capabilities as user device 1304 and user device 1306. Further, communal device 1308 is the context collector of context-sharing group 1312 (e.g., because communal device 1308 was previously elected to be context collector). As discussed above with reference to FIG. 8, communal devices are not registered to a single user or are registered to multiple users (e.g., such that the communal device may be used by multiple users without additional user registration and/or user authentication requirements). For example, communal device 1308 is a HomePod®.

System 1300 further includes network 1310 and server 1314 (e.g., DA server 106). Network 1310 is a wireless communications network (e.g., network(s) 110). As shown, user device 1304, user device 1306, and communal device 1308 communicate with one another and with server 1314 via network 1310 (and thus are each connected to network 1310). Server 1314 is a remote device that is not participating in context-sharing group 1312. In some examples, system 1300 includes one or more other remote devices (e.g., a local server, a cloud-computing system, or the like) instead of server 1314. It should be recognized that, in these examples, any of the operations performed by user device 1304, user device 1306, and/or communal device 1308 can instead be performed by server 1314. For example, server 1314 can perform the operations of the respective DA client modules (e.g., DA client module 229) of user device 1304, user device 1306, and/or communal device 1308.

Figure 13:
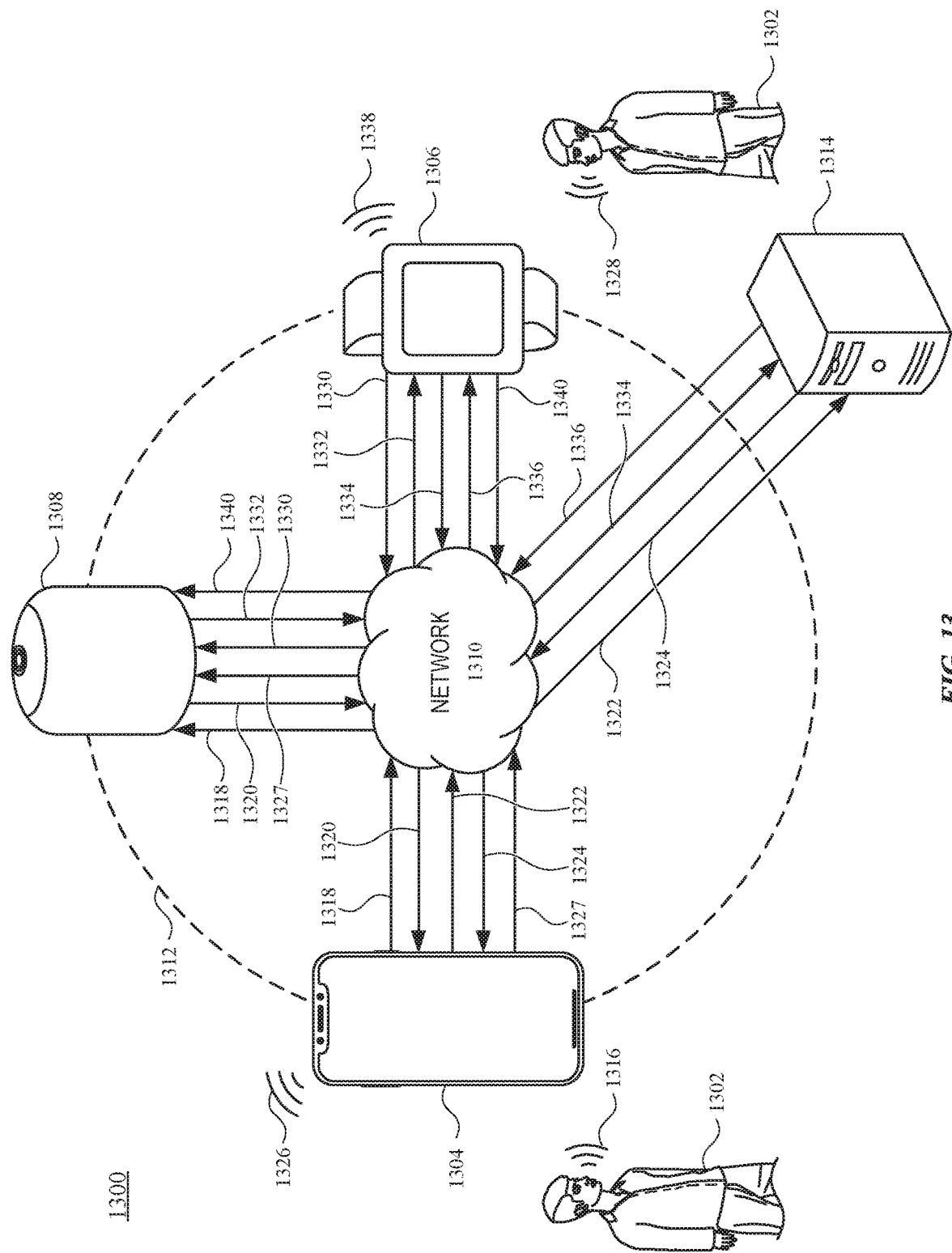
FIG. 13 illustrates a system and technique for continuous digital assistant conversations across multiple devices participating in a context-sharing group, according to various examples.

As shown in FIG. 13, user 1302 provides user voice input 1316 (e.g., "Hey Siri, what's the temperature in Palo Alto?"), which is received by user device 1304.

As represented by arrows 1318, in response to receiving user voice input 1316 (or, in some examples, in response to detecting a digital assistant trigger included in user voice input 1316), user device 1304 transmits a request (via network 1310) to communal device 1308 (i.e., the context collector of context-sharing group 1312) for communal device 1308 to transmit an aggregate context of context-sharing group 1312 to user device 1304.

As represented by arrows 1320, after receiving the request for the aggregate context from user device 1304, communal device 1308 transmits the aggregate context (or, in some examples, at least a portion of the aggregate context) to user device 1304. In some examples, the request for the aggregate context causes communal device 1308 to transmit the aggregate context (e.g., data corresponding to the aggregate context), or at least a portion of the aggregate context, to user device 1304. The aggregate context transmitted to user device 1304 includes context information (e.g., device state change information, contextual state information, device capability information, proximity information, and/or the like) associated with at least user device 1304, user device 1306, and communal device 1308 (e.g., because user device 1304, user device 1306, and communal device 1308 each recently underwent a device state change (e.g., a timer event, detecting a digital assistant trigger, playing a movie, etc.)). Specifically, the context information is associated with at least user device 1304, user device 1306, and communal device 1308 based on the device identifiers that communal device 1308 receives with the context information from at least user device 1304, user device 1306, and communal device 1308. In some examples, the aggregate context does not include any other type of device identification or identifying information other than the device identifiers received with context information included in the aggregate context.

In other examples, the aggregate context does include other types of device identifications and/or information identifying a registered user of each electronic device (in addition to the device identifiers). This in turn allows server 1314 to determine whether electronic devices participating in a context-sharing group are registered to a single user or two or more different users (as this information may influence the commands that server 1314 provides). In some examples, device identifications and/or information identifying a registered user of each electronic device included in the aggregate context allows server 1314 to determine whether or not a user voice input is provided by a registered. Further, in some examples, server 1314 uses this additional identifying information to access and/or utilize user data that is stored on server 1314 and that is associated with one or more of the electronic devices (e.g., user data that an electronic device participating in the context-sharing group 1312 previously synced/transmitted to the remote devices (e.g., during an automatic and/or periodic user data sync)).

As represented by arrows 1322, after receiving the aggregate context from communal device 1308, user device 1304 transmits data corresponding to user voice input 1316 and at least a portion of the aggregate context to server 1314.

In some examples, user device 1304 provides audio data corresponding to user voice input 1316 to server 1314. In some examples, user device 1304 performs speech-to-text processing of user voice input 1316 (e.g., using STT processing module 730) and provides text data corresponding to user voice input 1316 (e.g., a textual representation of user voice input 1316) to server 1314. In some examples, user device 1304 further performs natural language processing of the text data corresponding to user voice input 1316 (e.g., using natural language processing module 732) and provides results of the natural language processing (e.g., one or more user intents) to server 1314.

In some examples, user device 1304 provides all of the aggregate context to server 1314. In some examples, user device 1304 determines what context information included in the aggregate context is relevant to user voice input 1316 (e.g., when user device 1304 performs natural language processing of user voice input 1316) and only provides the relevant context information to server 1314. In some examples, user device 1304 determines what context information is relevant based on one or more domains of an active ontology (e.g., ontology 760) that correspond to user voice input 1316 (e.g., by identifying the context information that is related to or associated with the one or more domains corresponding to user voice input 1316). In some examples, user device 1304 removes personal information (e.g., email addresses, home addresses, payment information, or the like) and/or user data (e.g., a user's preferences, media, contacts, speech profiles, or the like) included in the aggregate context prior to providing the aggregate context to server 1314. In some examples, user device 1304 encrypts personal information and/or user data included in the aggregate context prior to providing the aggregate context to server 1314 (instead of removing the personal information and/or user data).

As represented by arrows 1324, server 1314 transmits, to user device 1304, a first command to perform one or more tasks and a device identifier corresponding to user device 1304. After user device 1304 receives the first command and determines that it is to perform the one or more tasks based on the associated device identifier corresponding to user device 1304, user device 1304 performs the one or more tasks. For example, if user voice input 1316 is "Hey Siri, what's the temperature in Palo Alto?", the one or more tasks include performing a search for weather data associated with Palo Alto, retrieving the requested weather data (e.g., temperature data), and generating a digital assistant response including the retrieved weather data). The first command further causes user device 1304 to output a digital assistant response based on the performance of the one or more tasks. Thus, as shown in FIG. 13, user device 1304 outputs digital assistant response 1326 as an audio output (e.g., via one or more speakers). Returning to the previous example, if user voice input 1316 is "Hey Siri, what's the temperature in Palo Alto?", digital assistant response 1326 may be "It's currently 68 degrees in Palo Alto."

As represented by arrows 1327, after user device 1304 provides digital assistant response 1326, user device 1304 transmits context information to communal device 1308 (e.g., because the output of digital assistant response 1326 is a device state change (e.g., the end of a digital assistant dialog session)). The context information includes a digital assistant dialog session history that includes data (e.g., text data) corresponding to user voice input 1316 and digital assistant response 1326, as well as the data/information retrieved as a result of the performance of the one or more tasks (e.g., the weather data associated with Palo Alto). In some examples, the digital assistant dialog session history includes data corresponding to a most recent digital assistant dialog session that occurred at user device 1304 (e.g., speech recognition results, natural language processing results, and/or data retrieved and/or provided during the most recent digital assistant dialog session (e.g., data corresponding to the most recent user voice input and digital assistant response)). In some examples, the digital assistant dialog session history includes data corresponding to all digital assistant dialog sessions that have occurred at user device 1304 within a predetermined period of time (e.g., within the past hour, within the past day, etc.). After receiving the context information from user device 1304, communal device 1308 incorporates the context information into the aggregate context and thus generates an updated aggregate context that now additionally includes the digital assistant dialog session history that user device 1304 included in its context information.

As shown in FIG. 13, sometime after user device 1304 outputs digital assistant response 1326, user 1302 moves from a first area (e.g., a living room, an office, or the like) of the location associated with context-sharing group 1312 (e.g., a home of user 1302, an office building where user 1302 works, or the like) where user device 1304 is located to a second area of the location (e.g., a bedroom, another office, a different floor of the location, or the like). While at the second area of the location, user 1302 provides user voice input 1328 (e.g., "Hey Siri, how long will it take me to drive there?" or "Hey Siri, how about in New York?"), which is received by user device 1306. In this case, user device 1306 is a wearable user device (e.g., an Apple Watch®) and thus is also located in the second area when it receives user voice input 1328. In some examples, user device 1306 is in the first area of the location (where user device 1304 is located) when user device 1306 receives user voice input 1328.

As represented by arrows 1330, in response to receiving user voice input 1328 (or, in some examples, in response to detecting a digital assistant trigger included in user voice input 1328), user device 1306 transmits a request to communal device 1308 for communal device 1308 to transmit an aggregate context of context-sharing group 1312 to user device 1306.

As represented by arrows 1332, after receiving the request for the aggregate context from user device 1306, communal device 1308 transmits the updated aggregate context (or, in some examples, at least a portion of the updated aggregate context) to user device 1306. As mentioned above, the updated aggregate context includes the digital assistant dialog session history that user device 1304 provided to communal device 1308 (e.g., in addition to other context information associated with one or more electronic devices participating in context-sharing group 1312 that was included in the aggregate context).

As represented by arrows 1334, after receiving the updated aggregate context from communal device 1308, user device 1306 transmits data corresponding to user voice input 1328 and at least a portion of the updated aggregate context to server 1314. The at least a portion of the updated aggregate context includes the digital assistant dialog session history that user device 1304 provided to communal device 1308.

After receiving the data corresponding to user voice input 1328 and the at least a portion of the updated aggregate context, server 1314 (1) determines one or more user intents, (2) determines one or more tasks corresponding to the one or more user intents, (3) selects an electronic device to perform the one or more tasks (in this case, user device 1306), and (4) generates a command to perform the one or more tasks (based on the data corresponding to user voice input 1328 and context information included in the at least a portion of the updated aggregate context), as described above with reference to FIG. 11 and the modules of system 1100. Specifically, server 1314 uses the data corresponding to user voice input 1316 that is included in the digital assistant dialog session history (that communal device 1308 added to the updated aggregate context) to disambiguate user voice input 1328.

In some examples, server 1314 (e.g., task determination module 1108) uses the data corresponding to user voice input 1316 to determine one or more parameters for the one or more tasks determined based on a user intent corresponding to user voice input 1328. For example, if user voice input 1328 is "Hey Siri, how long will it take me to drive there?", server 1314 will determine a user intent of navigating to a location. However, user voice input 1328 is ambiguous with respect to a location parameter for the task of navigation. Thus, server 1314 determines a location parameter of "Palo Alto" based on the data corresponding to user voice input 1316, as "Palo Alto" was the location parameter for user voice input 1316.

In some examples, server 1314 (e.g., user intent module 1106) uses the data corresponding to user voice input 1316 to determine a user intent corresponding to user voice input 1328. For example, if user voice input 1328 is "Hey Siri, how about in New York?", sever 1314 will use the data corresponding to user voice input 1316 (e.g., text data corresponding to user voice input 1316, natural language processing results corresponding to user voice input 1316, etc.) to determine that user voice input 1328 represents a user request for a digital assistant to perform a task previously performed by a digital assistant of user device 1304 using parameters provided in user voice input 1328 (e.g., a location parameter of "New York"). Thus, if the user intent corresponding to user voice input 1316 was a user intent of obtaining weather information (e.g., because user voice input 1316 was "Hey Siri, what's the temperature in Palo Alto?"), server 1314 will determine that the user intent corresponding to user voice input 1328 is also obtaining weather information (but with respect to New York instead of Palo Alto).

As represented by arrows 1336, server 1314 transmits, to user device 1306, a second command to perform one or more tasks and a device identifier corresponding to user device 1306. After user device 1306 receives the second command and determines that it is to perform the one or more tasks based on the associated device identifier corresponding to user device 1306, user device 1306 performs the one or more tasks. For example, if user voice input 1328 is "Hey Siri, how about in New York?" and server 1314 determines that the user intent corresponding to user voice input 1328 is obtaining weather information (as described above), the one or more tasks will include performing a search for weather data associated with New York, retrieving the requested weather data (e.g., temperature data), and generating a digital assistant response including the retrieved weather data). The second command further causes user device 1306 to output a digital assistant response based on the performance of the one or more tasks. Thus, as shown in FIG. 13, user device 1306 outputs digital assistant response 1338 as an audio output (e.g., via one or more speakers) and, in some examples, as a visual output (e.g., as text) on a display of user device 1306. Returning to the previous example, if user voice input 1316 is "Hey Siri, how about in New York?", digital assistant response 1338 may be "It's currently 45 degrees in New York."

As represented by arrows 1340, after user device 1306 provides digital assistant response 1338, user device 1306 transmits context information to communal device 1308 (e.g., because the output of digital assistant response 1338 is a device state change (e.g., the end of a digital assistant dialog session)). The context information includes a digital assistant dialog session history that includes data (e.g., text data) corresponding to user voice input 1328 and digital assistant response 1338, as well as the data/information retrieved as a result of the performance of the one or more tasks (e.g., the weather data associated with New York). After receiving the context information from user device 1306, communal device 1308 incorporates the context information into the updated aggregate context and thus generates a second updated aggregate context that now additionally includes the digital assistant dialog session history that user device 1306 included in its context information.

Figure 14A:
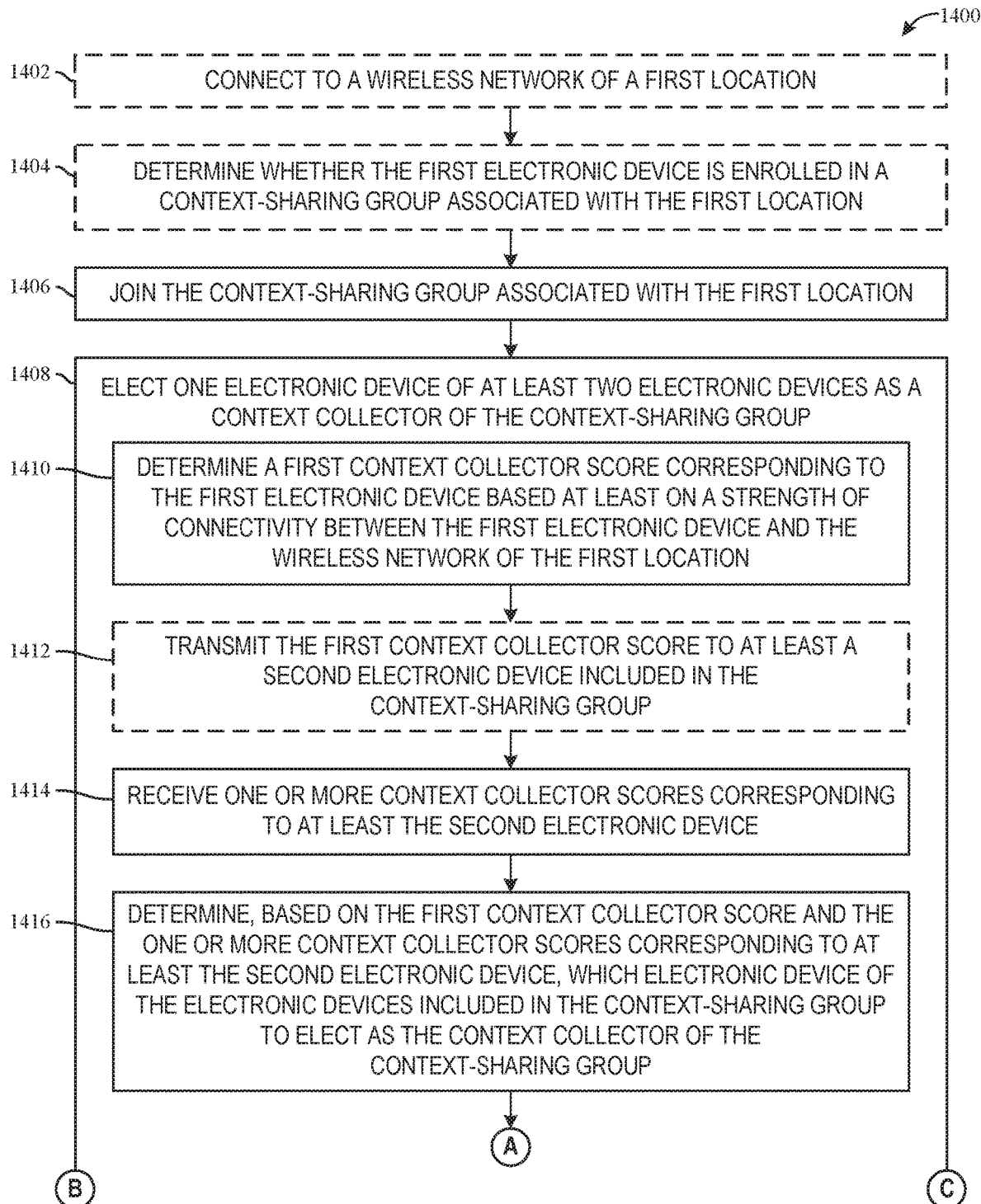
FIGS. 14A-14C illustrate a flow chart representing a process for electing a context collector of a context-sharing group, according to various examples.
Figure 14B:
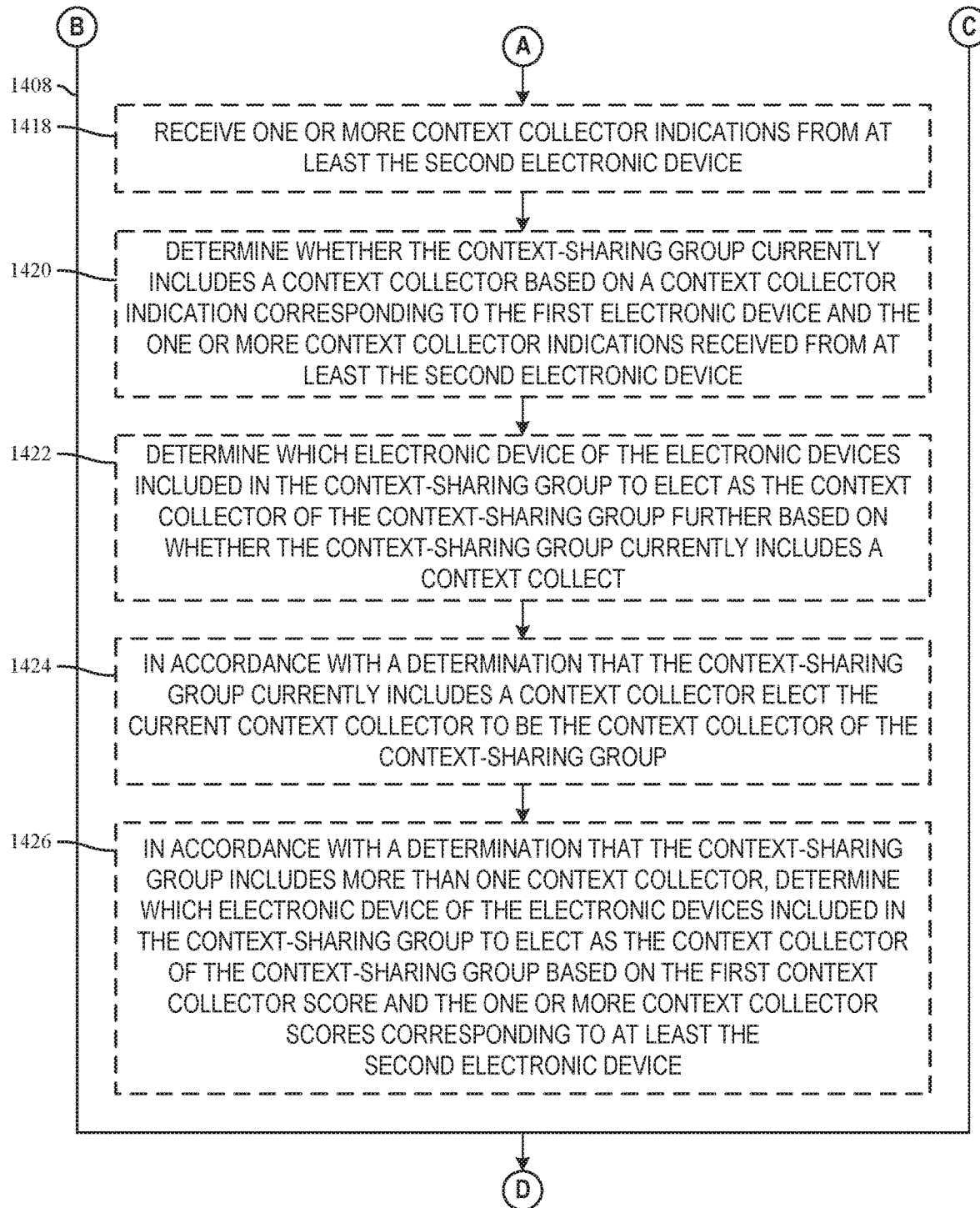
Figure 14C:
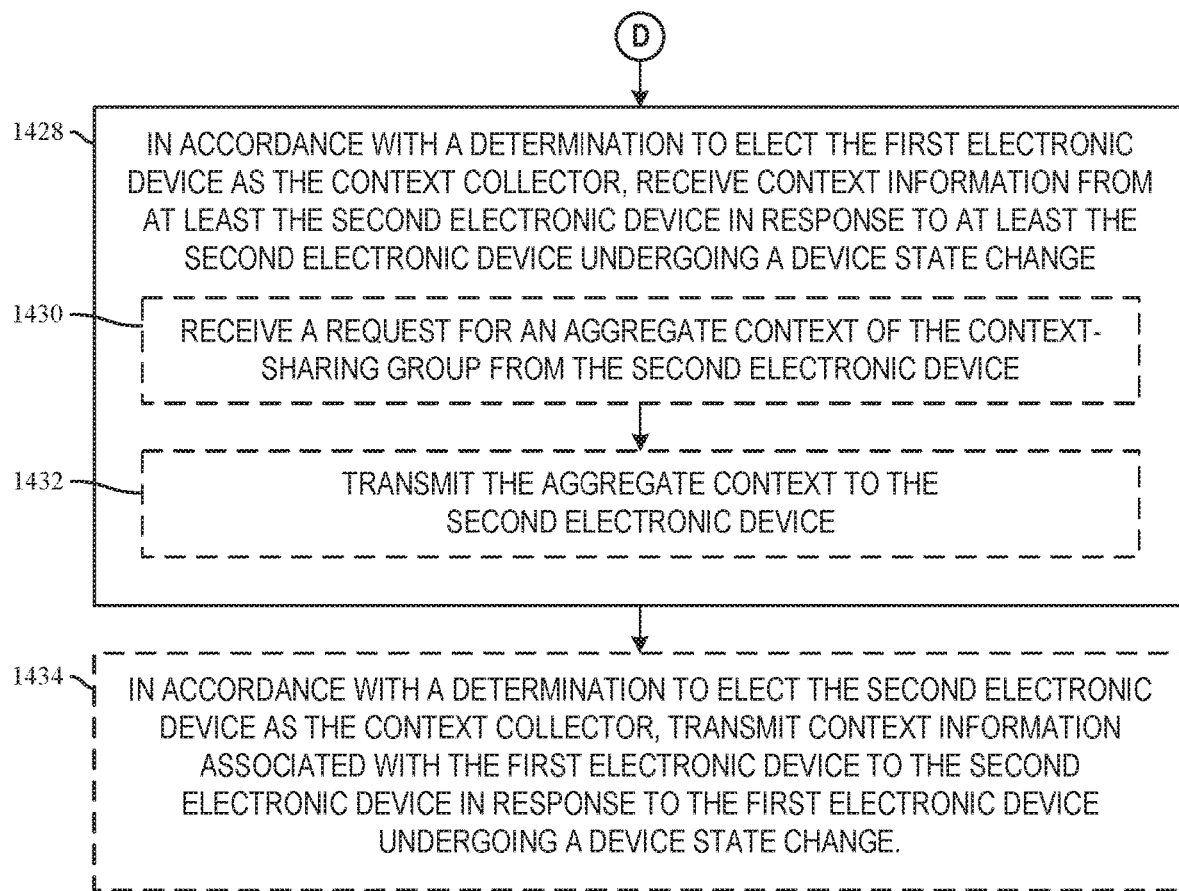

8. Processes for Providing a Digital Assistant in a Context-Sharing Group Including at Least Two Electronic Devices FIGS. 14A-14C illustrate a flow chart representing a process for electing a context collector of a context-sharing group, according to various examples. Process 1400 is performed, for example, using one or more electronic devices implementing a digital assistant. In some examples, one or more blocks of process 1400 are performed by one or more remote devices (e.g., one or more remotes servers (e.g., DA server 106), one or more local servers, a cloud-computing system, and/or the like). For example, the blocks of process 1400 are divided up in any manner between one or more servers (e.g., DA server 106) and a client device. In other examples, the blocks of process 1400 are divided up between one or more servers and multiple client devices (e.g., a mobile phone and a smart watch). Thus, while portions of process 1400 are described herein as being performed by particular devices, it will be appreciated that process 1400 is not so limited. In other examples, process 1400 is performed using only a client device (e.g., user device 104) or only multiple client devices. In process 1400, some blocks are, optionally, combined, the order of some blocks is, optionally, changed, and some blocks are, optionally, omitted. In some examples, additional steps may be performed in combination with the process 1400.

In some examples, at block 1402, a first electronic device (e.g., a personal or client electronic device (e.g., a mobile device (e.g., iPhone®), a tablet computer (e.g., iPad®), a smart watch (e.g., Apple Watch®), a desktop (e.g., iMac®), or a laptop (e.g., MacBook®)) or a communal electronic device (e.g., a smart TV (e.g., Apple TV®) or a smart speaker (e.g., HomePod®))) (e.g., user device 802) connects to a wireless network of a first location (e.g., a local Wi-Fi network (e.g., of a user's home, office, or the like)) (e.g., as represented by arrow 812 of FIG. 8).

In some examples, at block 1404, the first electronic device determines whether the first electronic device is enrolled in a context-sharing group associated with the first location. In some examples, in accordance with a determination that the first electronic device is not enrolled in the context-sharing group, the first electronic device requests enrollments into the context-sharing group. In some examples, the first electronic device must be enrolled in the context-sharing group in order to join the context-sharing group (e.g., previously enrolled via a software application stored on the first electronic device (e.g., HomeKit) or via a website with context-sharing group functionality.

At block 1406, the first electronic device joins the context-sharing group (e.g., a collection of one or more electronic devices (e.g., within a specific location) that automatically share context information (e.g., with a context collector) in response to device state changes) associated with the first location (e.g., as represented by context-sharing group 814 of FIG. 8). The context sharing group associated with the first location is a collection of at least two electronic devices that each share context information with at least one other electronic device included in the collection. The context sharing group includes at least a second electronic device. In some examples, the first electronic device must connect to the wireless network in order to join the context-sharing group of the first location. In some examples, each electronic device participating in the context-sharing group is connected to the wireless network. In some examples, the first electronic device joins the context-sharing group by establishing a communication connection (e.g., via which context information and other data may be wirelessly transmitted) with at least one other electronic device participating in the context-sharing group.

At block 1408, after joining the context-sharing group associated with the first location, the first electronic device elects (e.g., selects) one electronic device of the collection of at least two electronic devices as a context collector of the context-sharing group. In some examples, the first electronic device elects the context collector in response to joining the context-sharing group (e.g., immediately after joining). In some examples, the first electronic device elects the context collector in response to an electronic device participating in the context-sharing group (e.g., a current context collector) leaving the context-sharing group (e.g., disconnecting from a wireless network of the first location).

At block 1410, the first electronic device determines a first context collector score corresponding to the first electronic device based at least on a strength of connectivity between the first electronic device and a wireless network of the first location. In some examples, the first context collector score is further based on a power source status of the first electronic device (e.g., wired power connection versus battery power and/or amount of battery power remaining). In some examples, the first context collector score is further based on a frequency of movement of the first electronic device in and out of the context-sharing group (e.g., a frequency of connecting to/disconnecting from the wireless network of the first location).

In some examples, at block 1412, the first electronic device transmits the first context collector score to at least the second electronic device included in context-sharing group (e.g., as represented by arrows 816).

At block 1414, the first electronic device receives, from at least the second electronic device, one or more context collector scores corresponding to at least the second electronic device (e.g., as represented by arrows 818 of FIG. 8). In some examples, the first electronic device further transmits a context collector indication indicating whether the first electronic device was previously elected to be a context collector of the context-sharing group (e.g., when the first electronic device previously participated in the context-sharing group).

At block 1416, the first electronic device determines based on the first context collector score and the one or more context collector scores corresponding to at least the second electronic device, which electronic device of the electronic devices included in the context-sharing group to elect as the context collector of the context-sharing group. In some examples, the first electronic device determines which electronic device of the electronic devices included in the context-sharing group to elect as the context collector of the context-sharing group includes comparing the first context collector score to the one or more context collector scores corresponding to at least the second electronic device, and identifying, based on the comparison, the highest context collector score, wherein an electronic device with the highest context collector score is elected to be the context collector.

In some examples, at block 1418, the first electronic device receives one or more context collector indications from at least the second electronic device (e.g., as represented by arrows 818 of FIG. 8). A context collector indication indicates whether an electronic device is currently the context collector.

In some examples, at block 1420, the first electronic device determines whether the context-sharing group currently includes a context collector based on a context collector indication corresponding to the first electronic device and the one or more context collector indications received from at least the second electronic device.

In some examples, at block 1422, the first electronic device determines which electronic device of the electronic devices included in the context-sharing group to elect as the context collector of the context-sharing group further based on whether the context-sharing group currently includes a context collector.

In some examples, at block 1424, in accordance with a determination that the context-sharing group currently includes a context collector, the first electronic device elects the current context collector to be the context collector of the context-sharing group. In some examples, the second electronic device is the context collector of the context-sharing group.

In some examples, at block 1426, in accordance with a determination that the context-sharing group includes more than one context collector (e.g., because the first electronic device was previously elected to be the context collector of the context-sharing group when previously participating in the context-sharing group), determining which electronic device of the electronic devices included in the context-sharing group to elect as the context collector of the context-sharing group based on the first context collector score and the one or more context collector scores corresponding to at least the second electronic device.

At block 1428, in accordance with a determination to elect the first electronic device as the context collector, the first electronic device receives context information (e.g., device state change information (e.g., device state change type, device state change time, and/or the like), device capability information, contextual state information (e.g., current location, acceleration, display visibility, user attention, and/or the like), user-specific information (e.g., corresponding to a registered user of an electronic device), and/or the like) from at least the second electronic device in response to at least the second electronic device undergoing a device state change (e.g., media playback, activation of an application, timer event, alarm event, change in power state (e.g., on/off), change in display visibility (e.g., turning the second electronic device from a display down position to a display up position (e.g., a display of the second electronic device is visible to a user of the second electronic device in the display up position)), digital assistant trigger (e.g., "Hey Siri," "Siri," or the like) detection, and/or an end of digital assistant dialog session) (e.g., as represented by alarm event 820 and arrows 822a of FIG. 8).

In some examples, at block 1430, the first electronic device receives a request for an aggregate context of the context-sharing group (e.g., a stored collection of context information received from one or more (e.g., each) electronic devices participating in the context-sharing group (e.g., when the one or more electronic devices undergo a device state change)) from the second electronic device. In some examples, the second electronic device transmits the request to the first electronic device in response to receiving a user voice input from a user of the second electronic device.

In some examples, at block 1432, the first electronic device transmits the aggregate context to the second electronic device. In some examples, transmitting the aggregate context to the second electronic device causes the second electronic device to obtain a digital assistant response to the user voice input based on context information included in the aggregate context. In some examples, obtaining the digital assistant response includes transmitting the user voice input and at least a portion of the aggregate context to a remote device that is not participating in the context-sharing group (e.g., one or more servers, a local sever, a cloud-computing system, and/or the like) so that the remote device determines the digital assistant response or determines one or more tasks for the second electronic device to perform. In the examples where the remote device determines one or more tasks, the second electronic device performs the one or more tasks and determines the digital assistant response based on results of the performance of the one or more tasks.

In some examples, at block 1434, in accordance with a determination to elect the second electronic device as the context collector, the first electronic device transmits context information associated with the first electronic device to the second electronic device in response to the first electronic device undergoing a device state change (e.g., as represented by alarm event 820 and arrows 822b of FIG. 8).

Figure 15A:
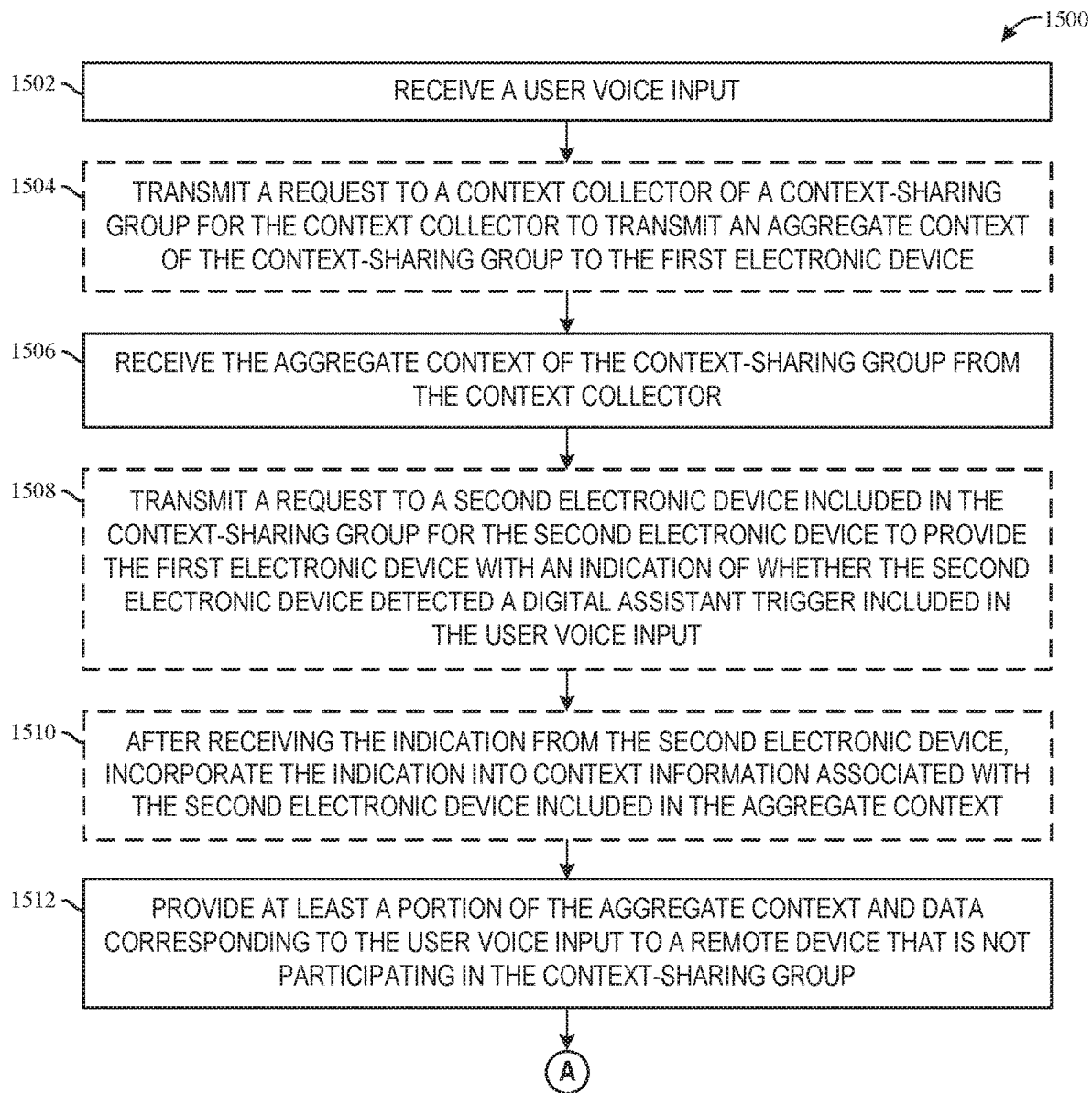
FIGS. 15A-15B illustrate a flow chart representing a process for performing one or more tasks in a context-sharing group, according to various examples.
Figure 15B:
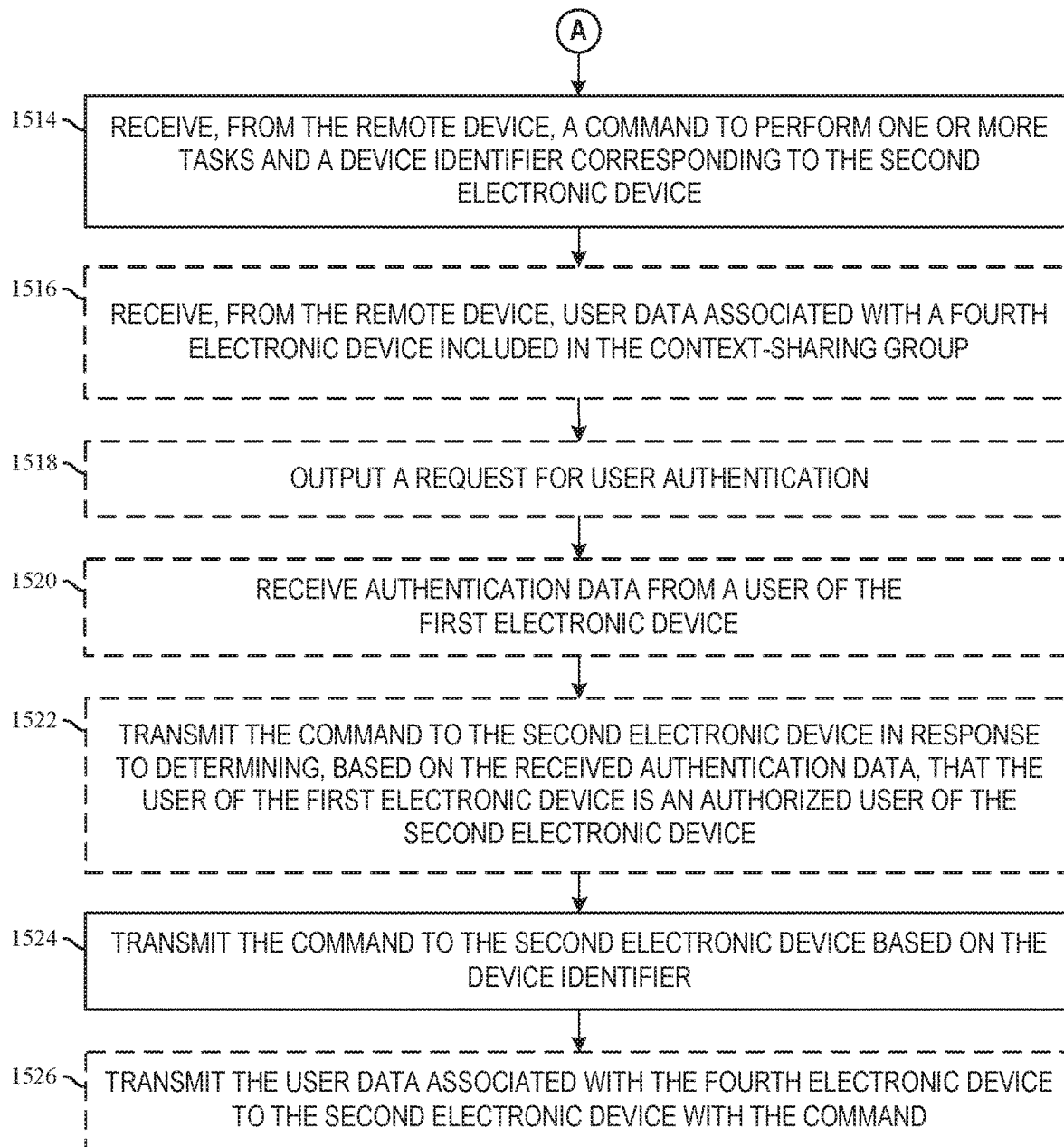
Figure 16A:
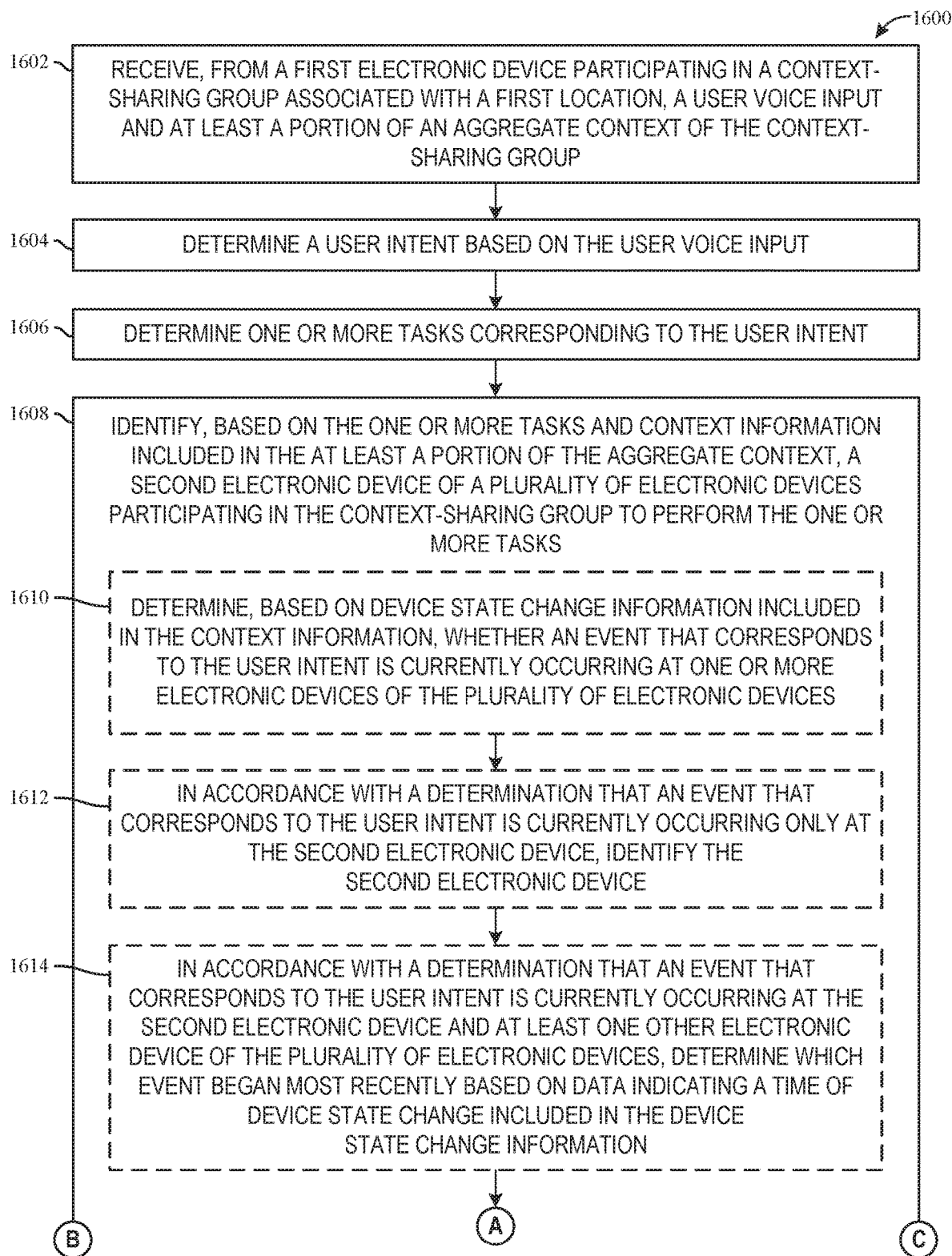
FIGS. 16A-16E illustrate a flow chart representing a process for identifying an electronic device participating in a context-sharing group to perform one or more tasks, according to various examples.
Figure 16B:
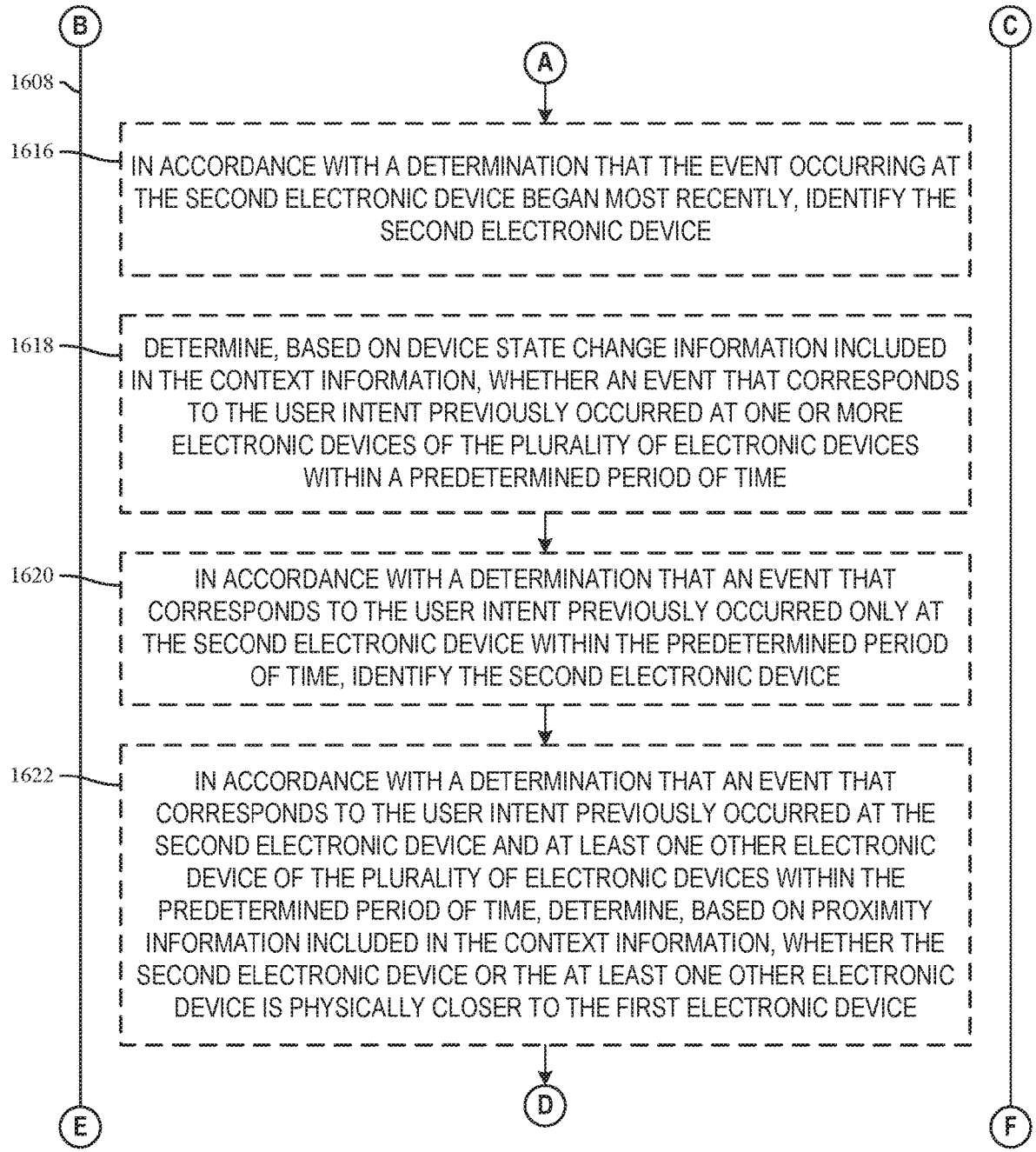
Figure 16C:
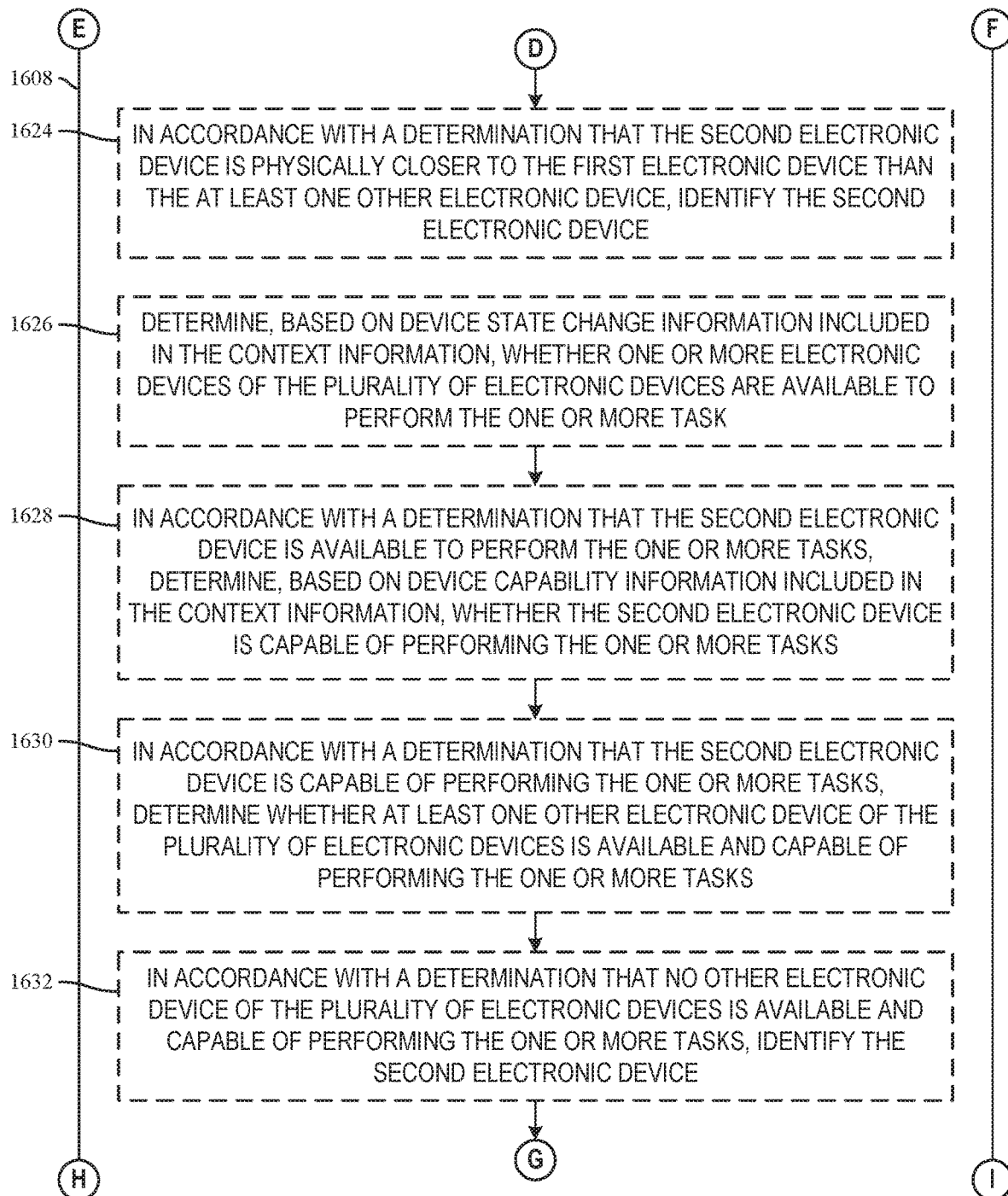
Figure 16D:
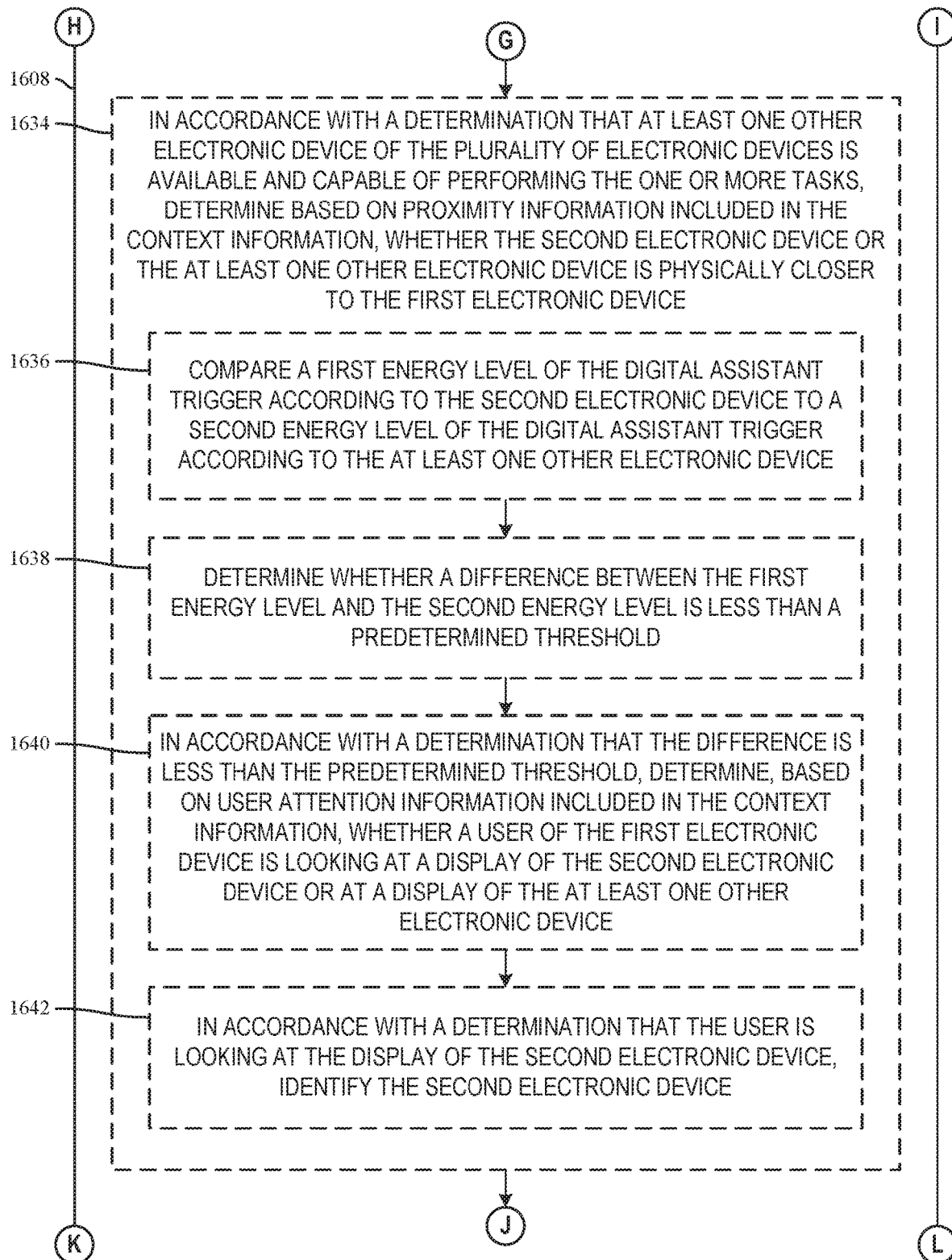
Figure 16E:
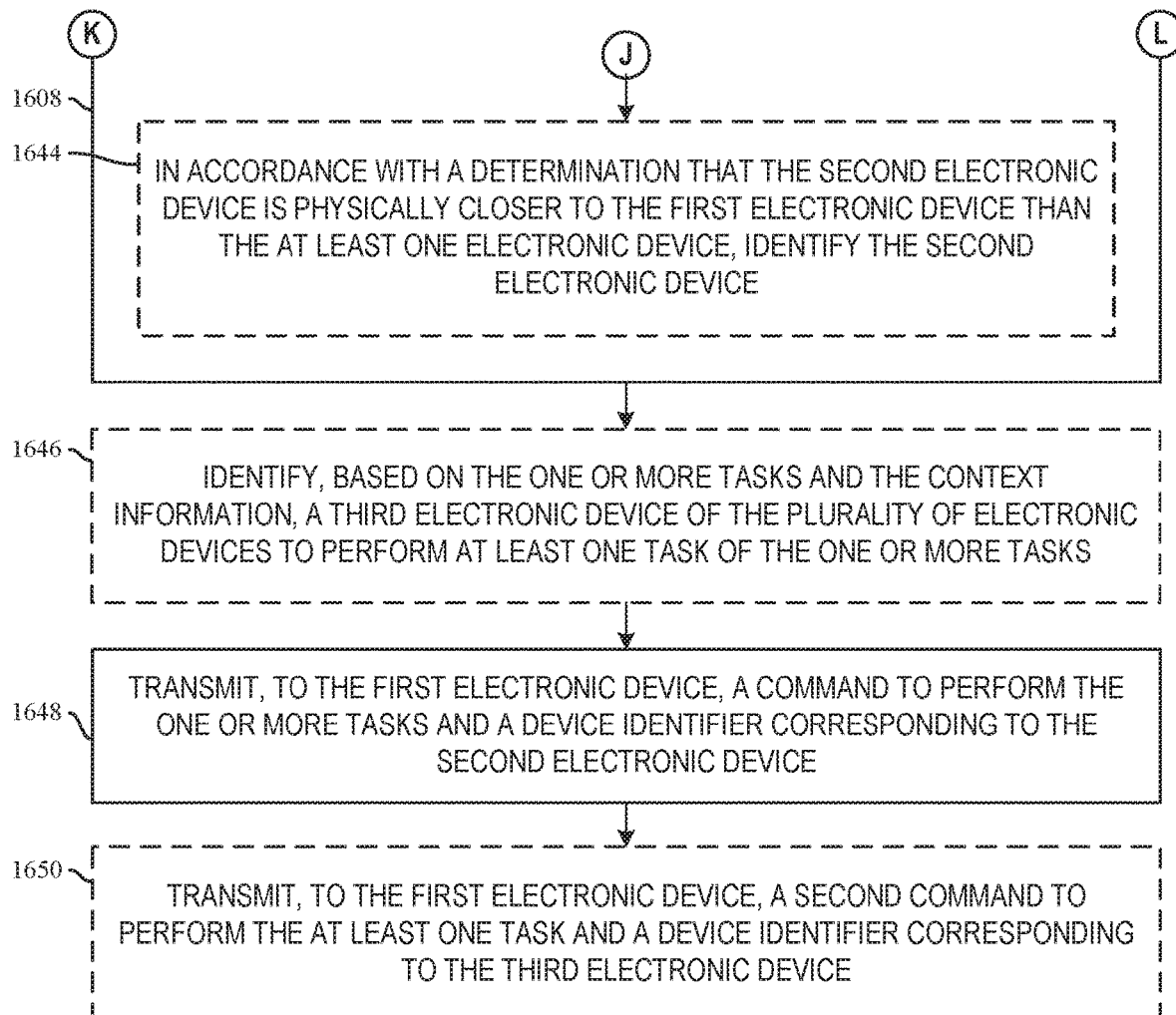

FIGS. 15A-15B illustrate a flow chart representing a process for performing one or more tasks in a context-sharing group, according to various examples. Process 1500 is performed, for example, using one or more electronic devices implementing a digital assistant. In some examples, one or more blocks of process 1500 are performed by one or more remote devices (e.g., one or more remotes servers (e.g., DA server 106), one or more local servers, a cloud-computing system, and/or the like). For example, the blocks of process 1500 are divided up in any manner between one or more servers (e.g., DA server 106) and a client device. In other examples, the blocks of process 1500 are divided up between one or more servers and multiple client devices (e.g., a mobile phone and a smart watch). Thus, while portions of process 1500 are described herein as being performed by particular devices, it will be appreciated that process 1500 is not so limited. In other examples, process 1500 is performed using only a client device (e.g., user device 104) or only multiple client devices. In process 1500, some blocks are, optionally, combined, the order of some blocks is, optionally, changed, and some blocks are, optionally, omitted. In some examples, additional steps may be performed in combination with the process 1500.

At block 1502, a first electronic device (e.g., communal device 904) participating in a context-sharing group associated with a first location receives a user voice input (e.g., "Hey Siri, stop the timer," Hey Siri, play music," or the like) (e.g., as represented by user voice input 918 of FIG. 9). The context-sharing group is a collection of at least two electronic devices that each share context information with at least one other electronic device included in the collection (e.g., as represented by context-sharing group 914 of FIG. 9). The collection includes at least a second electronic device (e.g., user device 906, user device 910, or communal device 908) and a context collector (e.g., communal device 908). In some examples, the second electronic device is the context collector. In some examples, the context collector is a third electronic device that is participating in the context-sharing group. In some examples, each electronic device participating in the context-sharing group is connected to a single wireless network (e.g., a Wi-Fi network) of the first location.

In some examples, at block 1504, in response to receiving the user voice input, the first electronic device transmits a request to the context collector for the context collector to transmit the aggregate context of the context-sharing group to the first electronic device (e.g., as represented by arrows 920). The request causes the context collector to transmit the aggregate context to the first electronic device (e.g., as represented by arrows 922 of FIG. 9).

At block 1506, the first electronic device receives the aggregate context of the context-sharing group from the context collector (e.g., a collection of context information (e.g., device state change information (e.g., type of state change and time of state change), contextual state information (e.g., device location, display visibility (e.g., display up or down), user attention information (e.g., whether a user is looking at the device display), strength of network connection, amount of battery power, type of power source (e.g., battery vs wired power source), and/or the like), and/or device capability information (e.g., type of device, processing power, memory availability, display information, speaker information, and/or the like) received from one or more (e.g., each) electronic devices participating in the context-sharing group) (e.g., as represented by arrows 922 of FIG. 9). In some examples, the context information included in the aggregate context indicates whether an electronic device is available (e.g., whether the electronic device is currently being used (e.g., open/active applications), currently performing a task, and/or currently unable to provide an audio and/or visual output (e.g., because the electronic device is face down)).

In some examples, prior to receiving the aggregate context, at least the first electronic device and the second electronic device provide the context information included in the aggregate context to the context collector. In some examples, the first electronic device and the second electronic device each provide their respective context information to the context collector in response to undergoing a device state change. In some examples, the context information includes device state change information corresponding to at least the first electronic device and the second electronic device (e.g., data indicating a type of device state change and/or a time of device state change). In some examples, the context information includes contextual state information (e.g., device location, display visibility (e.g., display up or down), user attention information (e.g., whether a user is looking at the device display), strength of network connection, amount of battery power, type of power source (e.g., battery vs wired power source), and/or the like) corresponding to at least the first electronic device and the second electronic device. In some examples, the context information includes device capability information (e.g., type of device, processing power, memory availability, display information, speaker information, and/or the like) corresponding to at least the first electronic device and the second electronic device.

In some examples, at block 1508, prior to transmitting at least a portion of the aggregate context to a remote device that is not participating in the context-sharing group (e.g., one or more servers), the first electronic device transmits a request to the second electronic device for the second electronic device to provide the first electronic device with an indication of whether the second electronic device detected (e.g., received or heard) the digital assistant trigger included in the user voice input (e.g., a trigger indication). The first electronic device transmits the request when the user voice input includes a digital assistant trigger (e.g., a word or phrase that initiates a dialog session with a digital assistant of an electronic device (e.g., "Hey Siri", "Siri", or the like). In some examples, the first electronic device requests the second electronic device to provide the first electronic device with an indication (e.g., a trigger indication) of whether the second electronic device has detected a digital assistant trigger within a predetermined period of time (e.g., within the last 2 seconds, 5 seconds, or 10 seconds). In some examples, the first electronic device transmits the request for a trigger indication to each electronic device participating in the context-sharing group. In these examples, the request is for each electronic device to provide an indication of whether each electronic device detected the digital assistant trigger.

In some examples, at block 1510, after receiving the indication from the second electronic device (e.g., indicating that the second electronic device did or did not detect the digital assistant trigger), the first electronic device incorporates the indication into context information associated with the second electronic device included in the aggregate context (e.g., incorporating the indication as device proximity information). After receiving the context information including the indication, a remote device determines a physical proximity of the second electronic device to the first electronic device (e.g., when determining one or more tasks and/or selecting an electronic device to perform the one or more tasks) based on the indication (e.g., based on data included in the indication). In some examples, the indication includes data indicating an energy level (e.g., decibel level) of the digital assistant trigger (e.g., the energy level of the digital assistant trigger when received by the second electronic device). In some examples, the indication includes a confidence score corresponding to a confidence of the second electronic device that the user voice input includes a digital assistant trigger.

At block 1512, the first electronic device provides (e.g., transmits) at least a portion of the aggregate context and data corresponding to the user voice input to a remote device that is not participating in the context-sharing group (e.g., one or more servers) (e.g., as represented by arrows 924 of FIG. 9).

In some examples, the first electronic device provides all of the aggregate context to the remote device. In some examples, the first electronic device determines what context information included in the aggregate context is relevant to the user voice input (e.g., when the first electronic device performs natural language processing of the first user input) and only provides the relevant context information to the remote device. In some examples, the first electronic device determines what context information is relevant based on one or more domains of an active ontology that correspond to the user voice input (e.g., by identifying the context information that is related to the one or more domains). In some examples, the first electronic device removes personal data (e.g., personal information and/or user data) included in the aggregate context prior to providing the aggregate context to the remote device. In some examples, the first electronic device encrypts personal data (e.g., personal information and/or user data) included in the aggregate context prior to providing the aggregate context to the remote device.

In some examples, the first electronic device provides audio data to the remote device. In some examples, the first electronic device performs speech recognition processing (e.g., speech-to-text processing) of the user voice input and provides text data corresponding to the user voice input (e.g., a textual representation of the user voice input) to the remote device. In some examples, the first electronic device performs natural language processing of the user voice input and provides results of the natural language processing (e.g., one or more user intents) to the remote device.

In some examples, the user voice input is ambiguous with respect to defining the electronic device that is to respond to the user voice input (e.g., a user voice input such as "Hey Siri, stop" when an event (e.g., a timer event or alarm event) is occurring at two separate electronic devices participating in the context-sharing group). In some of these examples, after the remote device (e.g., voice input receiver module 1102 and aggregate context receiver module 1104 of FIG. 11) receives the data corresponding to the user voice input and the at least a portion of the aggregate context from the first electronic device, the remote device (e.g., user intent module 1106 of FIG. 11) disambiguates the user voice input based on the context information included in the at least a portion of the aggregate context (e.g., the remote device uses data indicating a time of device state change included in the aggregate context to determine which event began most recently, as that is the event the user is most likely referring to (and thus the electronic device the user is most likely referring to)).

In some examples, the first electronic device and the second electronic device are both personal electronic devices (e.g., client devices) that are each registered to a single user. In some of these examples, after the remote device (e.g., voice input receiver module 1102 and aggregate context receiver module 1104 of FIG. 11) receives the data corresponding to the user voice input and the at least a portion of the aggregate context from the first electronic device, the remote device (e.g., user intent module 1106 of FIG. 11) disambiguates one or more words included in the user voice input based on user data associated with the second electronic device. In some examples, the user data associated with the second electronic device includes contacts stored on the second electronic device, user speech profiles generated based on user voice inputs received at the second electronic device, and/or media (e.g., songs, images, and/or the like) stored on the second electronic device. In some examples, the user data associated with the second electronic device is stored on the remote device (e.g., the second electronic device periodically syncs the user data to the remote device). In some examples, the remote device uses user speech profile data associated with the second electronic device and/or stored contact information associated with the second electronic device to disambiguate the user voice input (e.g., to recognize one or more words included in the user voice input).

At block 1514, the first electronic device receives, from the remote device, a command to perform one or more tasks (e.g., one or more tasks to be performed by an electronic device of the context-sharing group in order to fulfill a user intent corresponding to the user voice input) and a device identifier corresponding to the second electronic device (e.g., data indicating the second electronic device) (e.g., as represented by arrows 926 of FIG. 9). In some examples, an electronic device is assigned a device identifier upon joining the context-sharing group. In some examples, the at least a portion of the aggregate context includes a device identifier for each electronic device currently participating in the context-sharing group (e.g., associated with the context information for each electronic device). The remote device (e.g., task determination module 1108 and device selection module 1110 of FIG. 11) determines the one or more tasks and selects the device identifier based on the data corresponding to the user voice input and context information included in the at least a portion of the aggregate context.

In some examples, the context-sharing group further includes a fourth electronic device. In some examples, the first electronic device, the second electronic device, and the fourth electronic device are all personal electronic devices (e.g., client devices) that are each registered to a single user. In some of these examples, at block 1516, prior to transmitting the command to the second electronic device (based on the device identifier corresponding to the second electronic device), the first electronic device receives, from the remote device, user data associated with the fourth electronic device (e.g., the first electronic device receives the user data before, at the same time as, or soon after receiving the command). In some examples, the user data associated with the fourth electronic device includes contact information stored on the fourth electronic device and/or media (e.g., songs, images, videos, and/or the like) stored on the fourth electronic device. In some examples, the user data associated with the fourth electronic device is also stored on the remote device (e.g., the fourth electronic device periodically syncs the user data to the remote device).

In some examples, the first electronic device and the second electronic device are both personal electronic devices (e.g., client devices) that are each registered to a different user. In some of these examples, at block 1518, prior to transmitting the command to the second electronic device, the first electronic device outputs a request for user authentication (e.g., voice authentication, password authentication, and/or biometric authentication (e.g., face and/or fingerprint authentication). In some examples, the first electronic device determines that the second electronic device is registered to a different user and, in response to this determination, outputs the request for user authentication. In some examples, the remote device determines that the first electronic device and the second electronic device are each registered to a different user. In these examples, prior to outputting the request for user authentication, the first electronic device receives a second command from the remote device and a device identifier corresponding to the first electronic device (e.g., as represented by arrows 925 of FIG. 9). The second command then causes the first electronic device to output the request for authentication. In some examples, the second command is received at the same time as the command (received at block 1514), and the first electronic device executes the second command prior to transmitting the command to the second electronic device.

In some examples, at block 1520, the first electronic device receives authentication data from a user of the first electronic device.

In some examples, at block 1522, after receiving the authentication data, the first electronic device transmits the command in response to determining, based on the received authentication data, that the user of the first electronic device is an authorized user of the second electronic device. In some examples, the user previously registers with the second electronic device to become an authorized user of the second electronic device. In some examples, a user of the second electronic device registers the user of the first electronic device as an authorized user of the second electronic device. In some examples, the user of the first electronic device is registered as an authorized user of the second electronic device via a software application stored on the first electronic device and/or the second electronic device (e.g., HomeKit) and/or via a website. In some examples, the first electronic device transmits authentication information received from the user to the remote device (e.g., as represented by arrows 927 of FIG. 9). In these examples, the remote device determines that the user is an authorized user of the second electronic device and thus instructs the first electronic device to transmit the command to the second electronic device (e.g., via a second command).

At block 1524, the first electronic device transmits the command to the second electronic device based on the device identifier (e.g., as represented by arrows 928a or 928b of FIG. 9). The command causes the second electronic device to perform the one or more tasks. In some examples, the command further causes the second electronic device to output (e.g., as an audio output and/or via a display) a user query after performing the one or more tasks. In some examples, the user query asks whether or not to transmit a second command to perform the one or more tasks to a fourth electronic device that is participating in the context-sharing group. In some examples, the command causes the second electronic device to output the user query before performing the one or more tasks.

In some of the examples described above where the first electronic device receives (at block 1516) user data associated with a fourth electronic device, at block 1526, the first electronic device transmits the user data associated with the fourth electronic device to the second electronic device with the command (e.g., in response to the user voice input "Hey Siri, play a Taylor Swift song" the servers provides data corresponding to a Taylor Swift song stored on the fourth electronic device (e.g., audio data) to the first electronic device so that the second electronic device can then play the Taylor Swift song despite not having the song stored thereon). In these examples, the command transmitted to the second electronic device causes the second electronic device to perform the one or more tasks based on the user data.

FIGS. 16A-16E illustrate a flow chart representing a process for identifying an electronic device participating in a context-sharing group to perform one or more tasks, according to various examples. Process 1600 is performed, for example, by one or more servers (e.g., DA server 106). In some examples, process 1600 is performed, for example, by one or more other remote devices, or a combination of remote devices (e.g., one or more local servers, a cloud-computing system, and/or the like). In some examples, one or more blocks of process 1600 are performed using one or more electronic devices implementing a digital assistant. For example, the blocks of process 1600 are divided up in any manner between one or more servers (e.g., DA server 106) and a client device. In other examples, the blocks of process 1600 are divided up between one or more servers and multiple client devices (e.g., a mobile phone and a smart watch). Thus, while portions of process 1600 are described herein as being performed by particular devices, it will be appreciated that process 1600 is not so limited. In other examples, process 1600 is performed using only a client device (e.g., user device 104) or only multiple client devices. In process 1600, some blocks are, optionally, combined, the order of some blocks is, optionally, changed, and some blocks are, optionally, omitted. In some examples, additional steps may be performed in combination with the process 1600.

At block 1602, one or more servers (e.g., server 916 (e.g., voice input receiver module 1102 and aggregate context receiver module 1104 of FIG. 11)) receives, from a first electronic device participating in a context-sharing group associated with a first location (e.g., communal device 904), a user voice input and at least a portion of an aggregate context of the context-sharing group (e.g., as represented by arrows 924 of FIG. 9). The context-sharing group (e.g., context-sharing group 914) is a collection of a plurality of electronic devices that each share context information with at least one other electronic device included in the collection. In some examples, each electronic device of the plurality of electronic devices is connected to a single wireless network of the first location (e.g., a Wi-Fi network). In some examples, at least one of the electronic devices participating in the context-sharing group is connected to the single wireless network and the remaining electronic devices participating in the context-sharing group are connected to the at least one electronic device via one or more wireless communication connections (e.g., short distance communication connections (e.g., Bluetooth and/or BTLE)).

The aggregate context is, for example, a collection of context information (e.g., device state change information (e.g., type of state change and time of state change), contextual state information (e.g., device location, display visibility (e.g., display up or down), user attention information (e.g., whether a user is looking at the device display), strength of network connection, amount of battery power, type of power source (e.g., battery vs wired power source), and/or the like), and/or device capability information (e.g., type of device, processing power, memory availability, display information, speaker information, and/or the like)) received from one or more (e.g., each) electronic devices participating in the context-sharing group. In some examples, the context information (e.g., device state change information and/or contextual state information) indicates whether an electronic device is available (e.g., whether the electronic device is currently being used (e.g., whether there are open/active applications, etc.), currently performing a task, and/or currently unable to provide an audio and/or visual output (e.g., because the electronic device is face down, muted, playing media, and/or the like)). In some examples, the context information included in the aggregate context includes device proximity information that indicates how physically close one or more electronic devices participating in the context-sharing group are to the first electronic device. In some examples, the device proximity information is based on data indicating whether or not the one or more electronic devices participating in the context-sharing group detected (e.g., heard) a digital assistant trigger word or phrase included in the user voice input (e.g., data included in one or more trigger indications).

At block 1604, the one or more servers (e.g., user intent module 1106 of FIG. 11) determine a user intent based on the user voice input. In some examples, determining the user intent includes the one or more servers performing speech recognition processing and/or natural language processing of the user voice input. In some examples, the one or more servers determine the user intent further based on context information included in the at least a portion of aggregate context. In some of these examples, the context information includes device state change information (e.g., context information indicating a time, location, and/or type of a device state change for an electronic device participating in the context-sharing group) associated with a second electronic device that is participating in the context-sharing group. In some examples where the device state change information indicates a type of device state change and a time of device state change for a most recent device state change of the second electronic device, determining the user intent includes disambiguating the user voice input based the type of the device state change and the time of the device state change. For example, if the user voice input is "Hey Siri, stop" and the context information indicates that a timer event is occurring at a device, the one or more servers may determine a user intent of stopping a timer based on timer event indication. In some examples, when two or more events (e.g., timer, alarm, media playback, and/or the like) are occurring at two or more separate electronic devices, the one or more servers use device state change time information to determine the user intent based on the most recent device state change (e.g., if a timer event is more recent than a media playback event, the one or more servers may determine a user intent of stopping the timer event in response to the user voice input "Hey Siri, stop.").

At block 1606, the one or more servers (e.g., task determination module 1108 of FIG. 11) determine one or more tasks corresponding to the user intent (e.g., one or more tasks to be performed by an electronic device to fulfill the user intent). In some examples, the one or more tasks corresponding to the user intent are predetermined based on the determined user intent. In some examples, the one or more tasks include performing a search, retrieving information/data, opening a software application stored on an electronic device, playing media, making a purchase, displaying retrieved information/data, and/or the like.

At block 1608, the one or more servers (e.g., device selection module 1110 of FIG. 11) identify (e.g., select) a second electronic device of the plurality of electronic devices (e.g., a personal electronic device or a communal electronic device) to perform the one or more tasks based on the one or more tasks and context information included in the at least a portion of the aggregate context (e.g., context information associated with the second electronic device and/or context information associated with one or more electronic devices of the plurality of electronic devices). In some examples, the one or more servers identify the second electronic device further based on the determined user intent. In some examples, the first electronic device is the second electronic device (e.g., when the one or more servers identify the electronic device that provides the user voice input to the one or more servers as the optimal electronic device to perform the one or more tasks). In some examples, the one or more servers identify two or more electronic devices of the plurality of electronic devices instead of only one electronic device (e.g., for multimodal task performance).

In some examples, at block 1610, identifying the second electronic device (at block 1608) includes the one or more servers determining, based on device state change information included in the context information (e.g., device state change information associated with the second electronic device and/or associated with one or more other electronic devices of the plurality of electronic devices (e.g., time of device state change, type of device state change (e.g., timer event, alarm event, media playback, or the like), etc.)), whether an event (e.g., a timer event, an alarm event, media playback, and/or the like) that corresponds to the user intent (e.g., a user intent of stopping a timer, stopping an alarm, stopping or updating media playback (e.g., pausing or changing a song), and/or the like) is currently occurring at one or more electronic devices of the plurality of electronic devices.

In some examples, at block 1612, in accordance with a determination that an event that corresponds to the user intent is currently occurring only at the second electronic device, the one or more servers identify (e.g., select) the second electronic device.

In some examples, at block 1614, in accordance with a determination that an event that corresponds to the user intent is currently occurring at the second electronic device and at least one other electronic device of the plurality of electronic devices, the one or more servers determine which event began most recently based on data indicating a time of device state change included in the device state change information.

In some examples, at block 1616, in accordance with a determination that the event occurring at the second electronic device began most recently, the one or more servers identify (e.g., select) the second electronic device.

In some examples, at block 1618, identifying the second electronic device (at block 1608) includes the one or more servers determining, based on device state change information included in the context information (e.g., time of device state change, type of device state change (e.g., timer event, alarm event, media playback, or the like), etc.)), whether an event (e.g., stopping a timer, pausing media playback, and/or the like) that corresponds to the user intent (e.g., a user intent of restarting a timer, resuming media playback, and/or the like) previously occurred at one or more electronic devices of the plurality of electronic devices within a predetermined period of time (e.g., within the last 5, 10, or 15 minutes).

In some examples, at block 1620, in accordance with a determination that an event that corresponds to the user intent previously occurred only at the second electronic device within the predetermined period of time, the one or more servers identify (e.g., select) the second electronic device.

In some examples, at block 1622, in accordance with a determination that an event that corresponds to the user intent previously occurred at the second electronic device and at least one other electronic device of the plurality of electronic devices within the predetermined period of time, the one or more servers determine, based on proximity information included in the context information (e.g., proximity information associated with the second electronic device and the at least one other electronic device), whether the second electronic device or the at least one other electronic device is physically closer to the first electronic device. In some examples, the one or more servers determine whether the second electronic device or the at least one other electronic device is physically closer to the first electronic device based on contextual state information included in the context information (e.g., a current location of the second electronic device and the at least one other electronic device).

In some examples, at block 1624, in accordance with a determination that the second electronic device is physically closer to the first electronic device than the at least one other electronic device, the one or more servers identify (e.g., select) the second electronic device. In some examples, the one or more servers transmit a command to the first electronic device (e.g., before, or at the same time as, the command for performing the one or more tasks) that causes the first electronic device to request a user of the first electronic device to select an electronic device of the plurality of electronic devices to perform the one or more tasks (e.g., instead of determining which electronic device is closest to the first electronic device or when the second electronic device and the at least one other electronic device are equally as physically close to the first electronic device (or within a same area of the first location (e.g., the same room)).

In some examples, the proximity information discussed above is based on data indicating whether or not one or more electronic devices of the plurality of electronic devices detected a digital assistant trigger included in the user voice input (e.g., the data indicating whether or not the electronic devices detected the digital assistant trigger is included in the context information that is included in the aggregate context (e.g., included in one or more trigger advertisements that are included in the aggregate context)). In some examples, the data indicating whether or not one or more electronic devices of the plurality of electronic devices detected a digital assistant trigger included in the user voice input includes data indicating an energy level (e.g., decibel level) of the digital assistant trigger (e.g., the energy level of the digital assistant trigger word or phrase when received by the an electronic device).

In some examples, at block 1626, identifying the second electronic device (at block 1608) includes the one or more servers determining, based on device state change information included in the context information (e.g., time of device state change, type of device state change (e.g., timer event, alarm event, media playback, or the like), etc.)), whether one or more electronic devices of the plurality of electronic devices are available to perform the one or more tasks. For example, an electronic device is not available if the context information included in the aggregate context (specifically, device state change information and/or contextual state information) indicates that the electronic device is currently being used (e.g., open/active applications), currently performing a task, and/or currently unable to provide an audio and/or visual output (e.g., because the electronic device is face down, muted, playing media, and/or the like). In some examples, the one or more servers determine whether one or more electronic devices are available further based on contextual state information included in the context information (e.g., further based on a display visibility of the one or more electronic devices).

In some examples, at block 1628, in accordance with a determination that the second electronic device is available to perform the one or more tasks, the one or more servers determine, based on device capability information included in the context information (e.g., device capability information associated with the second electronic device (e.g., type of device, processing power, memory availability, display information, speaker information, and/or the like)), whether the second electronic device is capable of performing the one or more tasks. For example, if the one or more tasks include the task of displaying information (e.g., results of the task performance), then an electronic device must at least have a display in order to be capable of performing the one or more tasks. In some examples, the one or more servers determine whether the second electronic device is capable of performing the one or more tasks further based on contextual state information included in the context information (e.g., contextual state information associated with the second electronic device, such as strength of network connection, amount of battery power, type of power source (e.g., battery vs wired power source), and/or the like).

In some examples, at block 1630, in accordance with a determination that the second electronic device is capable of performing the one or more tasks, the one or more servers determine whether at least one other electronic device of the plurality of electronic devices is available and capable of performing the one or more tasks.

In some examples, at block 1632, in accordance with a determination that no other electronic device of the plurality of electronic devices is available and capable of performing the one or more tasks, the one or more servers identify (e.g., select) the second electronic device.

In some examples, at block 1634, in accordance with a determination that at least one other electronic device of the plurality of electronic devices is available and capable of performing the one or more tasks, the one or more servers determine, based on proximity information included in the context information (e.g., proximity information associated with the second electronic device and the at least one other electronic device), whether the second electronic device or the at least one other electronic device is physically closer to the first electronic device. The proximity information is based on data indicating whether or not one or more electronic devices of the plurality of electronic devices detected a digital assistant trigger included in the user voice input (e.g., data included in one or more trigger indications). The data indicating whether or not one or more electronic devices of the plurality of electronic devices detected a digital assistant trigger included in the user voice input includes data indicating a first energy level of the digital assistant trigger according to the second electronic device and data indicating a second energy level of the digital assistant trigger according to the at least one other electronic device. In some examples, the one or more servers determine whether the second electronic device or the at least one other electronic device is physically closer to the first electronic device further based on contextual state information included in the context information (e.g., a current location of the second electronic device and a current locations of the at least one other electronic device).

In some examples, at block 1636, determining whether the second electronic device or the at least one other electronic device is physically closer to the first electronic device (at block 1634) includes the one or more servers comparing a first energy level of the digital assistant trigger according to the second electronic device to a second energy level of the digital assistant trigger according to the at least one other electronic device.

In some examples, at block 1638, the one or more servers determine whether a difference between the first energy level and the second energy level is less than a predetermined threshold (e.g., a predetermined decibel level difference (e.g., 2 decibels, 5 decibels, or the like)).

In some examples, at block 1640, in accordance with a determination that the difference is less than the predetermined threshold, the one or more servers determine, based on user attention information included in the context information, whether a user of the first electronic device is looking at a display of the second electronic device or at a display of the at least one other electronic device.

In some examples, at block 1642, in accordance with a determination that the user is looking at the display of the second electronic device, the one or more servers identify (e.g., select) the second electronic device.

In some examples, at block 1642, in accordance with a determination that the second electronic device is physically closer to the first electronic device than the at least one other electronic device (at block 1634), the one or more servers identify (e.g., select) the second electronic device.

In some examples, at block 1646, the one or more severs identify (e.g., select), based on the one or more tasks and the context information, a third electronic device of the plurality of electronic devices to perform at least one task (e.g., displaying retrieved information/data, providing an audio output based on retrieved information/data, and/or the like) of the one or more tasks (e.g., before, after, or concurrently with the second electronic device's performance of the remaining tasks).

At block 1648, the one or more servers (e.g., command module 1112) transmit, to the first electronic device, a command to perform the one or more tasks and a device identifier corresponding to the second electronic device (e.g., data indicating the second electronic device) (e.g., as represented by arrows 926 of FIG. 9). After receiving the command, the first electronic device transmits the command to the second electronic device based on the device identifier. The command then causes the second electronic device to perform the one or more tasks. In some examples, the command further causes the second electronic device to provide an audio and/or visual digital assistant response based on the performance of the one or more tasks (e.g., "Now playing Taylor Swift" or "Resuming Star Wars: The Empire Strikes Back.").

In some examples, an electronic device is assigned a device identifier upon joining the context-sharing group. In some examples, the at least a portion of the aggregate context includes a device identifier for each electronic device currently participating in the context-sharing group (e.g., associated with the context information for each electronic device).

In some of the examples described above where the one or more servers identify a third electronic device to perform at least one task of the one or more tasks (at block 1646), at block 1650, the one or more servers transmit, to the first electronic device, a second command to perform the at least one task and a device identifier corresponding to the third electronic device. In some examples, the one or more servers concurrently transmit the command and the second command to the first electronic device.

Figure 17A:
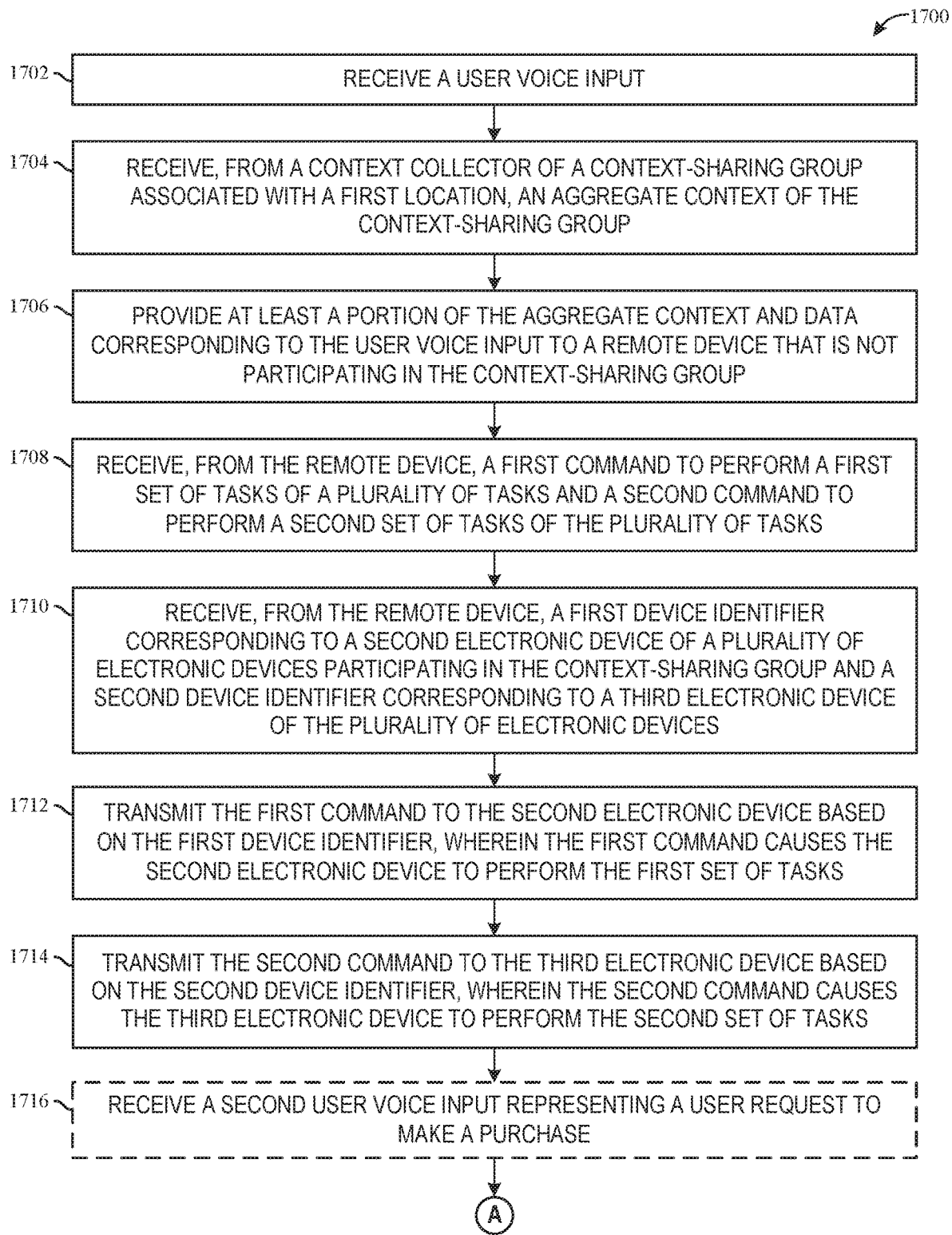
FIGS. 17A-17C illustrate a flow chart representing a process for multimodal task performance in a context-sharing group, according to various examples.
Figure 17B:
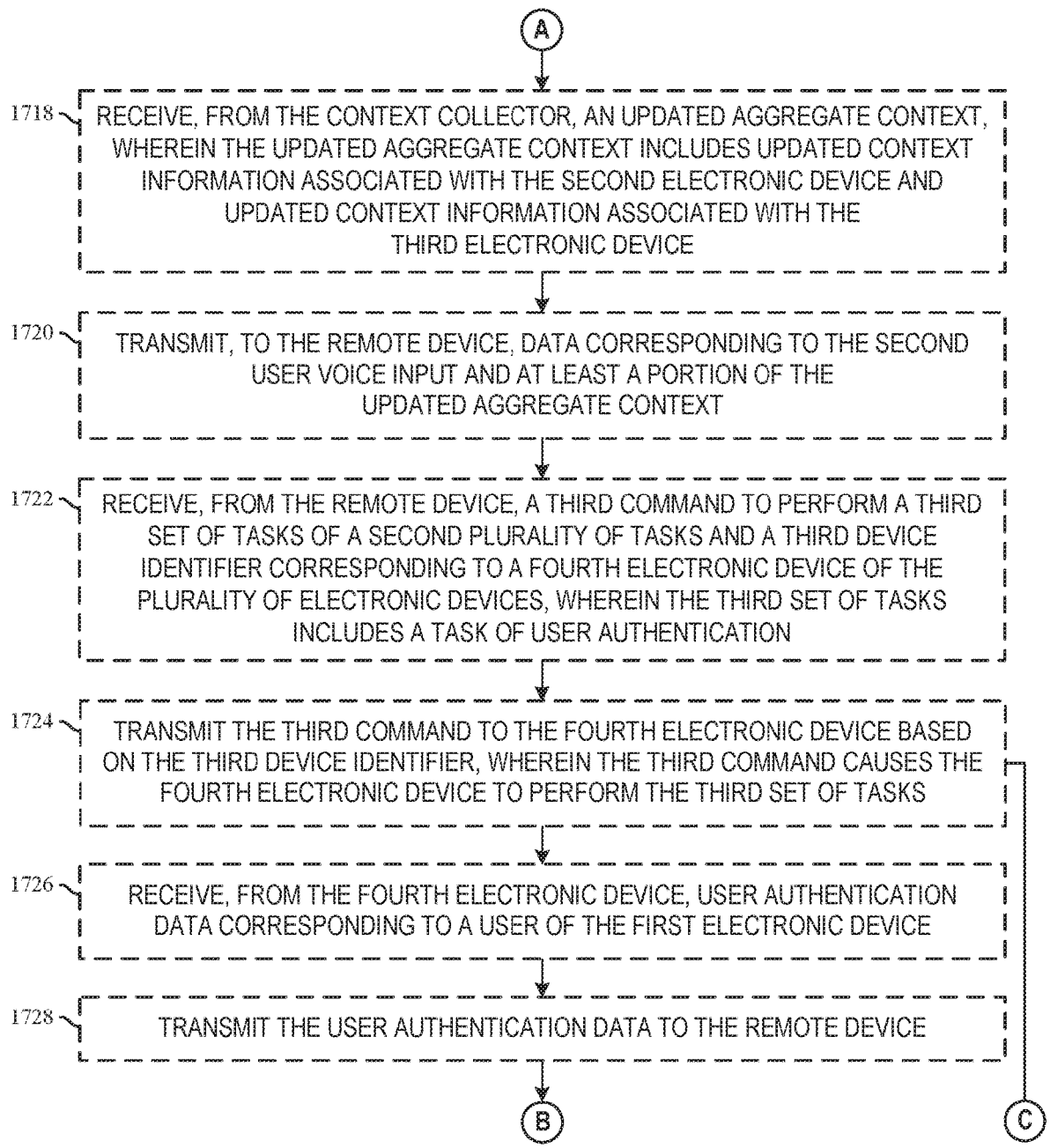
Figure 17C:
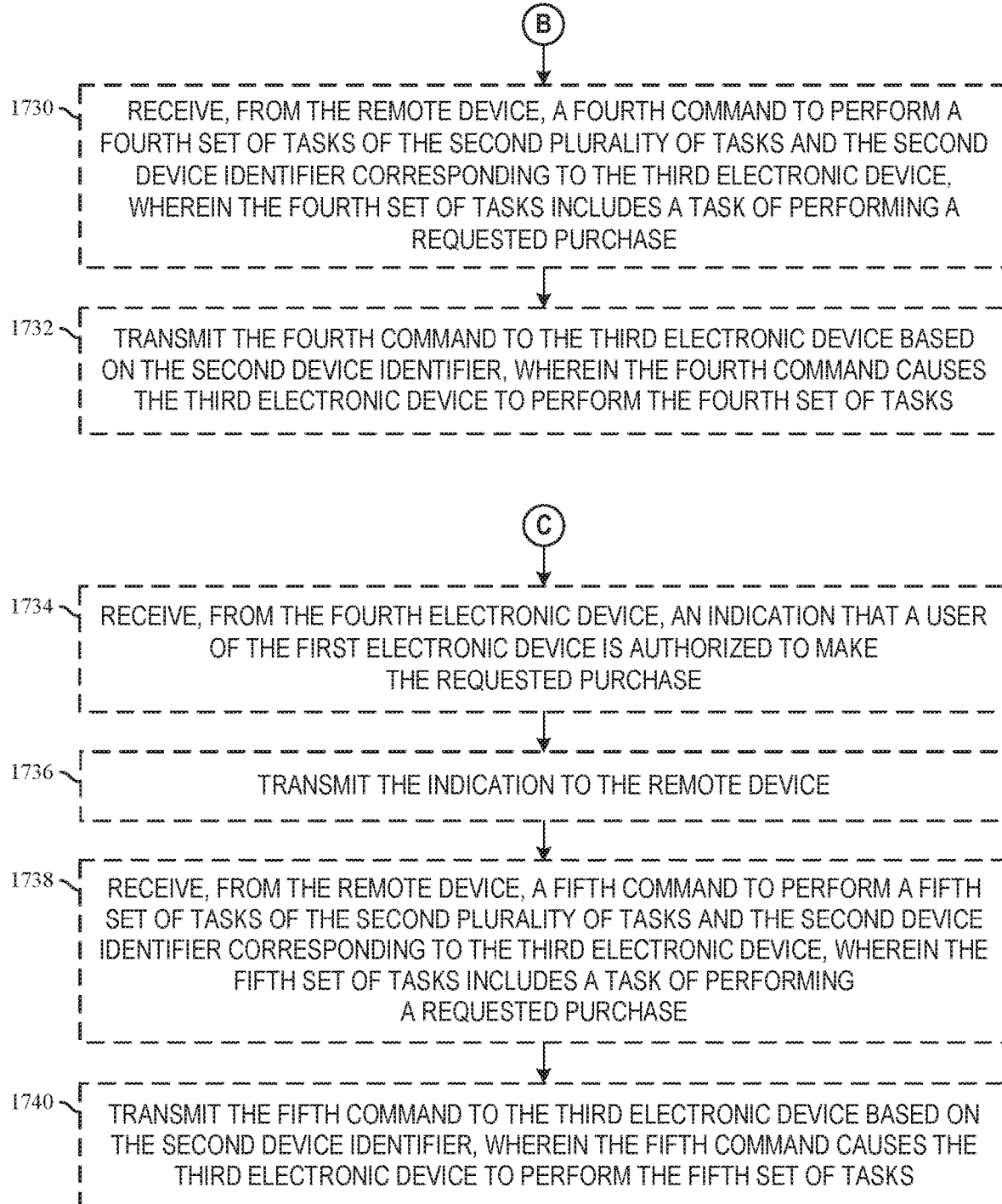

FIGS. 17A-17C illustrate a flow chart representing a process for multimodal task performance in a context-sharing group, according to various examples. Process 1700 is performed, for example, using one or more electronic devices implementing a digital assistant. In some examples, one or more blocks of process 1700 are performed by one or more remote devices (e.g., one or more remotes servers (e.g., DA server 106), one or more local servers, a cloud-computing system, and/or the like). For example, the blocks of process 1700 are divided up in any manner between one or more servers (e.g., DA server 106) and a client device. In other examples, the blocks of process 1700 are divided up between one or more servers and multiple client devices (e.g., a mobile phone and a smart watch). Thus, while portions of process 1700 are described herein as being performed by particular devices, it will be appreciated that process 1700 is not so limited. In other examples, process 1700 is performed using only a client device (e.g., user device 104) or only multiple client devices. In process 1700, some blocks are, optionally, combined, the order of some blocks is, optionally, changed, and some blocks are, optionally, omitted. In some examples, additional steps may be performed in combination with the process 1700.

At block 1702, a first electronic device participating in a context-sharing group associated with a first location (e.g., communal device 1204) receives a user voice input (e.g., user voice input 1218). The context-sharing group is a collection of a plurality of electronic devices that each share context information with at least one other electronic device included in the collection. The collection includes a context collector (e.g., communal device 1206).

At block 1704, the first electronic device receives, from the context collector, an aggregate context of the context-sharing group (e.g., as represented by arrows 1222 of FIG. 12A).

At block 1706, after receiving the aggregate context, the first electronic device provides at least a portion of the aggregate context and data corresponding to the user voice input to a remote device that is not participating in the context-sharing group (e.g., as represented by arrows 1224 of FIG. 12A). The remote device determines a plurality of tasks based on the data corresponding to the user voice input (e.g., a plurality of tasks to be performed by one or more electronic devices participating in the context-sharing group in order to fulfill a user intent corresponding to the user voice input). In some examples, the remote device determines the plurality of tasks further based on context information included in the at least a portion of the aggregate context (e.g., further based on device state change information).

In some examples, the first electronic device provides all of the aggregate context to the remote device. In some examples, the first electronic device determines what context information included in the aggregate context is relevant to the user voice input (e.g., when the first electronic device performs natural language processing of the first user input) and only provides the relevant context information to the remote device. In some examples, the first electronic device determines what context information is relevant based on one or more domains of an active ontology that correspond to the user voice input (e.g., by identifying the context information that is related to the one or more domains). In some examples, the first electronic device removes personal data (e.g., personal information and/or user data) included in the aggregate context prior to providing the aggregate context to the remote device. In some examples, the first electronic device encrypts personal data (e.g., personal information and/or user data) included in the aggregate context prior to providing the aggregate context to the remote device.

At block 1708, the first electronic device receives, from the remote device, a first command to perform a first set of tasks of the plurality of tasks and a second command to perform a second set of tasks of the plurality of tasks (e.g., as represented by arrows 1226 of FIG. 12A). In some examples, one or more tasks of the first set of tasks are identical to one or more tasks of the second set of tasks (e.g., performing a search, retrieving information/data based on the search, opening a software application stored on the first and second electronic devices, and/or the like).

In some examples, the at least a portion of the aggregate context includes context information associated with the second electronic device and context information associated with a third electronic device of the plurality of electronic devices. In some of these examples, the remote device determines the first set of tasks based on device capability information included the context information associated with the second electronic device (e.g., whether the second electronic device has a display and/or a size of the display, whether the second electronic device has a speaker and/or a loudness of the speaker, device processing power, and/or the like), and the remote device determines the second set of tasks based on device capability information included the context information associated with the third electronic device (e.g., whether the third electronic device has a display and/or a size of the display, whether the third electronic device has a speaker and/or a loudness of the speaker, device processing power, and/or the like). Further, in some of these examples, the remote device determines the first set of tasks and the second set of tasks in response to determining, based on the context information associated with the second electronic device and the context information associated with the third electronic device, that the second electronic device and the third electronic device are both available (e.g., not currently being used (e.g., open/active applications), not currently performing a task, and/or currently able to provide an audio and/or visual output (e.g., because the electronic device is face up)), capable of performing at least one task of the plurality of tasks, and proximate to the first electronic device (e.g., located within a same area of the first location (e.g., the same room) as the first electronic device. In some examples, the remote device determines whether an electronic device is located within a same area of the first location as the first electronic device based on proximity information included in the context information (e.g., based on an energy level (e.g., decibel level) of the digital assistant trigger word or phrase according to the second electronic device and the third electronic device, respectively (e.g., the energy level of the digital assistant trigger word or phrase when received by the second electronic device compared to the energy level of the digital assistant trigger word or phrase when received by the third electronic device).

At block 1710, the first electronic device receives, from the remote device, a first device identifier corresponding to a second electronic device of the plurality of electronic devices (e.g., data indicating the second electronic device) and a second device identifier corresponding to a third electronic device of the plurality of electronic devices (e.g., as represented by arrows 1226 of FIG. 12A). In some examples, the second electronic device or the third electronic device is the first electronic device.

At block 1712, the first electronic device transmits the first command to the second electronic device based on the first device identifier (e.g., as represented by arrows 1228 of FIG. 12A). The first command causes the second electronic device to perform the first set of tasks. As mentioned above, in some examples, the first electronic device is the second electronic device. In these examples, the first electronic device performs the first set of tasks in response to receiving the first command from the remote device (instead of transmitting the first command).

At block 1714, the first electronic device transmits the second command to the third electronic device based on the second device identifier. The second command causes the third electronic device to perform the second set of tasks. As mentioned above, in some examples, the first electronic device is the third electronic device. In these examples, the first electronic device performs the second set of tasks in response to receiving the second command from the remote device (instead of transmitting the second command).

In some examples, the second electronic device only outputs an audio output based on the performance of the first set of tasks (e.g., a digital assistant response naming the titles of all Star Wars movies), and the third electronic device only displays a visual output based on the performance of the second set of tasks (e.g., displays the titles of the Star Wars movies with corresponding movie poster images).

In some examples, in response to performing the first set of tasks, the second electronic device outputs (e.g., on a display of the second electronic device and/or as an audio output) a brief summary of data or information retrieved based on the performance of the first set of tasks (e.g., a brief summary of text, hyperlinks, images, and/or the like corresponding to Star Wars movie titles, historical information, cast information, and/or the like).

In some examples, in response to performing the second set of tasks, the third electronic device outputs (e.g., on a display of the third electronic device and/or as an audio output) a detailed summary of data or information retrieved based on the performance of the second set of tasks (e.g., a detailed summary of text, hyperlinks, images, and/or the like corresponding to Star Wars movie titles, historical information, cast information, and/or the like). In some examples, the detailed summary includes at least one of hyperlinks, images, audio data, or text data that is not included in the brief summary.

In some examples, at block 1716, the first electronic device receives a second user voice input (e.g., user voice input 1234) representing a user request to make a purchase (e.g., "Hey Siri, purchase Star Wars: The Empire Strikes Back.").

In some examples, at block 1718, the first electronic device receives, from the context collector, an updated aggregate context (e.g., as represented by arrows 1238 of FIG. 12B). The updated aggregate context includes updated context information associated with the second electronic device and updated context information associated with the third electronic device (e.g., the updated context information for both devices include data indicating results of the performance of the first set of tasks and results of the performance of the second set of tasks, respectively (e.g., any audio output that was provided, what is currently displayed, etc.)). In some examples, the second electronic device transmits the updated context information associated with the second electronic to the context collector after performing the first set of tasks, and the third electronic device transmits the updated context information associated with the third electronic to the context collector after performing the second set of tasks In some examples, at block 1720, the first electronic device transmits, to the remote device, data corresponding to the second user voice input and at least a portion of the updated aggregate context (e.g., as represented by arrows 1240 of FIG. 12B). The remote device then determines a second plurality of tasks based on the data corresponding to the second user voice input. In some examples, the remote device determines the plurality of tasks further based on context information included in the at least a portion of the updated aggregate context (e.g., further based on device state change information).

In some examples, at block 1722, the first electronic device receives, from the remote device, a third command to perform a third set of tasks of the second plurality of tasks and a third device identifier corresponding to a fourth electronic device of the plurality of electronic devices (e.g., as represented by arrows 1242 of FIG. 12B). The third set of tasks includes a task of user authentication. In some examples, the fourth electronic device is the second electronic device.

In some examples, at block 1724, the first electronic device transmits the third command to the fourth electronic device based on the third device identifier (e.g., as represented by arrows 1244 of FIG. 12B). The third command causes the fourth electronic device to perform the third set of tasks.

In some examples, after transmitting the third command to the fourth electronic device (at block 1724), at block 1726, the first electronic device receives, from the fourth electronic device, user authentication data corresponding to a user of the first electronic device (e.g., voice authentication data, password authentication data, and/or biometric authentication data (e.g., data corresponding to a face and/or a fingerprint authentication)) (e.g., as represented by arrows 1246 of FIG. 12B).

In some examples, at block 1728, the first electronic device transmits the user authentication data to the remote device (e.g., as represented by arrows 1248 of FIG. 12B).

In some examples, at block 1730, the first electronic device receives, from the remote device, a fourth command to perform a fourth set of tasks of the second plurality of tasks and the second device identifier corresponding to the third electronic device (e.g., as represented by arrows 1250 of FIG. 12B). The remote device transmits the fourth command to the first electronic device in response to determining, based on the user authentication data, that the user of the first electronic device is authorized to make the requested purchase. The fourth set of tasks includes a task of performing the requested purchase. In some examples, the remote device transmits the fourth command before, at the same time as, or soon after the third command. In these examples, the first electronic device does not transmit the fourth command to the third electronic device until the remote device informs the first electronic device that the user of the first electronic device is authorized to make the requested purchase).

In some examples, at block 1732, the first electronic device transmits the fourth command to the third electronic device based on the second device identifier (e.g., as represented by arrows 1252 of FIG. 12B). The fourth command causes the third electronic device to perform the fourth set of tasks.

In some examples, after transmitting the third command to the fourth electronic device (at block 1724), at block 1734, the first electronic device receives, from the fourth electronic device, an indication that a user of the first electronic device is authorized to make the requested purchase (e.g., the fourth electronic device locally authenticates the user (e.g., based on user authentication data stored on the fourth electronic device) and transmits the indication in response to the authentication).

In some examples, at block 1736, the first electronic device transmits the indication to the remote device.

In some examples, at block 1738, the first electronic device receives, from the remote device, a fifth command to perform a fifth set of tasks of the second plurality of tasks and the second device identifier corresponding to the third electronic device. The remote device transmits the fifth command to the first electronic device in response to receiving the indication that the user of the first electronic device is authorized to make the requested purchase. The fifth set of tasks includes a task of performing the requested purchase.

In some examples, the remote device transmits the fifth command before, at the same time as, or soon after the third command. In these examples, the first electronic device does not transmit the fifth command to the third electronic device until the first electronic device receives the indication that the user of the first electronic device is authorized to make the requested purchase (in this manner, the servers are not involved in the user authentication decision). If the user is not authorized to make the requested purchase, the first electronic device does not transmit the fifth command to the third electronic device.

In some examples, at block 1740, the first electronic device transmits the fifth command to the third electronic device based on the second device identifier. The fifth command causes the third electronic device to perform the fifth set of tasks.

Figure 18A:
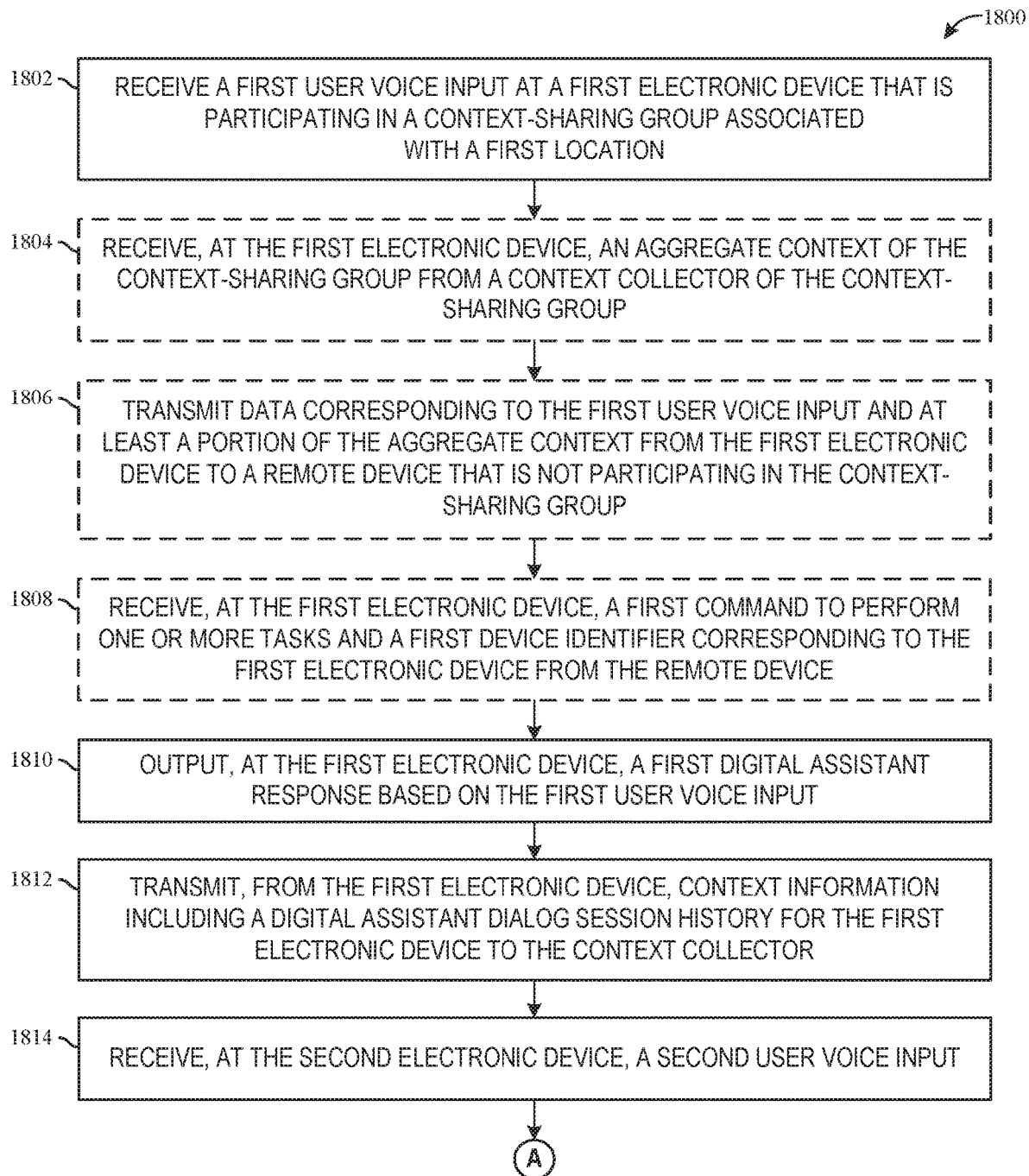
FIGS. 18A-18B illustrate a flow chart representing a process for a continuous digital assistant conversation across multiple electronic devices participating in a context-sharing group, according to various examples.
Figure 18B:
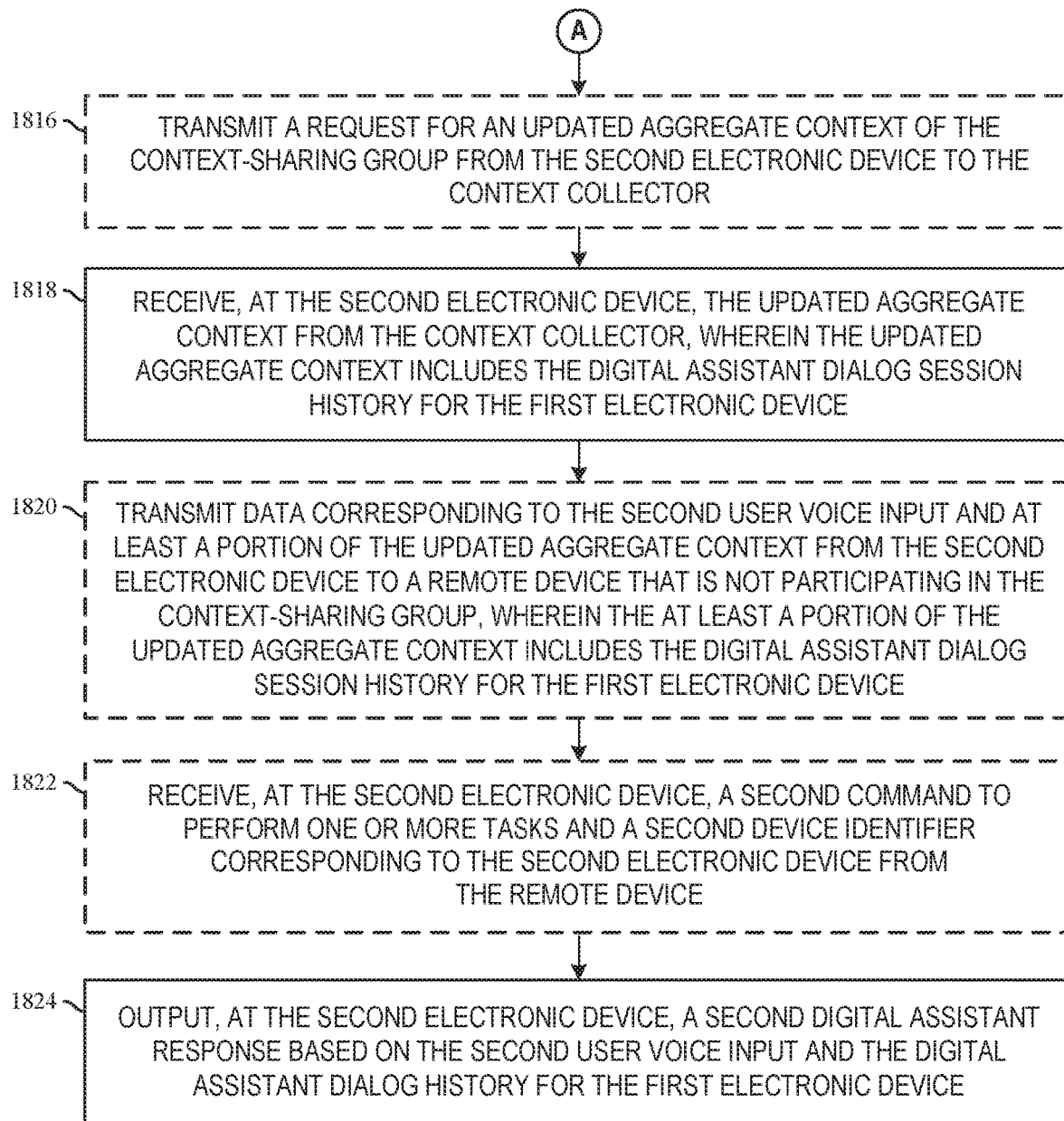

FIGS. 18A-18B illustrate a flow chart representing a process for a continuous digital assistant conversation across multiple electronic devices participating in a context-sharing group, according to various examples. Process 1800 is performed, for example, using one or more electronic devices implementing a digital assistant. In some examples, one or more blocks of process 1800 are performed by one or more remote devices (e.g., one or more remotes servers (e.g., DA server 106), one or more local servers, a cloud-computing system, and/or the like). For example, the blocks of process 1800 are divided up in any manner between one or more servers (e.g., DA server 106) and a client device. In other examples, the blocks of process 1800 are divided up between one or more servers and multiple client devices (e.g., a mobile phone and a smart watch). Thus, while portions of process 1800 are described herein as being performed by particular devices, it will be appreciated that process 1800 is not so limited. In other examples, process 1800 is performed using only a client device (e.g., user device 104) or only multiple client devices. In process 1800, some blocks are, optionally, combined, the order of some blocks is, optionally, changed, and some blocks are, optionally, omitted. In some examples, additional steps may be performed in combination with the process 1800.

At block 1802, a first electronic device participating in a context-sharing group associated with a first location (e.g., user device 1304) receives a first user voice input (e.g., user voice input 1316 of FIG. 13 (e.g., "Hey Siri, what's the temperature in Palo Alto?")). The context-sharing group is a collection of at least two electronic devices that each share context information with at least one other electronic device included in the collection. The collection includes a second electronic device (e.g., user device 1306) and a context collector (e.g., communal device 1308). In some examples, the context collector is a third electronic device that is participating in the context-sharing group. In some examples, the context collector is the first electronic device or the second electronic device. In some examples, the first electronic device and the second electronic device are located within two separate areas (e.g., two separate rooms) of the first location.

In some examples, at block 1804, prior to outputting a first digital assistant response, the first electronic receives an aggregate context of the context-sharing group from the context collector (e.g., as represented by arrows 1320 of FIG. 13). In these examples, the aggregate context includes context information associated with the first electronic device and context information associated with the second electronic device.

In some examples, at block 1806, the first electronic device transmits data corresponding to the first user voice input and at least a portion of the aggregate context to a remote device that is not participating in the context-sharing group (e.g., one or more remote servers, one or more local servers, a cloud-computing system, and/or the like) (e.g., as represented by arrows 1322 of FIG. 13).

In some examples, at block 1808, the first electronic device receives a first command to perform one or more tasks and a first device identifier corresponding to the first electronic device from the remote device (e.g., as represented by arrows 1324 of FIG. 13). In these examples, the remote device determines the one or more tasks and the device identifier corresponding to the first electronic device based at least on the data corresponding to the first user voice input and context information included in the aggregate context (e.g., the context information associated with the first electronic device and/or context information associated with one or more other electronic devices participating in the context-sharing group). The first command causes the first electronic device to perform the one or more tasks and determine a first digital assistant response based on results of the performance of the one or more tasks.

At block 1810, the first electronic device outputs a first digital assistant response based on the first user voice input (e.g., digital assistant response 1326 (e.g., "It's currently 68 degrees in Palo Alto.")).

After outputting the first digital assistant response (e.g., immediately after or several second after (e.g., after the current dialog session has ended (e.g., 1 or 2 seconds after the first electronic device provides the first digital assistant response with no additional user voice inputs received at the first electronic device))), at block 1812, the first electronic device transmits context information including a digital assistant dialog session history for the first electronic device to the context collector (e.g., as represented by arrows 1327 of FIG. 13). In some examples, the digital assistant dialog session history includes data corresponding to a most recent digital assistant dialog session (e.g., ASR results, NLP results, and/or data retrieved and/or provided during the most recent digital assistant dialog session (e.g., data corresponding to the most recent user voice input and digital assistant response)). For example, the digital assistant dialog session history includes data corresponding to the first user voice input and the first digital assistant response. In some examples, the digital assistant dialog session history includes data corresponding to digital assistant dialog sessions that have occurred within a predetermined period of time (e.g., within the past hour, within the past day, etc.).

At block 1814, the second electronic device receives a second user voice input (e.g., user voice input 1328 (e.g., "Hey Siri, how long will it take me to drive there?")). In some examples, the first electronic device and the second electronic device receive the first user voice input and the second user voice input from a single user. In other examples, the first electronic device and the second electronic device receive the first user voice input and the second user voice input from different users.

In some examples, at block 1816, the second electronic device transmits a request for an updated aggregate context of the context-sharing group to the context collector (e.g., as represented by arrows 1330 of FIG. 13). In some examples, the second electronic device transmits the request for the updated aggregate context in response to receiving the second user voice input.

At block 1818, the second electronic device receives an updated aggregate context of the context-sharing group from the context collector (e.g., as represented by arrows 1332 of FIG. 13). The updated aggregate context includes the digital assistant dialog session history for the first electronic device. In some examples, the context collector generates the updated aggregate context (e.g., in response to receiving the context information from the first electronic device). In these examples, generating the updated aggregate context includes the context collector updating context information associated with the first electronic device included in an aggregate context of the context-sharing group based at least on the digital assistant dialog session history for the first electronic device.

In some examples, at block 1820, prior to the second electronic device outputting a second digital assistant response, the second electronic device transmits data corresponding to the second user voice input and at least a portion of the updated aggregate context to a remote device that is not participating in the context-sharing group (e.g., one or more remote servers, one or more local servers, a cloud-computing system, and/or the like) (e.g., as represented by arrows 1334 of FIG. 13). In these examples, the at least a portion of the updated aggregate context includes the digital assistant dialog session history for the first electronic device.

In some examples, at block 1822, the second electronic device receives a second command to perform one or more tasks and a second device identifier corresponding to the second electronic device from the remote device (e.g., the device identifier causes the second electronic device to perform the one or more tasks) (e.g., as represented by arrows 1336 of FIG. 13). The remote device (e.g., user intent module 1106 and/or task determination module 1108 of FIG. 11) determines the one or more tasks and the device identifier corresponding to the second electronic device based at least on the data corresponding to the second user voice input and the digital assistant dialog session history for the first electronic device. The second command causes the second electronic device to perform the one or more tasks and determine the second digital assistant response based on results of the performance of the one or more tasks.

In some examples, the digital assistant dialog session history for the first electronic device includes data corresponding to the first user voice input. In these examples, determining the one or more tasks based at least on the data corresponding to the second user voice input and the digital assistant dialog session history for the first electronic device includes the remote device disambiguating the second user voice input based on the first user voice input. In some examples, disambiguating the second user voice input based on the first user voice input includes the remote device (e.g., task determination module 1108) determining one or more parameters for the second user voice input based on one or more parameters of the first user voice input (e.g., a location, contact name, website, email address, etc. included in the first user voice input). In some examples, disambiguating the second user voice input (e.g., "Hey Siri, how about in New York?") includes the remote device (e.g., user intent module 1106) determining that the second user voice input represents a user request for a digital assistant to perform a task previously performed by the digital assistant of the first electronic device (e.g., weather determination) using parameters provided in the second user voice input (e.g., a location ("New York"), contact name, website, email address, etc. included in the second user voice input).

At block 1824, the second electronic device outputs a second digital assistant response based on the second user voice input and the digital assistant dialog session history for the first electronic device (e.g., digital assistant response 1338 of FIG. 13 (e.g., "Traffic to Palo Alto is light, so I'm estimating 15 minutes via El Camino Real.")).

Figure 19A:
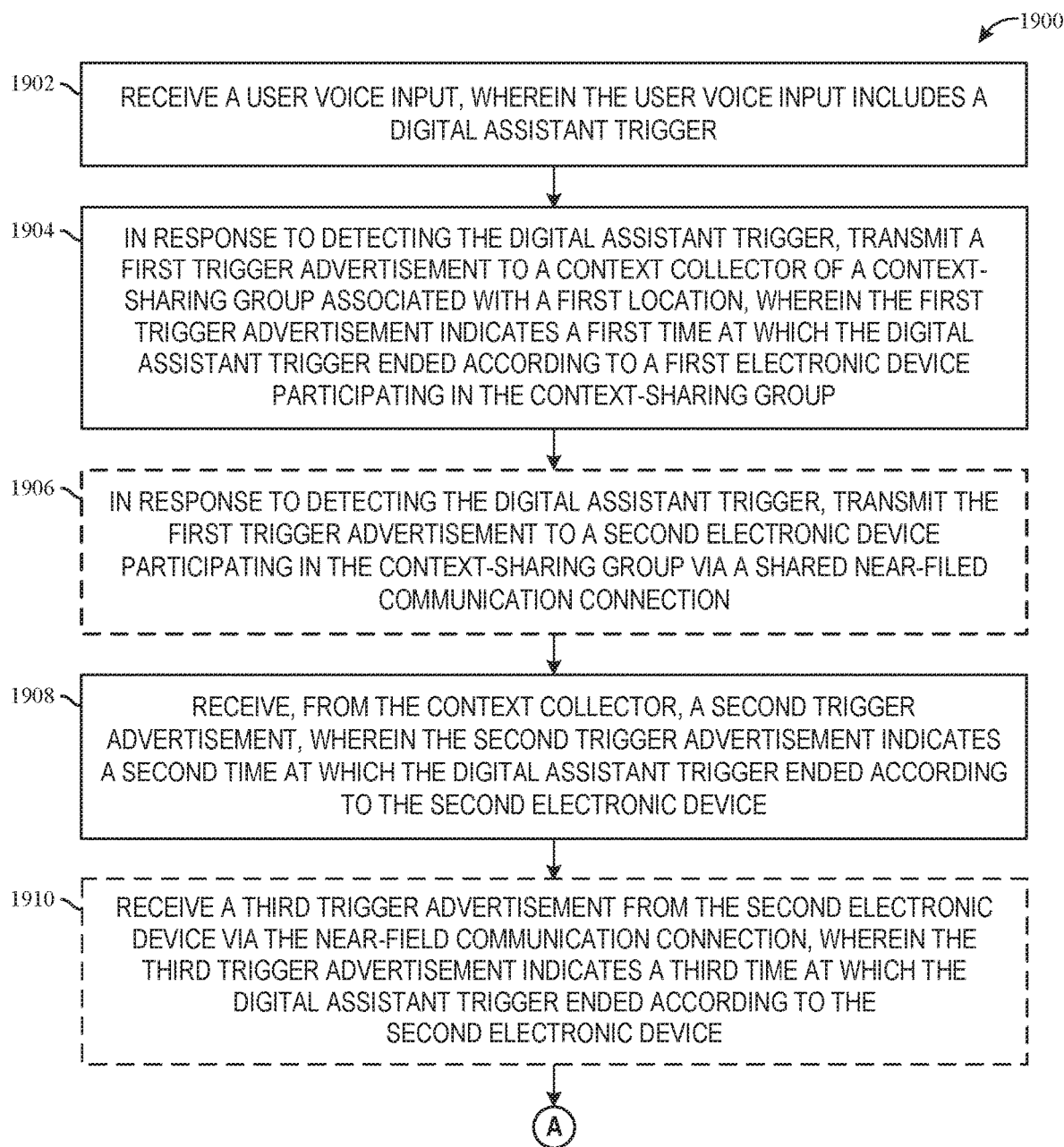
FIGS. 19A-19B illustrate a flow chart representing a process for suppressing a delayed digital assistant trigger detection using a context collector of a context-sharing group, according to various examples.
Figure 19B:
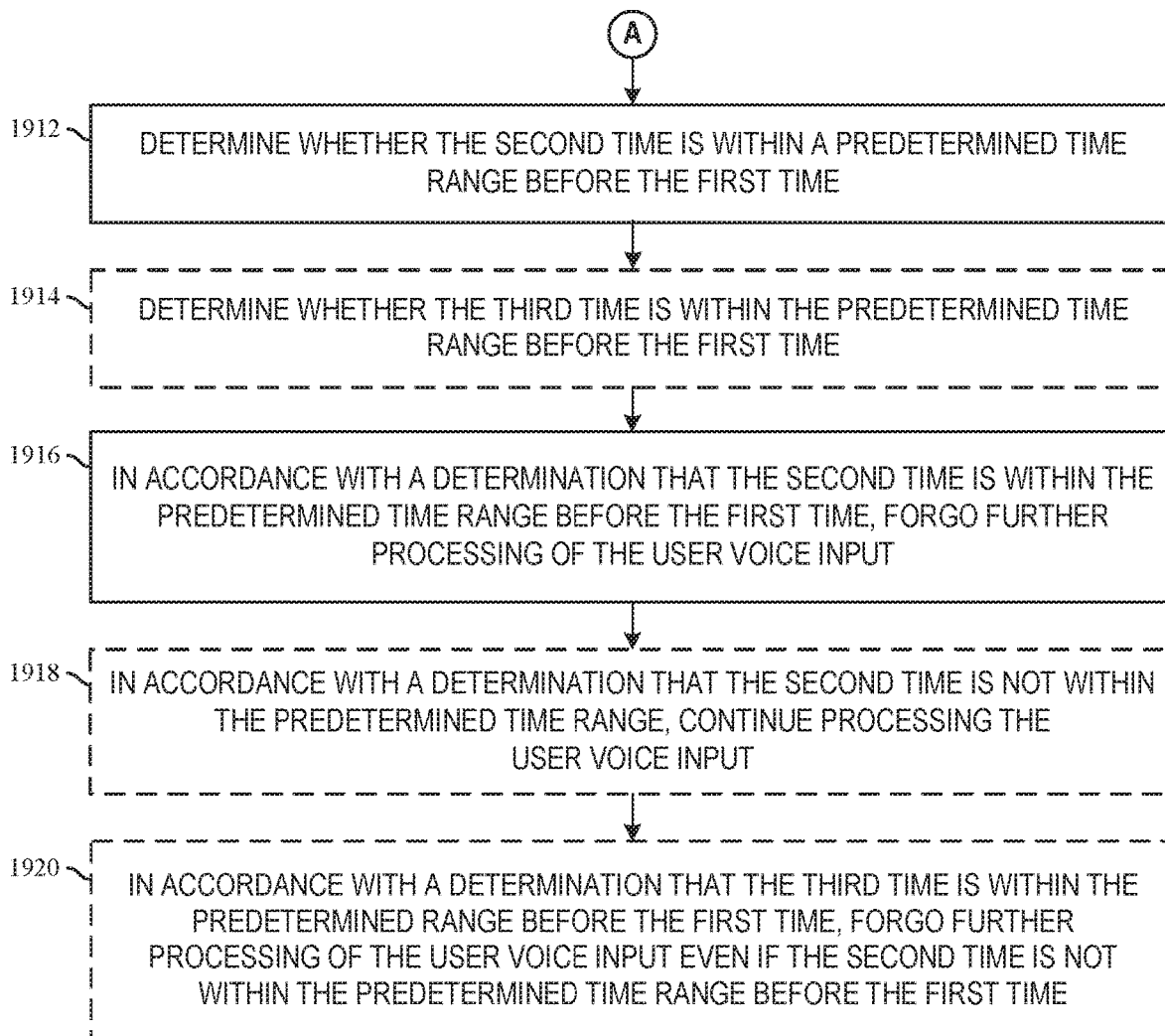

FIGS. 19A-19B illustrate a flow chart representing a process for suppressing a delayed digital assistant trigger detection using a context collector of a context-sharing group, according to various examples. Process 1900 is performed, for example, using one or more electronic devices implementing a digital assistant. In some examples, one or more blocks of process 1900 are performed by one or more remote devices (e.g., one or more remotes servers (e.g., DA server 106), one or more local servers, a cloud-computing system, and/or the like). For example, the blocks of process 1900 are divided up in any manner between one or more servers (e.g., DA server 106) and a client device. In other examples, the blocks of process 1900 are divided up between one or more servers and multiple client devices (e.g., a mobile phone and a smart watch). Thus, while portions of process 1900 are described herein as being performed by particular devices, it will be appreciated that process 1900 is not so limited. In other examples, process 1900 is performed using only a client device (e.g., user device 104) or only multiple client devices. In process 1900, some blocks are, optionally, combined, the order of some blocks is, optionally, changed, and some blocks are, optionally, omitted. In some examples, additional steps may be performed in combination with the process 1900.

At block 1902, a first electronic device participating in a context-sharing group associated with a first location (e.g., user device 1006 of FIG. 10) receives a user voice input (e.g., user voice input 1014 of FIG. 10). The user voice input includes a digital assistant trigger (e.g., a word or phrase that initiates a dialog session with a digital assistant of an electronic device (e.g., "Hey Siri . . . ", "Siri", or the like)). The context-sharing group is a collection of at least two electronic devices that each share context information with at least one other electronic device participating in the collection. The collection includes at least a second electronic device (e.g., communal device 1004) and a context collector (e.g., communal device 1008). In some examples, the second electronic device is the context collector. In some examples, the context collector is a third electronic device participating in the context-sharing group. In some examples, each electronic device participating in the context-sharing group is connected to a single wireless network of the first location.

At block 1904, in response to detecting the digital assistant trigger (e.g., determining that the user voice input includes the digital assistant trigger), the first electronic device transmits a first trigger advertisement to the context collector (e.g., via a wireless network of the first location) (e.g., as represented by arrows 1022 of FIG. 10). The first trigger advertisement indicates a first time at which the digital assistant trigger ended according to the first electronic device. In some examples, the first trigger advertisement includes data indicating an energy level (e.g., decibel level) of the digital assistant trigger word or phrase (e.g., the energy level of the digital assistant trigger word or phrase when received by the first electronic device). In some examples, the first trigger advertisement includes a confidence score corresponding to a confidence of the first electronic device that the user voice input includes a digital assistant trigger word or phrase.

In some examples, the first electronic device and the second electronic device share a short distance communication connection (e.g., a Bluetooth or Bluetooth Low Energy (BTLE) connection). In some of these examples, at block 1906, in response to detecting the digital assistant trigger, the first electronic device transmits the first trigger advertisement to the second electronic device via the short distance communication connection (e.g., the first electronic device transmits the first trigger advertisements via Bluetooth or BTLE before, at the same time as, or soon after transmitting the first trigger advertisement to the context collector).

At block 1908, the first electronic device receives, from the context collector, a second trigger advertisement (e.g., as represented by arrows 1024 of FIG. 10). The second trigger advertisement indicates a second time at which the digital assistant trigger ended according to the second electronic device. In some examples, the second electronic device transmits the second trigger advertisement to the context collector in response to detecting the digital assistant trigger included in the user voice input (before the context collector transmits the second trigger advertisement to the first electronic device). In some examples, the second electronic device includes the second trigger advertisement (e.g., data corresponding to the second trigger advertisement) in context information that the second electronic device transmits to the context collector after detecting the digital assistant trigger included in the user voice input (e.g., as represented by arrows 1016 of FIG. 10).

In some of the examples where the first electronic device and the second electronic device share a short distance communication connection (e.g., described above with reference to block 1906), at block 1910, the first electronic device receives a third trigger advertisement from the second electronic device via the short distance communication connection. The third trigger advertisement indicates a third time at which the digital assistant trigger ended according to the second electronic device. In some examples, the third time is identical to the second time indicated by the second trigger advertisement. In some examples, the second electronic device transmits the third trigger advertisement via the short distance communication connection in response to receiving the first trigger advertisement from the first electronic device via the short distance communication connection.

At block 1912, the first electronic device determines whether the second time is within a predetermined time range (e.g., 750 milliseconds, 500 milliseconds, 100 milliseconds, or the like) before the first time (e.g., determining whether the second trigger advertisement is "sane").

In some of the examples where the first electronic device and the second electronic device share a short distance communication connection (e.g., described above with reference to blocks 1906 and 1910), at block 1914, after determining whether the second time is within the predetermined time range before the first time, the first electronic device determines whether the third time is within the predetermined time range (e.g., 750 milliseconds, 500 milliseconds, 100 milliseconds, or the like) before the first time (e.g., determining whether the third trigger advertisement is "sane").

At block 1916, in accordance with a determination that the second time is within the predetermined time range before the first time (e.g., if the predetermined time range is 500 milliseconds, the second time is less than 500 milliseconds before the first time), the first electronic device forgoes further processing of the user voice input. In some examples, forgoing further processing of the user voice input includes the first electronic device forgoing transmitting a request to the context collector for an aggregate context of the context-sharing group.

In some of the examples where the first electronic device and the second electronic device share a short distance communication connection (e.g., described above with reference to blocks 1906, 1910, and 1914), at block 1918, in accordance with a determination that the third time is within the predetermined range before the first time, the first electronic device forgoes further processing of the user voice input even if the second time is not within the predetermined time range before the first time.

In some examples, at block 1920, in accordance with a determination that the second time is not within the predetermined time range (e.g., if the predetermined time range is 500 milliseconds, the second time is equal to or more than 500 milliseconds before the first time), the first electronic device continues processing the user voice input. In some examples, continuing processing of the user voice input includes the first electronic device transmitting a request to the context collector for an aggregate context of the context-sharing group.

The operations described above with reference to FIGS. 14A-14C, 15A-15B, 16A-16E, 17A-17C, 18A-18B, and 19A-19B are optionally implemented by components depicted in FIGS. 1-4, 6A-6B, and 7A-7C. For example, the operations of process 1400, process 1500, process 1600, process 1700, process 1800, and/or process 1900 may be implemented by system 100. It would be clear to a person having ordinary skill in the art how other processes are implemented based on the components depicted in FIGS. 1-4, 6A-6B, and 7A-7C.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data (e.g., user data, user-specific context information, and/or the like) available from various sources to assist with/improve the determination of digital assistant responses during a video communication session. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine one or more parameters of a task to be performed by digital assistant of a user device and/or communal device in response to a user request. Accordingly, use of such personal information data enables a digital assistant of a user device to provide a digital assistant response (based on the performance of the above task) that is more relevant and/or useful to users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of gathering and using user data to assist with/improve the determination of digital assistant responses, the present technology can be configured to allow users to select to "opt in" or "opt out" of participation in the collection of personal information data during registration for services or anytime thereafter. In another example, users can select not to provide user data (e.g., a user's media, contacts, speech profiles, preferences, and/or the like) to assist with/improve the determination of digital assistant responses. In yet another example, users can select to prevent the gathering and use of certain types/forms of personal information data (e.g., email addresses, home addresses, payment information, and/or the like) for the determination of digital assistant responses. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, digital assistant responses can be determined based on non-personal information data/user data or a bare minimum amount of personal information and/or user data, such as the content being requested by the device associated with a user, other non-personal information available to the digital assistant, or publicly available information.

What is claimed is:
1. A first electronic device, comprising:
one or more processors;
memory; and
one or more programs, wherein the one or more programs are stored in the memory and are configured to be executed by the one or more processors, wherein the one or more programs include instructions for:
while the first electronic device is participating in a context-sharing group associated with a first location, wherein the context-sharing group is a collection of at least two electronic devices that each share context information with at least one other electronic device included in the collection, and wherein the collection includes at least a second electronic device and a context collector:
  receiving a user voice input;
  receiving, from the context collector, an aggregate context of the context-sharing group, wherein prior to receiving the aggregate context, at least the first electronic device and the second electronic device provide context information included in the aggregate context to the context collector and wherein the first electronic device and the second electronic device each provide their respective context information to the context collector in response to undergoing a device state change;
  after receiving the aggregate context, providing at least a portion of the aggregate context and data corresponding to the user voice input to a remote device that is not participating in the context-sharing group;
  receiving, from the remote device, a command to perform one or more tasks and a device identifier corresponding to the second electronic device, wherein the remote device determines the one or more tasks and the device identifier based on the data corresponding to the user voice input and context information included in the at least a portion of the aggregate context; and
  transmitting the command to the second electronic device based on the device identifier, wherein the command causes the second electronic device to perform the one or more tasks.

2. The first electronic device of claim 1, wherein each electronic device participating in the context-sharing group is connected to a single wireless network of the first location.

3. The first electronic device of claim 1, wherein the second electronic device is the context collector.

4. The first electronic device of claim 1, wherein the context collector is a third electronic device that is participating in the context-sharing group.

5. The first electronic device of claim 1, wherein the one or more programs include further instructions for:
  in response to receiving the user voice input, transmitting a request to the context collector for the context collector to transmit the aggregate context of the context-sharing group to the first electronic device, wherein the request causes the context collector to transmit the aggregate context to the first electronic device.

6. The first electronic device of claim 1, wherein the context information includes device state change information corresponding to at least the first electronic device and the second electronic device.

7. The first electronic device of claim 1, wherein the context information includes contextual state information corresponding to at least the first electronic device and the second electronic device.

8. The first electronic device of claim 1, wherein the context information includes device capability information corresponding to at least the first electronic device and the second electronic device.

9. The first electronic device of claim 1, wherein the command further causes the second electronic device to output a user query after performing the one or more tasks, and wherein the user query asks whether or not to transmit a second command to perform the one or more tasks to a fourth electronic device that is participating in the context-sharing group.

10. The first electronic device of claim 1, wherein the user voice input is ambiguous with respect to defining the electronic device that is to respond to the user voice input, and wherein the remote device disambiguates the user voice input based on the context information included in the at least a portion of the aggregate context.

11. The first electronic device of claim 1, wherein the first electronic device and the second electronic device are both personal electronic devices that are each registered to a single user, and wherein the remote device disambiguates one or more words included in the user voice input based on user data associated with the second electronic device.

12. The first electronic device of claim 1, wherein the first electronic device and the second electronic device are both personal electronic devices that are each registered to a different user, further comprising:
  prior to transmitting the command to the second electronic device:
    outputting a request for user authentication; and
    receiving authentication data from a user of the first electronic device, wherein the first electronic device transmits the command in response to determining, based on the received authentication data, that the user of the first electronic device is an authorized user of the second electronic device.

13. The first electronic device of claim 1, wherein the context-sharing group further includes a fourth electronic device, and wherein the first electronic device, the second electronic device, and the fourth electronic device are all personal electronic devices that are each registered to a single user, further comprising:
  prior to transmitting the command to the second electronic device, receiving, from the remote device, user data associated with the fourth electronic device; and
  transmitting the user data to the second electronic device with the command, wherein the command causes the second electronic device to perform the one or more tasks based on the user data.

14. The first electronic device of claim 1, wherein the user voice input includes a digital assistant trigger, further comprising:
  prior to transmitting the at least a portion of the aggregate context to the remote device:
    transmitting a request to the second electronic device for the second electronic device to provide the first electronic device with an indication of whether the second electronic device detected the digital assistant trigger included in the user voice input; and
    after receiving the indication from the second electronic device, incorporating the indication into context information associated with the second electronic device included in the aggregate context, wherein the remote device determines a physical proximity of the second electronic device to the first electronic device based on the indication.

15. A method, comprising:
  at a first electronic device participating in a context-sharing group associated with a first location, wherein the context-sharing group is a collection of at least two electronic devices that each share context information with at least one other electronic device included in the collection, and wherein the collection includes at least a second electronic device and a context collector:
    receiving a user voice input;
    receiving, from the context collector, an aggregate context of the context-sharing group, wherein prior to receiving the aggregate context, at least the first electronic device and the second electronic device provide context information included in the aggregate context to the context collector and wherein the first electronic device and the second electronic device each provide their respective context information to the context collector in response to undergoing a device state change;

after receiving the aggregate context, providing at least a portion of the aggregate context and data corresponding to the user voice input to a remote device that is not participating in the context-sharing group;

receiving, from the remote device, a command to perform one or more tasks and a device identifier corresponding to the second electronic device, wherein the remote device determines the one or more tasks and the device identifier based on the data corresponding to the user voice input and context information included in the at least a portion of the aggregate context; and transmitting the command to the second electronic device based on the device identifier, wherein the command causes the second electronic device to perform the one or more tasks.

16. The method of claim 15, wherein each electronic device participating in the context-sharing group is connected to a single wireless network of the first location.

17. The method of claim 15, wherein the second electronic device is the context collector.

18. The method of claim 15, wherein the context collector is a third electronic device that is participating in the context-sharing group.

19. The method of claim 15, wherein the one or more programs include further instructions for:
in response to receiving the user voice input, transmitting a request to the context collector for the context collector to transmit the aggregate context of the context-sharing group to the first electronic device, wherein the request causes the context collector to transmit the aggregate context to the first electronic device.

20. The method of claim 15, wherein the context information includes device state change information corresponding to at least the first electronic device and the second electronic device.

21. The method of claim 15, wherein the context information includes contextual state information corresponding to at least the first electronic device and the second electronic device.

22. The method of claim 15, wherein the context information includes device capability information corresponding to at least the first electronic device and the second electronic device.

23. The method of claim 15, wherein the command further causes the second electronic device to output a user query after performing the one or more tasks, and wherein the user query asks whether or not to transmit a second command to perform the one or more tasks to a fourth electronic device that is participating in the context-sharing group.

24. The method of claim 15, wherein the user voice input is ambiguous with respect to defining the electronic device that is to respond to the user voice input, and wherein the remote device disambiguates the user voice input based on the context information included in the at least a portion of the aggregate context.

25. The method of claim 15, wherein the first electronic device and the second electronic device are both personal electronic devices that are each registered to a single user, and wherein the remote device disambiguates one or more words included in the user voice input based on user data associated with the second electronic device.

26. The method of claim 15, wherein the first electronic device and the second electronic device are both personal electronic devices that are each registered to a different user, further comprising:
prior to transmitting the command to the second electronic device:
outputting a request for user authentication; and
receiving authentication data from a user of the first electronic device, wherein the first electronic device transmits the command in response to determining, based on the received authentication data, that the user of the first electronic device is an authorized user of the second electronic device.

27. The method of claim 15, wherein the context-sharing group further includes a fourth electronic device, and wherein the first electronic device, the second electronic device, and the fourth electronic device are all personal electronic devices that are each registered to a single user, further comprising:
prior to transmitting the command to the second electronic device, receiving, from the remote device, user data associated with the fourth electronic device; and
transmitting the user data to the second electronic device with the command, wherein the command causes the second electronic device to perform the one or more tasks based on the user data.

28. The method of claim 15, wherein the user voice input includes a digital assistant trigger, further comprising:
prior to transmitting the at least a portion of the aggregate context to the remote device:
transmitting a request to the second electronic device for the second electronic device to provide the first electronic device with an indication of whether the second electronic device detected the digital assistant trigger included in the user voice input; and
after receiving the indication from the second electronic device, incorporating the indication into context information associated with the second electronic device included in the aggregate context, wherein the remote device determines a physical proximity of the second electronic device to the first electronic device based on the indication.

29. A non-transitory computer-readable storage medium storing one or more programs, the one or more programs comprising instructions, which when executed by one or more processors of a first electronic device, cause the first electronic device to:
while the first electronic device is participating in a context-sharing group associated with a first location, wherein the context-sharing group is a collection of at least two electronic devices that each share context information with at least one other electronic device included in the collection, and wherein the collection includes at least a second electronic device and a context collector:
receive a user voice input;
receive, from the context collector, an aggregate context of the context-sharing group, wherein prior to receiving the aggregate context, at least the first electronic device and the second electronic device provide context information included in the aggregate context to the context collector and wherein the first electronic device and the second electronic device each provide their respective context information to the context collector in response to undergoing a device state change;

after receiving the aggregate context, provide at least a portion of the aggregate context and data corresponding to the user voice input to a remote device that is not participating in the context-sharing group;

receive, from the remote device, a command to perform one or more tasks and a device identifier corresponding to the second electronic device, wherein the remote device determines the one or more tasks and the device identifier based on the data corresponding to the user voice input and context information included in the at least a portion of the aggregate context; and transmit the command to the second electronic device based on the device identifier, wherein the command causes the second electronic device to perform the one or more tasks.

30. The non-transitory computer readable storage medium of claim 29, wherein each electronic device participating in the context-sharing group is connected to a single wireless network of the first location.

31. The non-transitory computer readable storage medium of claim 29, wherein the second electronic device is the context collector.

32. The non-transitory computer readable storage medium of claim 29, wherein the context collector is a third electronic device that is participating in the context-sharing group.

33. The non-transitory computer readable storage medium of claim 29, wherein the one or more programs include further instructions for:

in response to receiving the user voice input, transmitting a request to the context collector for the context collector to transmit the aggregate context of the context-sharing group to the first electronic device, wherein the request causes the context collector to transmit the aggregate context to the first electronic device.

34. The non-transitory computer readable storage medium of claim 29, wherein the context information includes device state change information corresponding to at least the first electronic device and the second electronic device.

35. The non-transitory computer readable storage medium of claim 29, wherein the context information includes contextual state information corresponding to at least the first electronic device and the second electronic device.

36. The non-transitory computer readable storage medium of claim 29, wherein the context information includes device capability information corresponding to at least the first electronic device and the second electronic device.

37. The non-transitory computer readable storage medium of claim 29, wherein the command further causes the second electronic device to output a user query after performing the one or more tasks, and wherein the user query asks whether or not to transmit a second command to perform the one or more tasks to a fourth electronic device that is participating in the context-sharing group.

38. The non-transitory computer readable storage medium of claim 29, wherein the user voice input is ambiguous with respect to defining the electronic device that is to respond to the user voice input, and wherein the remote device disambiguates the user voice input based on the context information included in the at least a portion of the aggregate context.

39. The non-transitory computer readable storage medium of claim 29, wherein the first electronic device and the second electronic device are both personal electronic devices that are each registered to a single user, and wherein the remote device disambiguates one or more words included in the user voice input based on user data associated with the second electronic device.

40. The non-transitory computer readable storage medium of claim 29, wherein the first electronic device and the second electronic device are both personal electronic devices that are each registered to a different user, further comprising:

prior to transmitting the command to the second electronic device:
outputting a request for user authentication; and
receiving authentication data from a user of the first electronic device, wherein the first electronic device transmits the command in response to determining, based on the received authentication data, that the user of the first electronic device is an authorized user of the second electronic device.

41. The non-transitory computer readable storage medium of claim 29, wherein the context-sharing group further includes a fourth electronic device, and wherein the first electronic device, the second electronic device, and the fourth electronic device are all personal electronic devices that are each registered to a single user, further comprising:

prior to transmitting the command to the second electronic device, receiving, from the remote device, user data associated with the fourth electronic device; and
transmitting the user data to the second electronic device with the command, wherein the command causes the second electronic device to perform the one or more tasks based on the user data.

42. The non-transitory computer readable storage medium of claim 29, wherein the user voice input includes a digital assistant trigger, further comprising:

prior to transmitting the at least a portion of the aggregate context to the remote device:
transmitting a request to the second electronic device for the second electronic device to provide the first electronic device with an indication of whether the second electronic device detected the digital assistant trigger included in the user voice input; and
after receiving the indication from the second electronic device, incorporating the indication into context information associated with the second electronic device included in the aggregate context, wherein the remote device determines a physical proximity of the second electronic device to the first electronic device based on the indication.

\* \* \* \* \*